US012726804B2

(12) United States Patent
Martin et al.

(10) Patent No.: US 12,726,804 B2
(45) Date of Patent: Sep. 1, 2026

(54) SYSTEMS AND METHODS FOR DELIVERING AND SUPPORTING DIGITAL REQUESTS FOR EMERGENCY SERVICE

(71) Applicant: RapidSOS, Inc., New York, NY (US)

(72) Inventors: Michael John Martin, Long Island City, NY (US); Riccardo Pellegrini, New York, NY (US); Nicholas Edward Horelik, New York, NY (US); William Thomas Guthrie, Fairplay, CO (US)

(73) Assignee: RapidSOS, Inc., New York, NY (US)

( * ) Notice: Subject to any disclaimer, the term of this patent is extended or adjusted under 35 U.S.C. 154(b) by 221 days.

(21) Appl. No.: 18/517,686

(22) Filed: Nov. 22, 2023

(65) Prior Publication Data

US 2024/0171958 A1 May 23, 2024

Related U.S. Application Data

(63) Continuation of application No. 17/734,863, filed on May 2, 2022, now Pat. No. 11,864,082, which is a continuation of application No. 17/332,863, filed on May 27, 2021, now Pat. No. 11,356,833, which is a continuation of application No. PCT/US2020/046857, filed on Aug. 18, 2020.

(60) Provisional application No. 62/888,917, filed on Aug. 19, 2019.

(51) Int. Cl.
*H04W 4/90* (2018.01)
*H04M 3/51* (2006.01)
*H04W 4/021* (2018.01)

(52) U.S. Cl.
CPC .......... *H04W 4/90* (2018.02); *H04M 3/5116* (2013.01); *H04M 3/5133* (2013.01); *H04W 4/021* (2013.01)

(58) Field of Classification Search
CPC ..... H04W 4/90; H04W 4/021; H04M 3/5133; H04M 3/5116
USPC ........................................................ 455/404.2
See application file for complete search history.

(56) References Cited

U.S. PATENT DOCUMENTS 5,379,337 A 1/1995 Castillo
9,659,484 B1 5/2017 Mehta
9,736,670 B2 8/2017 Mehta
9,756,169 B2 9/2017 Mehta
9,838,858 B2 12/2017 Anand
9,924,043 B2 3/2018 Mehta
9,942,739 B2 4/2018 Bozik
9,986,404 B2 5/2018 Mehta
9,992,655 B2 6/2018 Anand
9,998,507 B2 6/2018 Mehta
(Continued)

FOREIGN PATENT DOCUMENTS

WO 2021034859 A1 2/2021

OTHER PUBLICATIONS

PCT/US2020/046857 International Search Report and Written Opinion dated Nov. 18, 2020.
(Continued)

*Primary Examiner* — Michael R Neff
(74) *Attorney, Agent, or Firm* — Fitch, Even, Tabin & Flannery LLP

(57) ABSTRACT

Described herein are systems, devices, methods, and media for transmitting emergency alerts, emergency services requests, and emergency data associated with emergency alerts and emergency service requests to relevant parties, such monitoring centers and emergency service providers.

20 Claims, 30 Drawing Sheets

(56) References Cited

U.S. PATENT DOCUMENTS

D829,222 S 9/2018 Choi
10,136,294 B2 11/2018 Mehta
10,140,842 B2 11/2018 Mehta
D835,151 S 12/2018 Martin
10,165,431 B2 12/2018 Bozik
10,375,558 B2 8/2019 Katz
10,419,915 B2 9/2019 Mehta
10,425,799 B2 9/2019 Anand
10,447,865 B2 10/2019 Mehta
10,657,799 B2 5/2020 Mehta
10,701,541 B2 6/2020 Mehta
10,701,542 B2 6/2020 Martin
10,771,951 B2 9/2020 Mehta
10,805,786 B2 10/2020 Pellegrini
10,820,181 B2 10/2020 Horelik
10,861,320 B2 12/2020 Martin
10,911,926 B2 2/2021 Pellegrini
10,977,927 B2 4/2021 Katz
11,140,538 B2 10/2021 Mehta
11,146,680 B2 10/2021 Leavitt
11,153,737 B2 10/2021 Anand
11,197,145 B2 12/2021 Martin
11,218,584 B2 1/2022 Martin
11,228,891 B2 1/2022 King-Berkman
11,310,647 B2 4/2022 Pellegrini
11,330,096 B2 5/2022 Horelik
11,330,664 B1 5/2022 Martin
11,356,833 B2 * 6/2022 Martin ................. H04M 3/5116
11,399,095 B2 7/2022 Martin
D960,922 S 8/2022 Pellegrini
11,425,529 B2 8/2022 Mehta
11,445,349 B2 9/2022 Mehta
11,496,874 B2 11/2022 Katz
D973,066 S 12/2022 Gillespie
11,528,772 B2 12/2022 Horelik
11,553,321 B2 1/2023 Martin
11,558,728 B2 1/2023 Pellegrini
11,570,607 B2 1/2023 Pellegrini
11,580,845 B2 2/2023 Mehta
11,605,287 B2 3/2023 Mehta
11,641,575 B2 5/2023 Horelik
11,659,375 B2 5/2023 Anand
11,665,523 B2 5/2023 Mehta
11,689,653 B2 6/2023 Martin
11,695,871 B2 7/2023 Leavitt
11,716,605 B2 8/2023 King-Berkman
11,741,819 B2 8/2023 Katz
11,743,706 B2 8/2023 Pellegrini
11,749,094 B2 9/2023 Pellegrini
11,790,766 B2 10/2023 Martin
11,818,639 B2 11/2023 Horelik
11,832,157 B2 11/2023 Mehta
11,864,082 B2 * 1/2024 Martin ................. H04M 3/5116
11,871,325 B2 1/2024 Pellegrini
11,902,871 B2 2/2024 Pellegrini
11,908,553 B2 2/2024 Ferentz
11,917,514 B2 2/2024 Martin
11,943,694 B2 3/2024 Pellegrini
11,956,853 B2 4/2024 Martin
11,974,207 B2 4/2024 Katz
12,041,525 B2 7/2024 Bozik
12,047,858 B2 7/2024 Anand
12,063,581 B2 8/2024 Martin
12,074,999 B2 8/2024 Martin
2010/0003954 A1 * 1/2010 Greene ............. H04W 52/0261
455/404.1
2013/0012155 A1 1/2013 Forstall
2013/0082837 A1 4/2013 Cosentino
2014/0155018 A1 6/2014 Fan
2015/0031324 A1 * 1/2015 Zentner .................. H04W 4/14
455/404.1
2015/0317809 A1 * 11/2015 Chellappan ............ H04W 4/90
455/404.1
2016/0088455 A1 3/2016 Bozik
2016/0353266 A1 12/2016 Winkler
2017/0078226 A1 3/2017 Daly
2017/0099579 A1 4/2017 Ryan
2017/0124853 A1 5/2017 Mehta
2017/0161614 A1 6/2017 Mehta
2017/0164175 A1 6/2017 Bozik
2017/0171735 A1 6/2017 Anand
2017/0180486 A1 6/2017 Mehta
2017/0180964 A1 6/2017 Mehta
2017/0195475 A1 7/2017 Mehta
2017/0245130 A1 8/2017 Mehta
2017/0251347 A1 8/2017 Mehta
2017/0310827 A1 * 10/2017 Mehta .................. H04W 80/04
2017/0325056 A1 11/2017 Mehta
2017/0329358 A1 * 11/2017 Ferguson ............ H04L 12/1895
2017/0330447 A1 11/2017 Mehta
2018/0053401 A1 2/2018 Martin
2018/0152563 A1 5/2018 Mehta
2018/0242133 A1 8/2018 Anand
2018/0249315 A1 8/2018 Mehta
2018/0262544 A1 9/2018 Mehta
2018/0310159 A1 10/2018 Katz
2019/0073894 A1 3/2019 Mehta
2019/0104395 A1 4/2019 Mehta
2019/0149661 A1 5/2019 Klaban
2019/0166244 A1 * 5/2019 Ravichandran ..... H04M 3/5191
2019/0174288 A1 6/2019 Bozik
2019/0174289 A1 * 6/2019 Martin ............... H04M 3/5141
2019/0253861 A1 8/2019 Horelik
2019/0281165 A1 9/2019 Mehta
2019/0306664 A1 10/2019 Mehta
2019/0320310 A1 10/2019 Horelik
2019/0327597 A1 10/2019 Katz
2019/0335310 A1 10/2019 Anand
2019/0380020 A1 12/2019 Pellegrini
2020/0059776 A1 2/2020 Martin
2020/0068374 A1 2/2020 Mehta
2020/0100084 A1 3/2020 Martin
2020/0126174 A1 4/2020 Halse
2020/0135005 A1 4/2020 Katz
2020/0221279 A1 7/2020 Mehta
2020/0244797 A1 7/2020 Horelik
2020/0258374 A1 8/2020 Mehta
2020/0258606 A1 8/2020 Ferentz
2020/0274962 A1 8/2020 Martin
2020/0288295 A1 9/2020 Martin
2020/0314240 A1 10/2020 Leavitt
2020/0314623 A1 10/2020 Pellegrini
2020/0344602 A1 10/2020 Li
2020/0346751 A1 11/2020 Horelik
2021/0006960 A1 1/2021 Martin
2021/0006961 A1 1/2021 King-Berkman
2021/0014659 A1 1/2021 Mehta
2021/0037368 A1 2/2021 Pellegrini
2021/0058508 A1 2/2021 Leavitt
2021/0110686 A1 4/2021 Slavin
2021/0120394 A1 4/2021 Martin
2021/0204108 A1 7/2021 Horelik
2021/0233388 A1 7/2021 Martin
2021/0266722 A1 8/2021 Pellegrini
2021/0289334 A1 9/2021 Martin
2021/0314757 A1 10/2021 Pellegrini
2021/0383918 A1 12/2021 Martin
2021/0390844 A1 12/2021 Katz
2021/0409928 A1 12/2021 Mehta
2022/0014895 A1 1/2022 Horelik
2022/0027417 A1 1/2022 Katz
2022/0030109 A1 1/2022 Leavitt
2022/0051548 A1 2/2022 Pellegrini
2022/0103995 A1 3/2022 Horelik
2022/0141637 A1 5/2022 Pellegrini
2022/0167141 A1 5/2022 Anand
2022/0172599 A1 6/2022 Mehta
2022/0174468 A1 6/2022 Anand
2022/0201458 A1 6/2022 Pellegrini
2022/0210272 A1 6/2022 Horelik
2022/0264274 A1 8/2022 Bozik
2022/0272201 A1 8/2022 Mehta
2022/0279331 A1 9/2022 Biegel
2022/0303380 A1 9/2022 Martin

(56) References Cited

U.S. PATENT DOCUMENTS

| | | | |
|---|---|---|---|
| 2022/0322061 | A1 | 10/2022 | King-Berkman |
| 2022/0353662 | A1 | 11/2022 | Martin |
| 2022/0353663 | A1 | 11/2022 | Mehta |
| 2022/0360963 | A1 | 11/2022 | Ferentz |
| 2022/0377522 | A1 | 11/2022 | Martin |
| 2022/0377841 | A1 | 11/2022 | Martin |
| 2023/0014517 | A1 | 1/2023 | Martin |
| 2023/0014760 | A1 | 1/2023 | Martin |
| 2023/0036290 | A1 | 2/2023 | Martin |
| 2023/0042895 | A1 | 2/2023 | Katz |
| 2023/0048015 | A1 | 2/2023 | Pellegrini |
| 2023/0066525 | A1 | 3/2023 | Cabanas |
| 2023/0097022 | A1 | 3/2023 | Leavitt |
| 2023/0114663 | A1 | 4/2023 | Pellegrini |
| 2023/0123348 | A1 | 4/2023 | Mehta |
| 2023/0154310 | A1 | 5/2023 | Mehta |
| 2023/0217546 | A1 | 7/2023 | Horelik |
| 2023/0262438 | A1 | 8/2023 | Anand |
| 2023/0269572 | A1 | 8/2023 | Horelik |
| 2023/0284004 | A1 | 9/2023 | Pellegrini |
| 2023/0336958 | A1 | 10/2023 | Mehta |
| 2023/0370540 | A1 | 11/2023 | Martin |
| 2023/0410635 | A1 | 12/2023 | Katz |
| 2023/0421630 | A1 | 12/2023 | Leavitt |
| 2023/0422013 | A1 | 12/2023 | Pellegrini |
| 2024/0048952 | A1 | 2/2024 | Seidberg |
| 2024/0073669 | A1 | 2/2024 | King-Berkman |
| 2024/0098473 | A1 | 3/2024 | Ingram |
| 2024/0114328 | A1 | 4/2024 | Mehta |
| 2024/0267719 | A1 | 8/2024 | Pellegrini |
| 2024/0276193 | A1 | 8/2024 | Martin |
| 2024/0292201 | A1 | 8/2024 | Katz |
| 2024/0323663 | A1 | 9/2024 | Pellegrini |
| 2024/0334172 | A1 | 10/2024 | Bozik |

OTHER PUBLICATIONS

U.S. Appl. No. 17/332,863 Office Action dated Sep. 8, 2021.
PCT/US2020/046857 International Preliminary Report on Patentability dated Feb. 17, 2022.
EPO: Application No. 20853989.0; Extended European Search Report dated Aug. 17, 2023.

* cited by examiner

FIG. 11
1191
Log Out
ALARM HANDLING SOFTWARE
1193
Push to PSAP
Action Pattern
Contact Police
Contact Customer
Contact Call List
Close Alarm
Alarm Details 1192
Burglary Alarm
Time: 07/08/2019 20:05:34
Priority: 4 [Edit]
System: 1 -- Commercial Alarm
TX: 2
Area: 1 - Main
2-Way Communication 1194
Alarm Triggered
Automated Call sent to Keyholder
Keyholder Requested Dispatch
You sent to PSAP
Type your message here...
Send
Address
Street: 234 W 39th St
City: New York
State: New York
Zip: 10018
Customer Status
Alarm
Monitoring
Service
Activity Log 1195
Week
Month
Date
Time
Description
User ID
07/11/2019
13:10
ALARM (Manual) -- Burglary Alarm
BOLD
13:05
DEFERRED
13:17
VIEWED
13:20
DEFERRED
13:30
DEFERRED
07/04/2019
17:38
ALARM
BOLD
07/04/2019
17:31
VIEWED
BOLD

SYSTEMS AND METHODS FOR DELIVERING AND SUPPORTING DIGITAL REQUESTS FOR EMERGENCY SERVICE

CROSS-REFERENCE

This application is a continuation of U.S. patent application Ser. No. 17/734,863, filed May 2, 2022, which is a continuation of U.S. patent application Ser. No. 17/332,863, filed May 27, 2021, issued as U.S. Pat. No. 11,356,833 on Jun. 7, 2022, which is a continuation of International Patent Application No. PCT/US2020/046857, filed Aug. 18, 2020, which claims the benefit of U.S. Provisional Patent Application No. 62/888,917, filed Aug. 19, 2019. The entire contents of these applications are incorporated by reference herein.

BACKGROUND OF THE INVENTION

A person in an emergency may request help using a mobile communication device such as a cell phone to dial a designated emergency number like 9-1-1 or a direct access phone number for the local emergency service provider (e.g., an emergency dispatch center). This call is assigned to one or more first responders by the emergency service provider. However, these communications are typically limited to audio calls with narrow functionality since emergency service providers that receive emergency calls generally lack the capacity for more sophisticated communications, which limits them to verbally receiving emergency locations from the person in the emergency during the emergency call. Unfortunately, a person in an emergency often does not know or is otherwise incapable of articulating their location. Likewise, when an alarm is activated by a security system, such as when a telematics system within a vehicle detects that the vehicle has been in an accident or when a home security system installed within a house detects that the house has been breached by an unauthorized party, a notification is typically sent to a monitoring center, where a call taker at the monitoring center must verbally relay information regarding the alarm to a local emergency service provider. The process of verbally relaying this information to the emergency service provider both delays response from the emergency service provider and introduces potential human error.

SUMMARY OF THE INVENTION

Described herein are systems, devices, methods, and media for transmitting emergency alerts, emergency services requests, and emergency data associated with emergency alerts and emergency service requests to relevant parties, such monitoring centers and emergency service providers. Historically, emergency response has been limited to voice communications over traditional emergency calls. As communication technologies have progressed, emergency service providers continue to have significant variation in capabilities. Many PSAPs continue to have legacy systems for call handling and dispatching. Systems, methods and processes for receiving and processing digital service requests are disclosed wherein non-traditional methods of sending emergency service requests are disclosed using SMS and Internet-based communications. Unlike voice communications, the digital service requests may contain accurate location, additional data including user data, health data, sensor data, etc. Such information need not be spoken and can be directly transmitted to an appropriate ESP, thereby saving precious seconds for emergency response. The digital service requests can be pre-authorized for obtaining emergency service without requiring audio communications with a caller, for example, requiring the ESP to claim the digital service request. Alternatively or in combination, the systems and methods disclosed herein facilitate text-based communications between various stakeholders such as the user (e.g., person experiencing the emergency), emergency contacts, monitoring center and the appropriate ESPs (or personnel at the monitoring center or ESP). Therefore, the provisioning of emergency response using a non-audio digital emergency service request and facilitating text-based communications are invaluable features that can be provide through the present disclosure.

One advantage provided by the systems, servers, devices, methods, and media of the instant application is the ability to gather information (e.g., data) that may be pertinent to emergency situations and deliver the information to monitoring centers, which can then use the information to better respond to emergencies or relay the information to emergency service providers (ESPs; e.g., public safety answering points, fire departments, police departments, paramedics, police officers, etc.). In some embodiments, an emergency management system (EMS) functions to receive an emergency data request regarding an emergency alert (e.g., an alert generated based on a home security alarm) from a monitoring center, gather information regarding the emergency alert, and transmit the information regarding the emergency alert to the monitoring center. In some embodiments, the information regarding the emergency alert is displayed within a call handing software application at the monitoring center. In some embodiments, the information regarding the emergency alert is displayed within an emergency response application provided by the EMS. In some embodiments, the emergency data request is a geospatial query submitted through the emergency response application.

Another advantage provided by the systems, servers, devices, methods, and media of the instant application is the ability to receive information regarding an emergency alert and digitally relay the information regarding the emergency alert to an emergency service provider. In some embodiments, an emergency management system (EMS) functions to receive emergency data regarding an emergency alert or alarm data associated with an alarm (e.g., from a monitoring center), determine an appropriate emergency service provider (ESP) to receive the emergency data or the alarm data, and transmit the emergency or the alarm data to the appropriate ESP. In this way, emergency data regarding an emergency alert or alarm data associated with an alarm may be quickly and efficiently transmitted from a monitoring center to an ESP so that emergency response may be expedited. In some embodiments, the emergency data regarding the emergency alert or the alarm data associated with the alarm is displayed within a call handling software application or computer aided dispatch (CAD) system at the ESP. In some embodiments, the emergency data regarding the emergency alert or the alarm data associated with the alarm is displayed at the ESP within an emergency response application provided by the EMS. In some embodiments, the EMS obtains verification of the emergency alert or the alarm before transmitting the emergency data regarding the emergency alert or the alarm data associated with the alarm to the ESP. In some embodiments, the EMS obtains verification of the emergency alert or the alarm from the monitoring center. In some embodiments, the EMS determines the appropriate ESP to receive the emergency data regarding the emergency alert or the alarm data associated with the alarm using a location included in the emergency data or the alarm data.

Another advantage provided by the systems, servers, devices, methods, and media of the instant application is the ability to receive information regarding an alarm from a monitoring center and digitally relay the information regarding the alarm to an emergency service provider (ESP). In some embodiments, an emergency management system (EMS) functions to receive alarm data associated with an alarm from a monitoring center, determine an appropriate ESP to receive the alarm data associated with the alarm, generate a digital emergency service request (also referred to as a "digital primary request for emergency service" or a "digital service request") for the alarm data, transmit the digital emergency service request to the appropriate ESP, and facilitate a two-way communication session between the monitoring center and the ESP. In this way, alarm systems may digitally communicate alarm data to ESPs within digital emergency service requests. In some embodiments, the two-way communication session is text-based. In some embodiments, the EMS determines the appropriate ESP to receive the alarm data using an alarm location included in the alarm data. In some embodiments, the EMS receives the alarm data from the monitoring center through an alarm handling application (e.g., automation software). In some embodiments, the EMS displays the digital emergency service request and alarm data within an emergency response application. In some embodiments, the emergency response application is a web application provided by the EMS.

Another advantage provided by the systems, servers, devices, methods, and media of the instant application is the ability to receive an emergency alert and digitally transmit the emergency alert to an emergency service provider. In some embodiments, an emergency management system (EMS) functions to receive an emergency alert generated by an electronic device, determine an appropriate emergency service provider (ESP) to receive the emergency alert, and display an emergency service request regarding the emergency alert within a graphical user interface of an emergency response application provided by the EMS at the appropriate ESP. In this way, a person may notify emergency responders that they need emergency assistance without any verbal communication. In some embodiments, the EMS obtains verification of the emergency alert before displaying the emergency service request regarding the emergency alert within the emergency response application. In some embodiments, the EMS determines the appropriate PSAP to receive the emergency alert using a location included in the emergency alert. In some embodiments, the EMS facilitates a text-based communication session between the ESP and a user of the electronic device. In some embodiments, the EMS facilitates a text-based communication session between the ESP and a monitoring center associated with the emergency alert. In some embodiments, the text-based communication session is conducted between the ESP and the user of the electronic device or the monitoring center without a corresponding audio or verbal communication session (i.e., non-audio/non-voice emergency communications). In some embodiments, additional information is provided alongside the text-based communication session such as, for example, multimedia content (e.g., photos, video, audio recordings, sensor data, etc.).

In another aspect, disclosed herein is a system comprising: a) an emergency management system (EMS) configured for providing emergency response assistance, the EMS communicatively coupled to a plurality of emergency service providers (ESPs) and comprising a memory, a network component, and at least one processor, operatively coupled to the network component, the at least one processor operative to: i) receive alarm data comprising an alarm location associated with a monitoring center; ii) determine, using the alarm location, a first ESP from the plurality of ESPs to receive the alarm data; iii) transmit a digital emergency service request associated with the alarm data to the first ESP; and iv) facilitate a two-way text-based communication session between the monitoring center and the first ESP; and b) an emergency response system comprising at least one processor, a memory, a user interface, a network component, a display, and at least one processor, operatively coupled to the network component, the at least one processor operative to: i) provide an emergency response application comprising a graphical user interface (GUI) at the first ESP; ii) display the digital emergency service request and the alarm data within the GUI of the emergency response application; iii) provide an interface configured to engage in the two-way text-based communication session between the monitoring center and the first ESP. In some embodiments, determining the first ESP to receive the alarm data comprises: a) retrieving a plurality of geofences associated with the plurality of ESPs; b) determining that the alarm location is within a first geofence associated with the first ESP; and c) transmitting the digital emergency service request to the first ESP in response to determining that the alarm location is within the first geofence associated with the first ESP. In some embodiments, the at least one processor of the EMS is further operative to: a) detect an active communication link established between the EMS and the first ESP; and b) transmit the digital emergency service request to the first ESP in response to detecting the active communication link established between the EMS and the first ESP and determining that the alarm location is within the first geofence associated with the first ESP. In some embodiments, the active communication link is established through the emergency response application. In some embodiments, the alarm data is transmitted from the monitoring center to the EMS through an alarm handling application accessible by the monitoring center. In some embodiments, the alarm data is transmitted from the monitoring center to the EMS through the alarm handling application in response to a selection of a button within a GUI of the alarm handling application. In some embodiments, the button within the GUI of the alarm handling application is a request dispatch button. In some embodiments, the alarm data is transmitted from the monitoring center to the EMS through an alarm handling application and wherein the two-way text-based communication session is facilitated through the GUI of the emergency response application and a GUI of the alarm handling application. In some embodiments, the at least one processor of the EMS is further operative to provide a monitoring center portal accessible by the monitoring center and wherein the two-way text-based communication session is facilitated through the GUI of the emergency response application and a GUI of the monitoring center portal. In some embodiments, the alarm data is transmitted from the monitoring center to the EMS through an alarm handling application accessible by the monitoring center in response to a selection of a button within the GUI of the alarm handling application, and wherein the monitoring center portal is launched in response to the selection of the button within the GUI of the alarm handling application. In some embodiments, the at least one processor of the EMS is further operative to display the alarm data within the GUI of the monitoring center portal and wherein the digital emergency service request is transmitted for the alarm data in response to a selection of a button within the GUI of the monitoring center portal. In some embodiments, the button within the GUI of the monitoring center portal is a request dispatch button. In some embodiments, the at least one processor of the EMS is further operative to provide an update regarding the digital emergency service request to the monitoring center or the ESP through the two-way text-based communication session. In some embodiments, the at least one processor of the EMS is further operative to provide information regarding the digital emergency service request to a computer aided dispatch (CAD) system accessible by the ESP. In some embodiments, the information regarding the digital emergency service request comprises content from the two-way text-based communication session. In some embodiments, the information regarding the digital emergency service request is provided to the CAD system in response to a selection of a button within the GUI of the emergency response application. In some embodiments, the button within the GUI of the emergency response application is a push to CAD button. In some embodiments, the information regarding the digital emergency service request is provided to the CAD system in response to a query received from the CAD system by the EMS. In some embodiments, the EMS receives regular and periodic queries from the CAD system. In some embodiments, the first ESP is determined using the alarm location and an emergency type associated with the alarm. In some embodiments, the emergency type associated with the alarm is one of fire, medical, or police.

Disclosed herein, in another aspect, is a method for providing emergency response assistance, the method comprising: a) receiving alarm data comprising an alarm location associated with a monitoring center; b) determining, using the alarm location, a first emergency service provider (ESP) from a plurality of ESPs to receive the alarm data; c) transmitting a digital emergency service request to the first ESP; d) displaying the digital emergency service request and the alarm data within a graphical user interface (GUI) of an emergency response application accessible by the first ESP; and e) facilitating a two-way text-based communication session between the monitoring center and the first ESP.

In another aspect, disclosed herein is a method for providing emergency response assistance, comprising: a) receiving alarm data comprising an alarm location associated with a monitoring center; b) transmitting a digital emergency service request to a first ESP selected from the plurality of ESPs based on the alarm location; and c) facilitating a two-way text-based communication session between the monitoring center and the ESP, wherein the alarm data is provided for display within a GUI of an emergency response application of the first ESP.

In another aspect, disclosed herein is non-transitory computer readable storage medium comprising instructions executable by a processor to create an emergency management system (EMS) software application configured to perform steps comprising: a) receiving alarm data comprising an alarm location associated with a monitoring center; b) transmitting a digital emergency service request to a first ESP selected from the plurality of ESPs based on the alarm location; and c) facilitating a two-way text-based communication session between the monitoring center and the ESP, wherein the alarm data is provided for display within a GUI of an emergency response application of the first ESP.

In another aspect, disclosed herein is an emergency management system (EMS) configured for providing emergency response assistance, the EMS communicatively coupled to a plurality of emergency service providers (ESPs) and comprising a memory, a network component, and at least one processor, operatively coupled to the network component, the at least one processor operative to: a) receive alarm data comprising an alarm location associated with a monitoring center; b) transmit a digital emergency service request to a first ESP selected from the plurality of ESPs based on the alarm location; and c) facilitate a two-way text-based communication session between the monitoring center and the ESP, wherein the alarm data is provided for display within a GUI of an emergency response application of the first ESP. In some embodiments, the digital emergency service request is a non-voice communication authorized to request an emergency response from the first ESP. In some embodiments, the digital emergency service request is configured to be claimed through the GUI of the emergency response application of the first ESP. In some embodiments, a failsafe emergency call is initiated if the digital emergency service request is not claimed within a specific time window. In some embodiments, the at least one processor is operative to determine, using the alarm location, the first ESP from the plurality of ESPs to respond to an emergency at the alarm location. In some embodiments, the at least one processor is further operative to: a) determine that the first ESP has capability to receive and process the digital emergency service request; and b) transmit the digital emergency service request to the first ESP after determining that the first ESP has capability to receive and process the digital emergency service request. In some embodiments, the at least one processor is further operative to: a) retrieve a plurality of geofences associated with the plurality of ESPs; b) determine that the alarm location is within a first geofence associated with the first ESP; c) transmit the digital emergency service request to the first ESP after determining that the alarm location is within the first geofence associated with the first ESP. In some embodiments, the at least one processor is further operative to: a) detect an active communication link established between the EMS and the first ESP; and b) transmit the digital emergency service request to the first ESP after detecting the active communication link established between the EMS and the first ESP and determining that the alarm location is within the first geofence associated with the first ESP. In some embodiments, the active communication link is established between the EMS and the emergency response application of the first ESP. In some embodiments, the at least one processor is operative to receive the alarm data from an alarm handling application accessible by the monitoring center. In some embodiments, the at least one processor is operative to receive the alarm data after the alarm handling application transmits the alarm data in response to a selection of a button within a GUI of the alarm handling application. In some embodiments, the button within the GUI of the alarm handling application is a request dispatch button. In some embodiments, the at least one processor is operative to receive the alarm data from an alarm handling application of the monitoring center, and wherein the two-way text-based communication session is facilitated through the GUI of the emergency response application and a GUI of the alarm handling application. In some embodiments, the at least one processor of the EMS is further operative to provide a monitoring center portal accessible by the monitoring center, and wherein the two-way text-based communication session is facilitated through the GUI of the emergency response application and a GUI of the monitoring center portal. In some embodiments, the at least one processor is operative to receive the alarm data from an alarm handling application of the monitoring center that transmits the alarm data in response to a selection of a button within a GUI of an alarm handling application, wherein the monitoring center portal is configured to be launched in response to the selection of a button within the GUI of the alarm handling application. In some embodiments, the at least one processor of the EMS is further operative to display the alarm data within the GUI of the monitoring center portal, and wherein the digital emergency service request is transmitted in response to a selection of a button within the GUI of the monitoring center portal. In some embodiments, the button within the GUI of the monitoring center portal is a request dispatch button. In some embodiments, the at least one processor of the EMS is further operative to provide an update regarding the digital emergency service request to the monitoring center or the ESP through the two-way text-based communication session. In some embodiments, the at least one processor of the EMS is further operative to provide information regarding the digital emergency service request to a computer aided dispatch (CAD) system accessible by the ESP. In some embodiments, the information regarding the digital emergency service request comprises content obtained from or based on the two-way text-based communication session. In some embodiments, the information regarding the digital emergency service request is provided to the CAD system in response to a selection of a button within the GUI of the emergency response application. In some embodiments, the button within the GUI of the emergency response application is a push to CAD button. In some embodiments, the information regarding the digital emergency service request is provided to the CAD system in response to a query received from the CAD system by the EMS. In some embodiments, the EMS receives regular and periodic queries from the CAD system.

In another aspect, disclosed herein is an emergency management system (EMS) configured for providing emergency response assistance to a monitoring center, the EMS communicatively coupled to a plurality of emergency service providers (ESPs) and comprising a memory, a network component, and at least one processor, operatively coupled to the network component, the at least one processor operative to: a) receive an emergency alert generated by an electronic device; b) perform verification on the emergency alert; c) transmit the emergency alert to a monitoring center; d) transmit a digital emergency service request to an emergency service provider (ESP); and e) facilitate a two-way text-based communication session between the monitoring center and the ESP. In some embodiments, the emergency alert is determined to be unverified in b). In some embodiments, the digital emergency service request is transmitted in response to the emergency alert being determined to be unverified. In some embodiments, the emergency alert comprises an emergency location. In some embodiments, the at least one processor is further operative to: a) retrieve a plurality of geofences associated with a plurality of monitoring centers; b) determine that the emergency location is within a geofence associated with the monitoring center from the plurality of monitoring centers; and c) transmit the emergency alert to the monitoring center in response to determining that the emergency location is within the geofence associated with the monitoring center. In some embodiments, the at least one processor is further operative to: a) retrieve a plurality of geofences associated with a plurality of emergency service providers (ESPs); b) determine that the emergency location is within a geofence associated with the ESP from the plurality of ESPs; and c) transmit the emergency service request to the ESP in response to determining that the emergency location is within the geofence associated with the ESP. In some embodiments, the at least one processor is further operative to: a) detect an active communication link established between the EMS and the ESP; b) transmit the digital emergency service request to the ESP in response to detecting the active communication link established between the EMS and the ESP and determining that the alarm location is within the geofence associated with the ESP. In some embodiments, the digital emergency service request is transmitted to the ESP for display within a graphical user interface (GUI) of an emergency response application accessible by the ESP, and wherein the active communication link is established with the ESP through the emergency response application. In some embodiments, the digital emergency service request is transmitted to the ESP for display within a graphical user interface (GUI) of an emergency response application accessible by the ESP in response to the emergency alert being determined to be unverified. In some embodiments, the two-way text-based communication session is facilitated through the GUI of the emergency response application. In some embodiments, the emergency alert is transmitted to the monitoring center for display within a graphical user interface (GUI) of an alarm handling application accessible by the monitoring center in response to the emergency alert being determined to be unverified. In some embodiments, the emergency alert is transmitted to the monitoring center for display within a graphical user interface (GUI) of the monitoring center portal in response to the emergency alert being determined to be unverified. In some embodiments, the two-way text-based communication session is facilitated through the monitoring center portal. In some embodiments, the at least one processor is further operative to provide an update regarding the digital emergency service request to the monitoring center or the ESP through the two-way text-based communication session. In some embodiments, the at least one processor is further operative to provide information regarding the digital emergency service request to a computer aided dispatch (CAD) system accessible by the ESP. In some embodiments, the information regarding the digital emergency service request comprises contents from the two-way text-based communication session. In some embodiments, the information regarding the digital emergency service request is provided to the CAD system in response to a selection of a button within the GUI of the emergency response application. In some embodiments, the button within the GUI of the emergency response application is a push to CAD button. In some embodiments, the information regarding the digital emergency service request is provided to the CAD system in response to a query received from the CAD system by the EMS. In some embodiments, the EMS receives regular and periodic queries from the CAD system. In some embodiments, an emergency alert is associated with the alarm data and wherein the emergency alert must be verified before transmitting to the ESP. In some embodiments, an "appropriate ESP" is determined for the digital service request, wherein the appropriate ESP has: i) authoritative jurisdiction over the alarm location, ii) capability to receive and process the digital service request including the type and severity of the emergency, and iii) an active and persistent communication link.

In another aspect, disclosed herein is an emergency management system (EMS) configured for providing emergency response assistance, the EMS communicatively coupled to a plurality of emergency service providers (ESPs) and comprising a memory, a network component, and at least one processor, operatively coupled to the network component, the at least one processor operative to: a) receive an emergency alert generated by an electronic device; b) perform verification on the emergency alert; and c) in response to being unable to verify the emergency alert: i) transmit the unverified emergency alert to a monitoring center; ii) transmit the digital emergency service request for the unverified emergency alert to an emergency service provider (ESP); and iii) facilitate a two-way text-based communication session between the monitoring center and the ESP.

In another aspect, disclosed herein is non-transitory computer readable storage medium comprising instructions executable by a processor to create an emergency management system (EMS) software application configured to perform steps comprising: a) receiving an emergency alert generated by an electronic device; b) performing verification on the emergency alert; and c) in response to being unable to verify the emergency alert: i) transmitting the unverified emergency alert to a monitoring center; ii) transmitting the digital emergency service request for the unverified emergency alert to an emergency service provider (ESP); and iii) facilitating a two-way text-based communication session between the monitoring center and the ESP.

In another aspect, disclosed herein is a method for providing emergency assistance by an emergency management system (EMS), the method comprising: a) receiving an emergency alert generated by an electronic device; b) performing verification on the emergency alert; and c) in response to being unable to verify the emergency alert: i) transmitting the unverified emergency alert to a monitoring center; ii) transmitting the digital emergency service request for the unverified emergency alert to an emergency service provider (ESP); and iii) facilitating a two-way text-based communication session between the monitoring center and the ESP.

In some embodiments, the emergency alert comprises an emergency location and wherein transmitting the emergency alert to the monitoring center comprises: a) retrieving a plurality of geofences associated with a plurality of monitoring centers; b) determining that the emergency location is within a first geofence associated with the monitoring center from the plurality of monitoring centers; and c) transmitting the emergency alert to the monitoring center in response to determining that the emergency location is within the first geofence associated with the monitoring center. In some embodiments, the emergency alert comprises an emergency location and wherein transmitting the emergency service request to the ESP comprises: retrieving a plurality of geofences associated with a plurality of emergency service providers (ESPs); determining that the emergency location is within a first geofence associated with the ESP from the plurality of ESPs; and transmitting the emergency service request to the ESP in response to determining that the emergency location is within the first geofence associated with the ESP. In some embodiments, further comprising: detecting an active communication link established between the EMS and the ESP; transmitting the digital emergency service request to the first ESP in response to detecting the active communication link established between the EMS and the ESP and determining that the alarm location is within the first geofence associated with the first ESP. In some embodiments, further comprising displaying the emergency service request within a graphical user interface (GUI) of an emergency response application accessible by the ESP and wherein the active communication link is established through the emergency response application. In some embodiments, further comprising, in response to being unable to verify the emergency alert, displaying the emergency service request within a graphical user interface (GUI) of an emergency response application accessible by the ESP. In some embodiments, the two-way text-based communication session is facilitated through the GUI of the emergency response application. In some embodiments, further comprising, in response to being unable to verify the emergency alert, displaying the emergency alert within a graphical user interface (GUI) of an alarm handling application accessible by the monitoring center. In some embodiments, further comprising, in response to being unable to verify the emergency alert, displaying the emergency alert within a graphical user interface (GUI) of a monitoring center portal. In some embodiments, the two-way text-based communication session is facilitated through the monitoring center portal. In some embodiments, further comprising providing an update regarding the emergency service request to the monitoring center or the ESP through the two-way text-based communication session. In some embodiments, further comprising providing information regarding the digital emergency service request to a computer aided dispatch (CAD) system accessible by the ESP. In some embodiments, the information regarding the digital emergency service request comprises contents from the two-way text-based communication session. In some embodiments, the information regarding the digital emergency service request is provided to the CAD system in response to a selection of a button within the GUI of the emergency response application. In some embodiments, the button within the GUI of the emergency response application is a push to CAD button. In some embodiments, the information regarding the digital emergency service request is provided to the CAD system in response to a query received from the CAD system by the EMS. In some embodiments, the EMS receives regular and periodic queries from the CAD system.

In one aspect, provided herein is a method for providing emergency assistance by an emergency management system, the method comprising: a) providing an emergency response application to a monitoring center, wherein the emergency response application is a web application accessed by the computing device at the monitoring center using an internet browser; b) receiving an emergency data request associated with an emergency alert from the monitoring center through the emergency response application; c) gathering emergency data associated with the emergency alert; d) transmitting the emergency data associated with the emergency alert to the monitoring center; and e) displaying the emergency data associated with the emergency alert within the emergency response application.

In some embodiments, the emergency data associated with the emergency alert is gathered from one or more electronic devices associated with the emergency alert. In some embodiments, the emergency alert is generated by a home security device; and the emergency data associated with the emergency alert is gathered from the home security device. In some embodiments, the emergency alert is generated by a home security device; and the emergency data associated with the emergency alert is gathered from one or more electronic devices associated with the home security device. In some embodiments, the emergency data associated with the emergency alert includes one of sensor data, multimedia feeds, and available device information. In some embodiments, the emergency data request is a geospatial query submitted through a graphical user interface (GUI) of the emergency response application. In some embodiments, the geospatial query is submitted through an interactive map within the GUI of the emergency response application. In some embodiments, the emergency data associated with the emergency alert comprises available sensors within a radius defined by the geospatial query. In some embodiments, the method further comprises receiving the emergency alert, wherein the emergency alert is generated by and received from a home security device and the emergency data request comprises an identifier of the emergency alert. In some embodiments, the emergency data associated with the emergency alert is gathered using the identifier of the emergency alert. In some embodiments, the emergency data request is manually executed through a graphical user interface (GUI) of the emergency response application. In some embodiments, the emergency data request is automatically transmitted to the emergency management system through the emergency response application in response to the emergency response application detecting an emergency alert received by the monitoring center.

In another aspect, provided herein is a method for providing emergency assistance by an emergency management system, the method comprising: a) receiving emergency data associated with an emergency alert from a monitoring center, wherein the emergency data comprises a location associated with the emergency alert; b) retrieving a plurality of geofences associated with a plurality of ESPs; c) determining that the location associated with the emergency alert is within a geofence associated with a first ESP from the plurality of ESPs; and d) in response to determining that the location associated with the emergency alert is within the geofence associated with the first ESP: i) transmitting the emergency data to the first ESP; and ii) displaying the emergency data through an emergency response application executed on a computing device at the first ESP.

In some embodiments, the emergency data associated with the emergency alert is transmitted from the monitoring center to the EMS in response to selection made within a graphical user interface (GUI) of a call handling application executed on a second computing device at the monitoring center. In some embodiments, the method further comprises providing the emergency response application to the first ESP, wherein the emergency response application is a web application accessed by the computing device at the first ESP using an internet browser. In some embodiments, the emergency data associated with the emergency alert further comprises one or more emergency contacts associated with the emergency alert; and the method further comprises: i) in response to receiving the emergency data associated with the emergency alert, delivering a verification inquiry to the one or more emergency contacts associated with the emergency alert; receiving verification of the emergency alert from the one or more emergency contacts associated with the emergency alert; and ii) in response to receiving verification of the emergency alert, transmitting indication of the verification to the monitoring center or the first ESP. In some embodiments, the verification inquiry comprises a voice over internet protocol (VOIP) call and the verification comprises a verbal or push-button response from the one or more emergency contacts during the VOIP call. In some embodiments, the verification inquiry comprises a first text message and the verification comprise a second sent from the one or more emergency contacts in response to the first text message. In some embodiments, the verification inquiry comprises a push notification and the verification comprises a selection of the push notification by the one or more emergency contacts. In some embodiments, the emergency response application comprises a graphical user interface (GUI) comprising two sections: i) a first section comprising a list of incidents; and ii) a second section comprising an interactive map; and displaying the emergency data through the emergency response application comprises: i) displaying a first incident associated with the emergency alert within the list of incidents; and ii) displaying the location associated with the emergency alert as a first incident location within the interactive map. In some embodiments, the emergency data associated with the emergency alert further comprises an alarm code; and the first incident displayed within the list of incidents includes the alarm code, the first location, and a time at which the emergency alert was generated. In some embodiments, the method further comprises: a) receiving second emergency data associated with a second emergency alert from the monitoring center, wherein the second emergency data comprises a second location associated with the second emergency alert; b) determining that the second location associated with the second emergency alert is within the geofence associated with the first ESP; and c) in response to determining that the second location associated with the second emergency service is within the geofence associated with the first ESP: i) transmitting the second emergency data to the first ESP; ii) displaying a second incident associated with the second emergency alert within the list of incidents; and iii) displaying the second location associated with the second emergency alert as a second incident location within the interactive map. In some embodiments, the method further comprises: a) receiving second emergency data associated with a second emergency alert from a second monitoring center, wherein the second emergency data comprises a second location associated with the second emergency alert; b) determining that the second location associated with the second emergency alert is within the geofence associated with the first ESP; and c) in response to determining that the second location associated with the second emergency service is within the geofence associated with the first ESP: i) transmitting the second emergency data to the first ESP; ii) displaying a second incident associated with the second emergency alert within the list of incidents; and iii) displaying the second location associated with the second emergency alert as a second incident location within the interactive map. In some embodiments, the method further comprises: a) gathering additional emergency data associated with the emergency alert; b) receiving selection of the first incident associated with the emergency alert within the list of incidents; and c) in response to receiving selection of the first incident associated with the emergency alert within the list of incidents, displaying the additional data associated with the emergency alert within the GUI. In some embodiments, the method further comprises: a) gathering additional emergency data associated with the emergency alert; b) receiving selection of the first incident location within the interactive map; and c) in response to receiving selection of the first incident location within the interactive map, displaying the additional emergency data within the GUI. In some embodiments, the additional emergency data comprises at least one of location, alarm zone, alarm type, premise type, and emergency contacts. In some embodiments, the selection of the first incident location comprises clicking on or hovering over the first incident location within the interactive map. In some embodiments, the method further comprises: a) receiving credentials associated with an account of an ESP personnel through the emergency response application at the computing device; b) identifying an ESP ID associated with the account of the ESP personnel; and c) determining that the geofence associated with the first ESP is associated with the ESP ID. In some embodiments, the first ESP is a public safety answering point (PSAP) and the geofence associated with the first ESP is an authoritative jurisdiction of the PSAP. In some embodiments, the geofence associated with the first ESP comprises a GIS file. In some embodiments, the geofence associated with the first ESP comprises a GeoJSON, a KML, or a shapefile.

In another aspect, provided herein is a method for providing emergency assistance by an emergency management system, the method comprising: a) receiving credentials associated with an account of an ESP personnel through an emergency response application executed on a computing device associated with a first ESP; b) identifying an ESP ID associated with the account of the ESP personnel; c) receiving emergency data associated with an emergency alert from a monitoring center, wherein the emergency data comprises a location associated with the emergency alert; d) retrieving a plurality of geofences associated with a plurality of ESP IDs associated with a plurality of ESPs; e) determining that the location associated with the emergency alert is within a geofence associated with the ESP ID associated with the account of the ESP personnel; and f) in response to determining that the location associated with the emergency alert is within the geofence associated with the ESP ID associated with the account of the ESP personnel: i) transmitting the emergency data to the first ESP; and ii) displaying the emergency data through the emergency response application executed on the computing device at the first ESP.

In another aspect, provided herein is a method for providing emergency assistance by an emergency management system, the method comprising: a) receiving an emergency alert generated by a first electronic device, wherein the emergency alert comprises a location associated with the emergency alert; b) obtaining verification of the emergency alert; c) retrieving a plurality of geofences associated with a plurality of ESPs; d) determining that the location associated with the emergency alert is within a geofence associated with a first ESP from the plurality of ESPs; and e) in response to determining that the location associated with the emergency alert is within the geofence associated with the first ESP, displaying a first emergency service request associated with the emergency alert within a graphical user interface (GUI) of an emergency response application executed on a first computing device at the first ESP; f) receiving a selection to claim the emergency alert through the GUI of the emergency response application; and g) facilitating a text-based communication session between the first ESP and a monitoring center associated with the emergency alert through the GUI of the emergency response application.

In some embodiments, the GUI of the emergency response application comprises two sections: i) a first section comprising a list of emergency service requests; and ii) a second section comprising an interactive map; and displaying the first emergency service request associated with the emergency alert within the GUI of the emergency response application further comprises: i) displaying the first emergency service request within the list of emergency service requests; and ii) displaying the location associated with the emergency alert as a first event location within the interactive map. In some embodiments, the list of emergency service requests includes a plurality of emergency service requests; and the plurality of emergency service requests is prioritized by time received or urgency. In some embodiments, the method further comprises providing the emergency response application to the first ESP, wherein the emergency response application is a web application accessed by the computing device at the first ESP using an internet browser. In some embodiments, the emergency response application is accessed by a plurality of computing devices at the first ESP; and the method further comprises: i) displaying the first emergency service request through the GUI of the emergency response application at each of the computing devices within the plurality of computing devices at the first ESP; and ii) in response to receiving the selection to claim the emergency alert, marking the emergency service request as claimed within the GUI of the emergency response application at each of the computing devices within the plurality of computing devices at the first ESP. In some embodiments, the method further comprises: a) receiving a selection to resolve the emergency alert; and b) in response to receiving the selection to resolve the emergency alert: i) transmitting a summary of the emergency alert to a computer aided dispatch (CAD) system or record management system (RMS) at the first ESP; and ii) removing the first emergency service request from the GUI of the emergency response application. In some embodiments, the emergency alert further comprises an alarm code; and the first emergency service request displayed within the GUI of the emergency response application includes the alarm code, the first location, and a time at which the emergency alert was generated. In some embodiments, the method further comprises: in response to determining that the location associated with the emergency alert is within the geofence associated with the first ESP: i) transmitting emergency data associated with the emergency alert to the first ESP; and ii) displaying the emergency data associated with the emergency alert through the GUI of the emergency response application. In some embodiments, the emergency alert comprises the emergency data. In some embodiments, the emergency data comprises at least one of unique ID, status, keyholder name, victim name, timestamp, source, source type, vendor, number of alarms. In some embodiments, the verification of the emergency alert is received from the monitoring center. In some embodiments, the emergency alert comprises further comprises one or more emergency contacts associated with the emergency alert; and obtaining verification of the emergency alert further comprises: i) delivering a verification inquiry to the one or more emergency contacts associated with the emergency alert; and ii) receiving verification of the emergency alert from the one or more emergency contacts associated with the emergency alert. In some embodiments, the verification inquiry comprises a voice over internet protocol (VOIP) call and the verification comprises a verbal or push-button response from the one or more emergency contacts during the VOIP call. In some embodiments, the verification inquiry comprises a first text message and the verification comprises a second sent from the one or more emergency contacts in response to the first text message. In some embodiments, the verification inquiry comprises a push notification and the verification comprises a selection of the push notification by the one or more emergency contacts. In some embodiments, the verification of the emergency alert is received from the first electronic device. In some embodiments, obtaining verification of the emergency alert comprises: a) accessing a database of emergency alerts, wherein each entry in the database of emergency alerts includes a source and a verification status; b) querying the database of emergency alerts for each entry in which the source is the electronic device; c) for the entries in which the source is the electronic device, calculating an average of the verification statuses; d) comparing the average of the verification statuses to a predefined threshold; and e) verifying the emergency alert if the average of the verification statuses meets or exceeds the predefined threshold. In some embodiments, obtaining verification of the emergency alert comprises: a) accessing a multimedia feed from a second electronic device associated with the first electronic device; b) detecting an indication of a person in the multimedia feed; and c) in response to detecting the indication of a person in the multimedia feed, verifying the emergency alert. In some embodiments, the multimedia feed is an audio or video feed. In some embodiments, obtaining verification of the emergency alert comprises: a) gathering contextual data associated with the emergency alert; and b) applying an algorithm to the contextual data. In some embodiments, the contextual data includes one of weather, historic emergency alerts, concurrent emergency alerts, infrastructural data, and multimedia.

In another aspect, provided herein is a method for providing emergency assistance by an emergency management system, the method comprising: a) receiving an emergency alert generated by a first electronic device, wherein the emergency alert comprises a location associated with the emergency alert; b) retrieving a plurality of geofences associated with a plurality of ESPs; c) determining that the location associated with the emergency alert is within a geofence associated with a first ESP from the plurality of ESPs; d) in response to determining that the location associated with the emergency alert is within the geofence associated with the first ESP, displaying a first emergency service request associated with the emergency alert within a graphical user interface (GUI) of an emergency response application executed on a first computing device at the first ESP; e) receiving a selection to claim the emergency alert through the GUI of the emergency response application; f) receiving a selection to resolve the emergency alert through the GUI of the emergency response application; and g) in response to receiving the selection to resolve the emergency alert, transmitting a summary of the emergency alert to a computer aided dispatch (CAD) system or record management system (RMS) at the first ESP.

In one aspect, disclosed herein is a method for providing emergency assistance by an emergency management system, the method comprising: (a) receiving emergency data associated with an automatic alarm from a monitoring center, wherein the emergency data comprises a location associated with the automatic alarm; (b) accessing a plurality of geofences associated with a plurality of ESPs; (c) determining if the location associated with the automatic alarm is within a first geofence associated with a first ESP from the plurality of ESPs; and (d) in response to determining that the location associated with the automatic alarm is within the first geofence associated with the first ESP: (i) providing the emergency data to an ESP user associated with the first ESP; and (ii) displaying the emergency data on a computing device of the ESP user.

In some embodiments, the emergency data associated with the automatic alarm is transmitted from the monitoring center to the EMS in response to selection made within a graphical user interface (GUI) of an alarm handling application executed on a computing device at the monitoring center. In some embodiments, the method further comprises providing an emergency response application to the first ESP, wherein the emergency response application is configured for displaying the emergency data on the computing device of the ESP user. In some embodiments, the emergency response application is a web application accessible by the computing device at the first ESP using an internet browser. In some embodiments, the emergency response application is configured to display a layout of a building associated with the location of the automatic alarm. In some embodiments, the method further comprises: (a) receiving credentials associated with an account of the ESP user through the emergency response application at the computing device; (b) identifying an ESP ID associated with the account of the ESP user; and (c) determining that the geofence associated with the first ESP is associated with the ESP ID. In some embodiments: (a) wherein the emergency response application comprises a graphical user interface (GUI) comprising: (i) a first section comprising a list of incidents, wherein incidents are verified automatic alarms; and (ii) a second section comprising an interactive map; and (b) wherein displaying the emergency data through the emergency response application comprises: (i) displaying a first incident comprising the automatic alarm within the list of incidents; and (ii) displaying the location associated with the automatic alarm as a first incident location within the interactive map. In some embodiments: (a) wherein the emergency data associated with the automatic alarm further comprises an alarm code; and (b) wherein the first incident displayed within the list of incidents comprises the alarm code, the first location, and a time at which the automatic alarm was generated. In some embodiments, the method further comprises: (a) receiving second emergency data associated with a second automatic alarm from the monitoring center, wherein the second emergency data comprises a second location associated with the second automatic alarm; (b) determining that the second location associated with the second automatic alarm is within the geofence associated with the first ESP; and (c) in response to determining that the second location associated with the second emergency service is within the geofence associated with the first ESP: (i) transmitting the second emergency data to the first ESP; (ii) displaying a second incident associated with the second automatic alarm within the list of incidents; and (iii) displaying the second location associated with the second automatic alarm as a second incident location within the interactive map. In some embodiments, the method further comprises: (a) receiving second emergency data associated with a second automatic alarm from a second monitoring center, wherein the second emergency data comprises a second location associated with the second automatic alarm; (b) determining that the second location associated with the second automatic alarm is within the geofence associated with the first ESP; and (c) in response to determining that the second location associated with the second emergency service is within the geofence associated with the first ESP: (i) transmitting the second emergency data to the first ESP; (ii) displaying a second incident associated with the second automatic alarm within the list of incidents; and (iii) displaying the second location associated with the second automatic alarm as a second incident location within the interactive map. In some embodiments, the method further comprises: (a) gathering additional emergency data associated with the automatic alarm; (b) receiving selection of the first incident associated with the automatic alarm within the list of incidents; and (c) in response to receiving selection of the first incident associated with the automatic alarm within the list of incidents, displaying the additional data associated with the automatic alarm within the GUI. In some embodiments, the method further comprises: (a) gathering additional emergency data associated with the automatic alarm; (b) receiving selection of the first incident location within the interactive map; and (c) in response to receiving selection of the first incident location within the interactive map, displaying the additional emergency data within the GUI. In some embodiments, the selection of the first incident location comprises clicking on or hovering over the first incident location within the interactive map. In some embodiments, the emergency data associated with the automatic alarm further comprises the one or more emergency contacts associated with the automatic alarm, and the method further comprises: (a) in response to receiving the emergency data associated with the automatic alarm, initiating a verification inquiry to one or more emergency contacts associated with the automatic alarm; (b) receiving a verification of the emergency from the one or more emergency contacts associated with the automatic alarm; and (c) in response to receiving the verification of the emergency, transmitting an indication of the verification to the monitoring center or the first ESP. In some embodiments, the verification is a user confirmation of the emergency. In some embodiments, the verification inquiry comprises a voice over internet protocol (VOIP) call and the verification comprises a verbal or push-button response from the one or more emergency contacts during the VOIP call. In some embodiments, the verification inquiry comprises a first text message and the verification comprises a second text message sent from the one or more emergency contacts in response to the first text message. In some embodiments, the verification inquiry comprises a push notification and the verification comprises a selection of the push notification by the one or more emergency contacts. In some embodiments, the first ESP is a public safety answering point (PSAP) and the geofence associated with the first ESP is an authoritative jurisdiction of the PSAP. In some embodiments, the geofence associated with the first ESP comprises a GIS file. In some embodiments, the geofence associated with the first ESP comprises a GeoJSON, a KML, or a shapefile. In some embodiments, in response to determining that the location associated with the automatic alarm is not within the first geofence associated with the first ESP, the method further comprises: (a) identifying a second ESP from the plurality of ESPs, wherein the second ESP has a second geofence encompassing the location associated with the automatic alarm; (b) providing the emergency data to an ESP user associated with the second ESP; and (c) displaying the emergency data on a computing device of the ESP user associated with the second ESP. In some embodiments, the emergency data comprises sensor data. In some embodiments, the sensor data comprises physiological sensor data, environmental sensor data, or both. In some embodiments, physiological sensor data comprises heart rate, blood oxygen level, blood carbon dioxide level, blood pressure, blood sugar level, body temperature, respiration rate, physical activity, or any combination thereof. In some embodiments, the environmental sensor data comprises light, motion, temperature, pressure, humidity, vibration, magnetic field, sound, smoke, carbon monoxide, radiation, hazardous chemicals, acid, base, reactive compounds, volatile organic compounds, smog, or any combination thereof. In some embodiments, the sensor data is compiled from at least one sensor associated with the automatic alarm. In some embodiments, the at least one sensor comprises a gyroscope, an accelerometer, a thermometer, a heart rate sensor, a barometer, a hematology analyzer, a motion sensor, or any combination thereof. In some embodiments, the at least one sensor comprises a motion sensor, a window or door sensor, a security camera, a glass break detector, or any combination thereof.

In another aspect, disclosed herein is a computer-implemented system comprising: (a) a network server comprising one or more processors; and (b) an emergency management system (EMS) executed on the network server and configured to perform steps comprising: (a) receiving emergency data associated with an automatic alarm from a monitoring center, wherein the emergency data comprises a location associated with the automatic alarm; (b) accessing a plurality of geofences associated with a plurality of ESPs; (c) determining if the location associated with the automatic alarm is within a first geofence associated with a first ESP from the plurality of ESPs; and (d) in response to determining that the location associated with the automatic alarm is within the first geofence associated with the first ESP: (i) providing the emergency data to an ESP user associated with the first ESP; and (ii) displaying the emergency data on a computing device of the ESP user.

In another aspect, disclosed herein is non-transitory computer readable storage medium comprising instructions executable by a processor to create an emergency management system (EMS) software application configured to perform steps comprising: (a) receiving emergency data associated with an automatic alarm from a monitoring center, wherein the emergency data comprises a location associated with the automatic alarm; (b) accessing a plurality of geofences associated with a plurality of ESPs; (c) determining if the location associated with the automatic alarm is within a first geofence associated with a first ESP from the plurality of ESPs; and (d) in response to determining that the location associated with the automatic alarm is within the first geofence associated with the first ESP: (i) providing the emergency data to an ESP user associated with the first ESP; and (ii) displaying the emergency data on a computing device of the ESP user.

In another aspect, disclosed herein is a method for providing emergency assistance by an emergency management system, the method comprising: (a) receiving credentials associated with an account of an ESP user through an emergency response application executed on a computing device associated with a first ESP; (b) identifying an ESP ID associated with the account of the ESP personnel; (c) receiving emergency data associated with an automatic alarm from a monitoring center, wherein the emergency data comprises a location associated with the automatic alarm; (d) retrieving a plurality of geofences associated with a plurality of ESP IDs associated with a plurality of ESPs; (e) determining that the location associated with the automatic alarm is within a geofence associated with the ESP ID associated with the account of the ESP personnel; and (f) in response to determining that the location associated with the automatic alarm is within the geofence associated with the ESP ID associated with the account of the ESP personnel: (i) transmitting the emergency data to the first ESP; and (ii) displaying the emergency data through the emergency response application executed on the computing device for the ESP user.

In another aspect, disclosed herein is a computer-implemented system comprising: (a) a network server comprising one or more processors; and (b) an emergency management system (EMS) executed on the network server and configured to perform steps comprising: (a) receiving credentials associated with an account of an ESP user through an emergency response application executed on a computing device associated with a first ESP; (b) identifying an ESP ID associated with the account of the ESP personnel; (c) receiving emergency data associated with an automatic alarm from a monitoring center, wherein the emergency data comprises a location associated with the automatic alarm; (d) retrieving a plurality of geofences associated with a plurality of ESP IDs associated with a plurality of ESPs; (e) determining that the location associated with the automatic alarm is within a geofence associated with the ESP ID associated with the account of the ESP personnel; and (f) in response to determining that the location associated with the automatic alarm is within the geofence associated with the ESP ID associated with the account of the ESP personnel: (i) transmitting the emergency data to the first ESP; and (ii) displaying the emergency data through the emergency response application executed on the computing device for the ESP user.

In another aspect, disclosed herein is non-transitory computer readable storage medium comprising instructions executable by a processor to create an emergency management system (EMS) software application configured to perform steps comprising: (a) receiving credentials associated with an account of an ESP user through an emergency response application executed on a computing device associated with a first ESP; (b) identifying an ESP ID associated with the account of the ESP personnel; (c) receiving emergency data associated with an automatic alarm from a monitoring center, wherein the emergency data comprises a location associated with the automatic alarm; (d) retrieving a plurality of geofences associated with a plurality of ESP IDs associated with a plurality of ESPs; (e) determining that the location associated with the automatic alarm is within a geofence associated with the ESP ID associated with the account of the ESP personnel; and (f) in response to determining that the location associated with the automatic alarm is within the geofence associated with the ESP ID associated with the account of the ESP personnel: (i) transmitting the emergency data to the first ESP; and (ii) displaying the emergency data through the emergency response application executed on the computing device for the ESP user.

In another aspect, disclosed herein is a method for providing emergency assistance to a monitoring center by an emergency management system, the method comprising: (a) receiving an automatic alarm generated by a first electronic device, wherein the automatic alarm comprises a location associated with the automatic alarm; (b) obtaining a verification of the automatic alarm, wherein the automatic alarm comprises an emergency incident; (c) retrieving a plurality of geofences associated with a plurality of ESPs; (d) determining that the location associated with the automatic alarm is within a geofence associated with a first ESP from the plurality of ESPs; and (e) in response to determining that the location associated with the automatic alarm is within the geofence associated with the first ESP, displaying a first emergency service request associated with the automatic alarm on a first computing device of an ESP user at the first ESP; (f) receiving a selection to claim the automatic alarm by the ESP user; and (g) facilitating a text-based communication session between the first ESP and a monitoring center associated with the automatic alarm.

In another aspect, disclosed herein is a computer-implemented system comprising: (a) a network server comprising one or more processors; and (b) an emergency management system (EMS) executed on the network server and configured to perform steps comprising: (a) receiving an automatic alarm generated by a first electronic device, wherein the automatic alarm comprises a location associated with the automatic alarm; (b) obtaining a verification of the automatic alarm, wherein the automatic alarm comprises an emergency incident; (c) retrieving a plurality of geofences associated with a plurality of ESPs; (d) determining that the location associated with the automatic alarm is within a geofence associated with a first ESP from the plurality of ESPs; and (e) in response to determining that the location associated with the automatic alarm is within the geofence associated with the first ESP, displaying a first emergency service request associated with the automatic alarm on a first computing device of an ESP user at the first ESP; (f) receiving a selection to claim the automatic alarm by the ESP user; and (g) facilitating a text-based communication session between the first ESP and a monitoring center associated with the automatic alarm.

In another aspect, disclosed herein is non-transitory computer readable storage medium comprising instructions executable by a processor to create an emergency management system (EMS) software application configured to perform steps comprising: (a) receiving an automatic alarm generated by a first electronic device, wherein the automatic alarm comprises a location associated with the automatic alarm; (b) obtaining a verification of the automatic alarm, wherein the automatic alarm comprises an emergency incident; (c) retrieving a plurality of geofences associated with a plurality of ESPs; (d) determining that the location associated with the automatic alarm is within a geofence associated with a first ESP from the plurality of ESPs; and (e) in response to determining that the location associated with the automatic alarm is within the geofence associated with the first ESP, displaying a first emergency service request associated with the automatic alarm on a first computing device of an ESP user at the first ESP; (f) receiving a selection to claim the automatic alarm by the ESP user; and (g) facilitating a text-based communication session between the first ESP and a monitoring center associated with the automatic alarm.

In some embodiments: (a) a GUI of the emergency response application on the first computing device comprises two sections: (i) a first section comprising a list of emergency service requests; and (ii) a second section comprising an interactive map; and (b) displaying the first emergency service request associated with the automatic alarm within the GUI of the emergency response application further comprises: (i) displaying the first emergency service request within the list of emergency service requests; and (ii) displaying the location associated with the automatic alarm as a first event location within the interactive map. In some embodiments, the list of emergency service requests is prioritized by time received, emergency type or severity. In some embodiments, the method or steps further comprises providing an emergency response application to the first ESP, wherein the emergency response application is a web application accessed by the computing device at the first ESP using an internet browser. In some embodiments. (a) an emergency response application is accessed by a plurality of computing devices at the first ESP; and (b) the method further comprises: (i) displaying the first emergency service request through the GUI of the emergency response application at each of the computing devices within the plurality of computing devices at the first ESP; and (ii) in response to receiving the selection to claim the automatic alarm, marking the emergency service request as claimed within the GUI of the emergency response application at each of the computing devices within the plurality of computing devices at the first ESP. In some embodiments, the method or steps further comprises: (a) receiving a selection to resolve the automatic alarm; and (b) in response to receiving the selection to resolve the automatic alarm: (i) transmitting a summary of the automatic alarm to a computer aided dispatch (CAD) system or record management system (RMS) at the first ESP; and (ii) removing the first emergency service request from the GUI of the emergency response application. In some embodiments. (a) the automatic alarm further comprises an alarm code; and (b) the first emergency service request displayed within the GUI of the emergency response application includes the alarm code, the first location, and a time at which the automatic alarm was generated. In some embodiments, the method or steps further comprises (a) in response to determining that the location associated with the automatic alarm is within the geofence associated with the first ESP: (i) transmitting emergency data associated with the automatic alarm to the first ESP; and (ii) displaying the emergency data associated with the automatic alarm through the GUI of the emergency response application. In some embodiments, the automatic alarm comprises the emergency data. In some embodiments, the emergency data comprises at least one of unique ID, status, keyholder name, victim name, timestamp, source, source type, vendor, and number of alarms. In some embodiments, the verification of the automatic alarm is received from the monitoring center. In some embodiments: (a) the automatic alarm comprises further comprises one or more emergency contacts associated with the automatic alarm; and (b) obtaining verification of the automatic alarm further comprises: (i) delivering a verification inquiry to the one or more emergency contacts associated with the automatic alarm; and (ii) receiving verification of the automatic alarm from the one or more emergency contacts associated with the automatic alarm. In some embodiments, the verification inquiry comprises a voice over internet protocol (VOIP) call and the verification comprises a verbal or push-button response from the one or more emergency contacts during the VoIP call. In some embodiments, the verification inquiry comprises a first text message and the verification comprises a second sent from the one or more emergency contacts in response to the first text message. In some embodiments, the verification inquiry comprises a push notification and the verification comprises a selection of the push notification by the one or more emergency contacts. In some embodiments, the verification of the automatic alarm is received from the first electronic device. In some embodiments, obtaining verification of the automatic alarm comprises: (a) accessing a database of automatic alarms, wherein each entry in the database of automatic alarms includes a source and a verification status; (b) querying the database of automatic alarms for each entry in which the source is the electronic device; (c) for the entries in which the source is the electronic device, calculating an average of the verification statuses; (d) comparing the average of the verification statuses to a predefined threshold; and (e) verifying the automatic alarm if the average of the verification statuses meets or exceeds the predefined threshold. In some embodiments, obtaining verification of the automatic alarm comprises: (a) accessing a multimedia feed from a second electronic device associated with the first electronic device; (b) detecting an indication of a person in the multimedia feed; and (c) in response to detecting the indication of a person in the multimedia feed, verifying the automatic alarm. In some embodiments, the multimedia feed is an audio or video feed. In some embodiments, obtaining verification of the automatic alarm comprises: (a) gathering contextual data associated with the automatic alarm; and (b) applying an algorithm to the contextual data. In some embodiments, the contextual data includes one of weather, historic automatic alarms, concurrent automatic alarms, infrastructural data, and multimedia.

In another aspect, disclosed herein is a method for providing emergency assistance by an emergency management system, the method comprising: (a) providing an emergency response application to a monitoring center, wherein the emergency response application is a web application accessed by the computing device at the monitoring center using an internet browser; (b) receiving an emergency data request associated with an automatic alarm from the monitoring center through the emergency response application; (c) gathering emergency data associated with the automatic alarm; (d) transmitting the emergency data associated with the automatic alarm to the monitoring center; and (e) displaying the emergency data associated with the automatic alarm within the emergency response application. In some embodiments, the emergency data associated with the automatic alarm is gathered from one or more electronic devices associated with the automatic alarm.

In another aspect, disclosed herein is a computer-implemented system comprising: (a) a network server comprising one or more processors; and (b) an emergency management system (EMS) executed on the network server and configured to perform steps comprising: (a) providing an emergency response application to a monitoring center, wherein the emergency response application is a web application accessed by the computing device at the monitoring center using an internet browser; (b) receiving an emergency data request associated with an automatic alarm from the monitoring center through the emergency response application; (c) gathering emergency data associated with the automatic alarm; (d) transmitting the emergency data associated with the automatic alarm to the monitoring center; and (e) displaying the emergency data associated with the automatic alarm within the emergency response application.

In another aspect, disclosed herein is non-transitory computer readable storage medium comprising instructions executable by a processor to create an emergency management system (EMS) software application configured to perform steps comprising: (a) providing an emergency response application to a monitoring center, wherein the emergency response application is a web application accessed by the computing device at the monitoring center using an internet browser; (b) receiving an emergency data request associated with an automatic alarm from the monitoring center through the emergency response application; (c) gathering emergency data associated with the automatic alarm; (d) transmitting the emergency data associated with the automatic alarm to the monitoring center; and (e) displaying the emergency data associated with the automatic alarm within the emergency response application.

In some embodiments: (a) the automatic alarm is generated by a home security device; and (b) the emergency data associated with the automatic alarm is gathered from the home security device. In some embodiments: (a) the automatic alarm is generated by a home security device; and (b) the emergency data associated with the automatic alarm is gathered from one or more electronic devices associated with the home security device. In some embodiments, the emergency data associated with the automatic alarm includes one of sensor data, multimedia feeds, and available device information. In some embodiments, the emergency data request is a geospatial query submitted through a graphical user interface (GUI) of the emergency response application. In some embodiments, the geospatial query is submitted through an interactive map within the GUI of the emergency response application. In some embodiments, the emergency data associated with the automatic alarm comprises available sensors within a radius defined by the geospatial query. In some embodiments, the method or steps further comprises receiving the automatic alarm, wherein the automatic alarm is generated by and received from a home security device and the emergency data request comprises an identifier of the automatic alarm. In some embodiments, the emergency data associated with the automatic alarm is gathered using the identifier of the automatic alarm. In some embodiments, the emergency data request is manually executed through a graphical user interface (GUI) of the emergency response application. In some embodiments, the emergency data request is automatically transmitted to the emergency management system through the emergency response application in response to the emergency response application detecting an automatic alarm received by the monitoring center.

In another aspect, disclosed herein is a method for providing emergency assistance by an emergency management system, the method comprising: (a) receiving an automatic alarm generated by a first electronic device, wherein the automatic alarm comprises a location associated with the automatic alarm; (b) retrieving a plurality of geofences associated with a plurality of ESPs; (c) determining that the location associated with the automatic alarm is within a geofence associated with a first ESP from the plurality of ESPs; (d) in response to determining that the location associated with the automatic alarm is within the geofence associated with the first ESP, displaying a first emergency service request associated with the automatic alarm for an ESP user on a first computing device at the first ESP; (e) receiving a selection by the ESP user to claim the automatic alarm; (f) receiving a selection by the ESP user to resolve the automatic alarm; and (g) in response to receiving the selection to resolve the automatic alarm, transmitting a summary of the automatic alarm to a computer aided dispatch (CAD) system or record management system (RMS) at the first ESP.

In another aspect, disclosed herein is a computer-implemented system comprising: (a) a network server comprising one or more processors; and (b) an emergency management system (EMS) executed on the network server and configured to perform steps comprising: (a) receiving an automatic alarm generated by a first electronic device, wherein the automatic alarm comprises a location associated with the automatic alarm; (b) retrieving a plurality of geofences associated with a plurality of ESPs; (c) determining that the location associated with the automatic alarm is within a geofence associated with a first ESP from the plurality of ESPs; (d) in response to determining that the location associated with the automatic alarm is within the geofence associated with the first ESP, displaying a first emergency service request associated with the automatic alarm for an ESP user on a first computing device at the first ESP; (e) receiving a selection by the ESP user to claim the automatic alarm; (f) receiving a selection by the ESP user to resolve the automatic alarm; and (g) in response to receiving the selection to resolve the automatic alarm, transmitting a summary of the automatic alarm to a computer aided dispatch (CAD) system or record management system (RMS) at the first ESP.

In another aspect, disclosed herein is non-transitory computer readable storage medium comprising instructions executable by a processor to create an emergency management system (EMS) software application configured to perform steps comprising: (a) receiving an automatic alarm generated by a first electronic device, wherein the automatic alarm comprises a location associated with the automatic alarm; (b) retrieving a plurality of geofences associated with a plurality of ESPs; (c) determining that the location associated with the automatic alarm is within a geofence associated with a first ESP from the plurality of ESPs; (d) in response to determining that the location associated with the automatic alarm is within the geofence associated with the first ESP, displaying a first emergency service request associated with the automatic alarm for an ESP user on a first computing device at the first ESP; (e) receiving a selection by the ESP user to claim the automatic alarm; (f) receiving a selection by the ESP user to resolve the automatic alarm; and (g) in response to receiving the selection to resolve the automatic alarm, transmitting a summary of the automatic alarm to a computer aided dispatch (CAD) system or record management system (RMS) at the first ESP.

In some embodiments, the method or steps further comprises a GUI of an emergency response application, wherein: (a) the GUI of the emergency response application comprises two sections: (i) a first section comprising a list of emergency service requests; and (ii) a second section comprising an interactive map; and (b) wherein displaying the first emergency service request associated with the automatic alarm within the GUI of the emergency response application further comprises: (i) displaying the first emergency service request within the list of emergency service requests; and (ii) displaying the location associated with the automatic alarm as a first event location within the interactive map. In some embodiments: (a) the list of emergency service requests includes a plurality of emergency service requests; and (b) the plurality of emergency service requests is prioritized by time received or urgency. In some embodiments, the method or steps further comprises providing the emergency response application to the first, wherein the emergency response application is a web application accessed by the computing device at the first ESP using an internet browser. In some embodiments: (a) the emergency response application is accessed by a plurality of computing devices at the first ESP; and (b) the method or steps further comprises: (i) displaying the first emergency service request through the GUI of the emergency response application at each of the computing devices within the plurality of computing devices at the first ESP; and (ii) in response to receiving the selection to claim the automatic alarm, marking the emergency service request as claimed within the GUI of the emergency response application at each of the computing devices within the plurality of computing devices at the first ESP. In some embodiments, the method or steps further comprises, in response to receiving the selection to resolve the automatic alarm, removing the first emergency service request from the GUI of the emergency response application. In some embodiments: (a) the automatic alarm further comprises an alarm code; and (b) the first emergency service request displayed within the GUI of the emergency response application includes the alarm code, the first location, and a time at which the automatic alarm was generated. In some embodiments, the method or steps further comprises: (a) in response to determining that the location associated with the automatic alarm is within the geofence associated with the first ESP: (i) gathering emergency data associated with the automatic alarm; (ii) transmitting the emergency data associated with the automatic alarm to the first ESP; and (iii) displaying the emergency data associated with the automatic alarm through the GUI of the emergency response application. In some embodiments, the emergency data comprises at least one of unique ID, status, keyholder name, victim name, timestamp, source, source type, vendor, and number of alarms. In some embodiments, the method or steps further comprises obtaining verification of the automatic alarm, wherein the automatic alarm comprises an emergency incident. In some embodiments: (a) the automatic alarm comprises further comprises one or more emergency contacts associated with the automatic alarm; and (b) obtaining verification of the automatic alarm further comprises: (i) delivering a verification inquiry to the one or more emergency contacts associated with the automatic alarm; and (ii) receiving verification of the automatic alarm from the one or more emergency contacts associated with the automatic alarm. In some embodiments, the verification inquiry comprises a voice over internet protocol (VOIP) call and the verification comprises a verbal or push-button response from the one or more emergency contacts during the VOIP call. In some embodiments, the verification inquiry comprises a first text message and the verification comprises a second sent from the one or more emergency contacts in response to the first text message. In some embodiments, the verification inquiry comprises a push notification and the verification comprises a selection of the push notification by the one or more emergency contacts. In some embodiments, the verification of the automatic alarm is received from the first electronic device. In some embodiments, obtaining verification of the automatic alarm comprises: (a) accessing a database of automatic alarms, wherein each entry in the database of automatic alarms includes a source and a verification status; (b) querying the database of automatic alarms for each entry in which the source is the electronic device; (c) for the entries in which the source is the electronic device, calculating an average of the verification statuses; and (d) comparing the average of the verification statuses to a predefined threshold; and (e) verifying the automatic alarm if the average of the verification statuses meets or exceeds the predefined threshold. In some embodiments, obtaining verification of the automatic alarm comprises: (a) accessing a multimedia feed from a second electronic device associated with the first electronic device; (b) detecting an indication of a person in the multimedia feed; and (c) in response to detecting the indication of a person in the multimedia feed, verifying the automatic alarm. In some embodiments, the multimedia feed is an audio or video feed. In some embodiments, obtaining verification of the automatic alarm comprises: (a) gathering contextual data associated with the automatic alarm; and (b) applying an algorithm to the contextual data. In some embodiments, the contextual data includes one of weather, historic automatic alarms, concurrent automatic alarms, infrastructural data, and multimedia. In some embodiments, the method or steps further comprises facilitating a text-based communication session between the first ESP and a user of the first electronic device through the GUI of the emergency response application. In some embodiments, facilitating the text-based communication session between the first ESP and the user of the first electronic device comprises transmitting one or more text-based messages from the first ESP to the first electronic device through the emergency response application. In some embodiments, facilitating the text-based communication session between the first ESP and the user of the first electronic device comprises displaying one or more text-based messages from the user of the first electronic device within the GUI of the emergency response application.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Disclosed herein are systems, devices, media, and methods for providing enhanced emergency communications including text-based emergency communication sessions between the emergency service provider and a user or caller such as an individual in an emergency situation who is sending an emergency alert or a caller from a monitoring station requesting emergency assistance. The primary communication session can be primarily text-based without a corresponding audio communication session. In addition, enhanced data may be provided to the emergency service provider such as, for example, device-based hybrid locations, sensor data, health and/or demographic information of the person involved in the emergency, and/or other relevant information. Also disclosed herein are alarm handling software providing enhanced graphic user interfaces for engaging in emergency communication sessions. These GUIs can be streamlined to provide critical emergency information in an efficient format for one or more alarms within the jurisdictional authority of the emergency service provider.

Embodiments of the present disclosure take advantage of technological advancements that have allowed for mobile communication devices to generate accurate locations by incorporating multiple technologies embedded in the devices, such as GPS, Wi-Fi, and Bluetooth to create device-based hybrid locations. Device-based hybrid locations are locations calculated on an electronic or communication device, as opposed to locations calculated using a network (e.g., a carrier network). Device-based hybrid locations can be generated using GPS, network-based technologies, Wi-Fi access points, Bluetooth beacons, barometric pressure sensors, dead reckoning using accelerometers and gyrometers, and a variety of crowdsourced and proprietary databases that device operating systems providers are running to enhance location technology. These device-based hybrid locations can be quickly generated during emergency calls.

Furthermore, mobile communication devices (e.g., mobile phones, wearables, IoT devices, smart home devices, vehicle computers, etc.) are often capable of generating or storing additional information that may be useful in responding to emergency situations, such as health data or medical histories. For example, during an emergency, a modern mobile communication device may have access to an implicated person's blood type, preexisting medical conditions, or even the implicated person's current heartrate. In some embodiments, the mobile communication device has access to data from sensors (e.g., health or environmental sensors). For example, a video feed of the emergency via a connected surveillance camera can provide valuable situational awareness regarding the emergency.

Figure 1A:
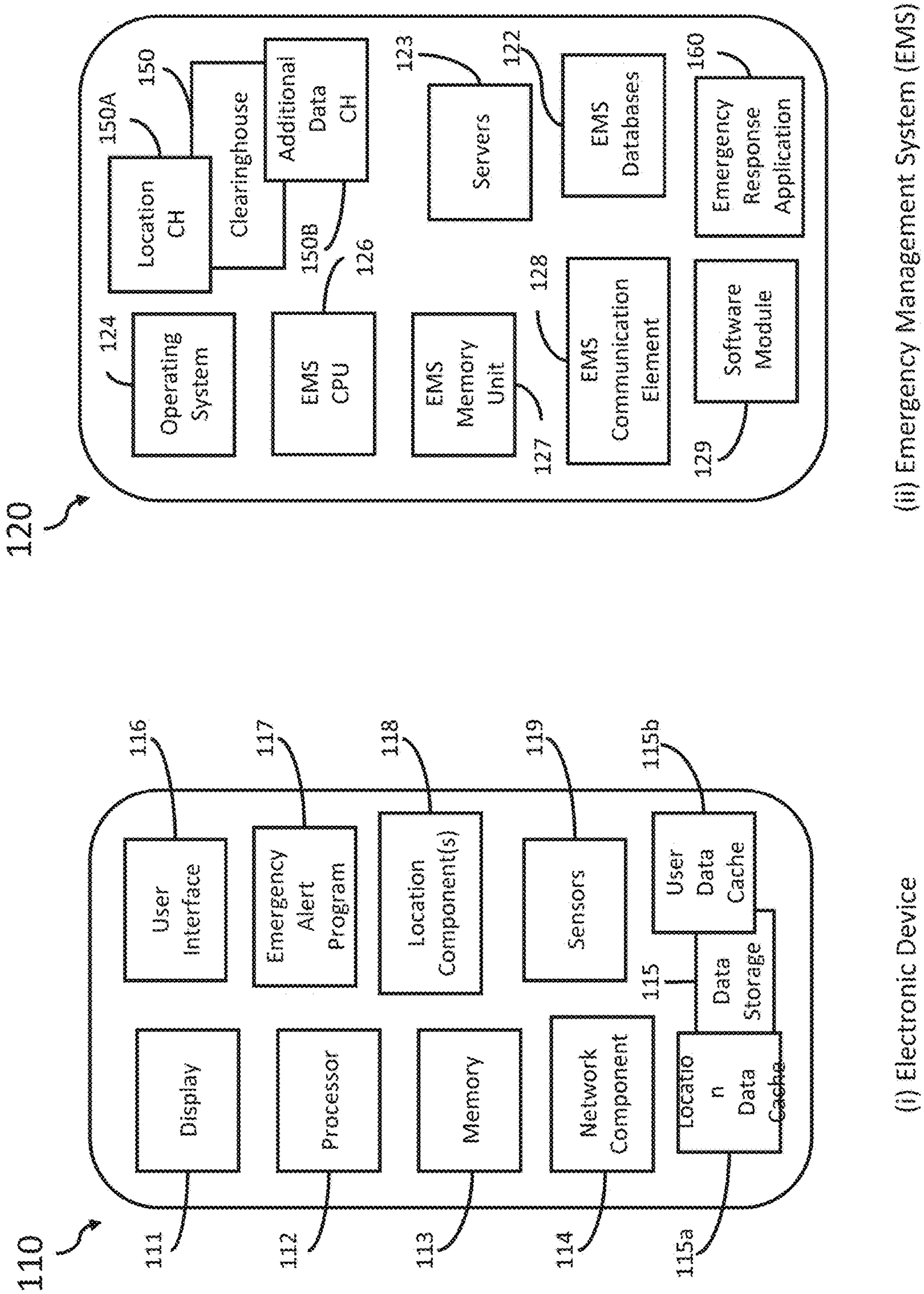
FIG. 1A depicts diagrams of (i) an electronic device and (ii) an emergency management system (EMS) in accordance with one embodiment of the present disclosure.

Electronic Device. Emergency Management System, Emergency Service Provider, and Monitoring Center In various embodiments, disclosed herein are devices, systems, and methods for managing emergency data for emergency response. FIG. 1A depicts diagrams of (i) an electronic device 110 and (ii) an emergency management system (EMS) 120 in accordance with one embodiment of the present invention. In some embodiments, the electronic device 110 is a digital processing device such as a communication device (e.g., mobile or cellular phone, computer, laptop, etc.). In some embodiments, the electronic device is a wearable device (e.g., a smartwatch). In some embodiments, the electronic device is an Internet of Things (IOT) device, such as a home assistant (e.g., an Amazon Echo) or a connected smoke detector (e.g., a Nest Protect smoke and carbon monoxide alarm). In some embodiments, the electronic device is a walkie-talkie or two-way radio.

In some embodiments, the electronic device 110 includes a display 111, a processor 112, a memory 113 (e.g., an EPROM memory, a RAM, or a solid-state memory), a network component 114 (e.g., an antenna and associated components, Wi-Fi adapters, Bluetooth adapters, etc.), a data storage 115, a user interface 116, an emergency alert program 117, one or more location components 118, and one or more sensors 119. In some embodiments, the processor 112 is implemented as one or more microprocessors, microcomputers, microcontrollers, digital signal processors, central processing units, state machines, logic circuitries, and/or devices that manipulate signals based on operational instructions. Among other capabilities, the processor 112 is configured to fetch and execute computer-readable instructions stored in the memory 113.

In some embodiments, the display 111 is part of the user interface 116 (e.g., a touchscreen is both a display and a user interface in that it provides an interface to receive user input or user interactions). In some embodiments, the user interface 116 includes physical buttons such as an on/off button or volume buttons. In some embodiments, the display 111 and/or the user interface 116 comprises a touchscreen (e.g., a capacitive touchscreen), which is capable of displaying information and receiving user input. In some embodiments, the communication device includes various accessories that allow for additional functionality. In some embodiments, these accessories (not shown) include one or more of the following: a microphone, a camera, speaker, a fingerprint scanner, health or environmental sensors, a USB or micro-USB port, a headphone jack, a card reader, a SIM card slot, or any combination thereof. In some embodiments, the one or more sensors include, but are not limited to: a gyroscope, an accelerometer, a thermometer, a heart rate sensor, a barometer, or a hematology analyzer. In some embodiments, the data storage 115 includes a location data cache 115A and a user data cache 115B. In some embodiments, the location data cache 115A is configured to store locations generated by the one or more location components 118.

In some embodiments, the emergency alert program 117 is an emergency response application or emergency response mobile application. In some embodiments, the emergency alert program 117 is configured to record user data, such as a name, address, or medical data of a user associated with the electronic device 110. In some embodiments, the emergency alert program 117 is configured to detect when an emergency request is generated or sent by the electronic device 110 (e.g., when a user uses the electronic device 110 to make an emergency call). In some embodiments, in response to detecting an emergency request generated or sent by the electronic device 110, the emergency alert program is configured to deliver a notification to the EMS 120. In some embodiments, the notification is an HTTP post containing information regarding the emergency request. In some embodiments, the notification includes a location (e.g., a device-based hybrid location) generated by or for the electronic device 110. In some embodiments, in response to detecting an emergency request generated or sent by the electronic device 110, the emergency alert program is configured to deliver user data to the EMS 120.

In some embodiments, as depicted in FIG. 1A, the emergency management system (EMS) 120 includes an EMS operating system 124, an EMS CPU 126, an EMS memory unit 127, an EMS communication element 128, and one or more software modules 129. In some embodiments, the EMS CPU 126 is implemented as one or more microprocessors, microcomputers, microcontrollers, digital signal processors, central processing units, state machines, logic circuitries, and/or devices that manipulate signals based on operational instructions. Among other capabilities, the EMS CPU 126 is configured to fetch and execute computer-readable instructions stored in the EMS memory unit 127. The EMS memory unit 127 optionally includes any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. The EMS memory unit 127 optionally includes modules, routines, programs, objects, components, data structures, etc., which perform particular tasks or implement particular abstract data types.

In some embodiments, the EMS 120 includes one or more EMS databases 122, one or more servers 123, and a clearinghouse 150. In some embodiments, the clearinghouse 150, as described in further detail below, is an input/output (I/O) interface configured to manage communications and data transfers to and from the EMS 120 and external systems and devices. In some embodiments, the clearinghouse 150 includes a variety of software and hardware interfaces, for example, a web interface, a graphical user interface (GUI), and the like. The clearinghouse 150 optionally enables the EMS 120 to communicate with other computing devices, such as web servers and external data servers (not shown). In some embodiments, the clearinghouse 150 facilitates multiple communications within a wide variety of networks and protocol types, including wired networks, for example, LAN, cable, etc., and wireless networks, such as WLAN, cellular, or satellite. In some embodiments, the clearinghouse 150 includes one or more ports for connecting a number of devices to one another or to another server. In some embodiments, the clearinghouse 150 includes one or more sub-clearinghouses, such as location clearinghouse 150A and additional data clearinghouse 150B, configured to manage the transfer of locations and additional data, respectively. In some embodiments, the EMS 120 additionally includes a user information module (e.g., a software module 129) that receives and stores user information (e.g., personal information, demographic information, medical information, location information, etc.) within the EMS 120. In some embodiments, users can submit user information through a website, web application, or mobile application, such as during a registration process for an emergency response application. In some embodiments, when the EMS 120 receives emergency data including user information, such as through an emergency alert received by the clearinghouse 150 (as described below), the EMS 120 stores the user information in the user information module. In some embodiments, user information stored within the user information module is received by the EMS 120 from a third-party server system, as described below. In some embodiments, user information stored within the user information module is associated with an identifier of a user or an electronic device associated with a user, such as a phone number or an email address. In some embodiments, the EMS 120 comprises an emergency response application 160.

Figure 1B:
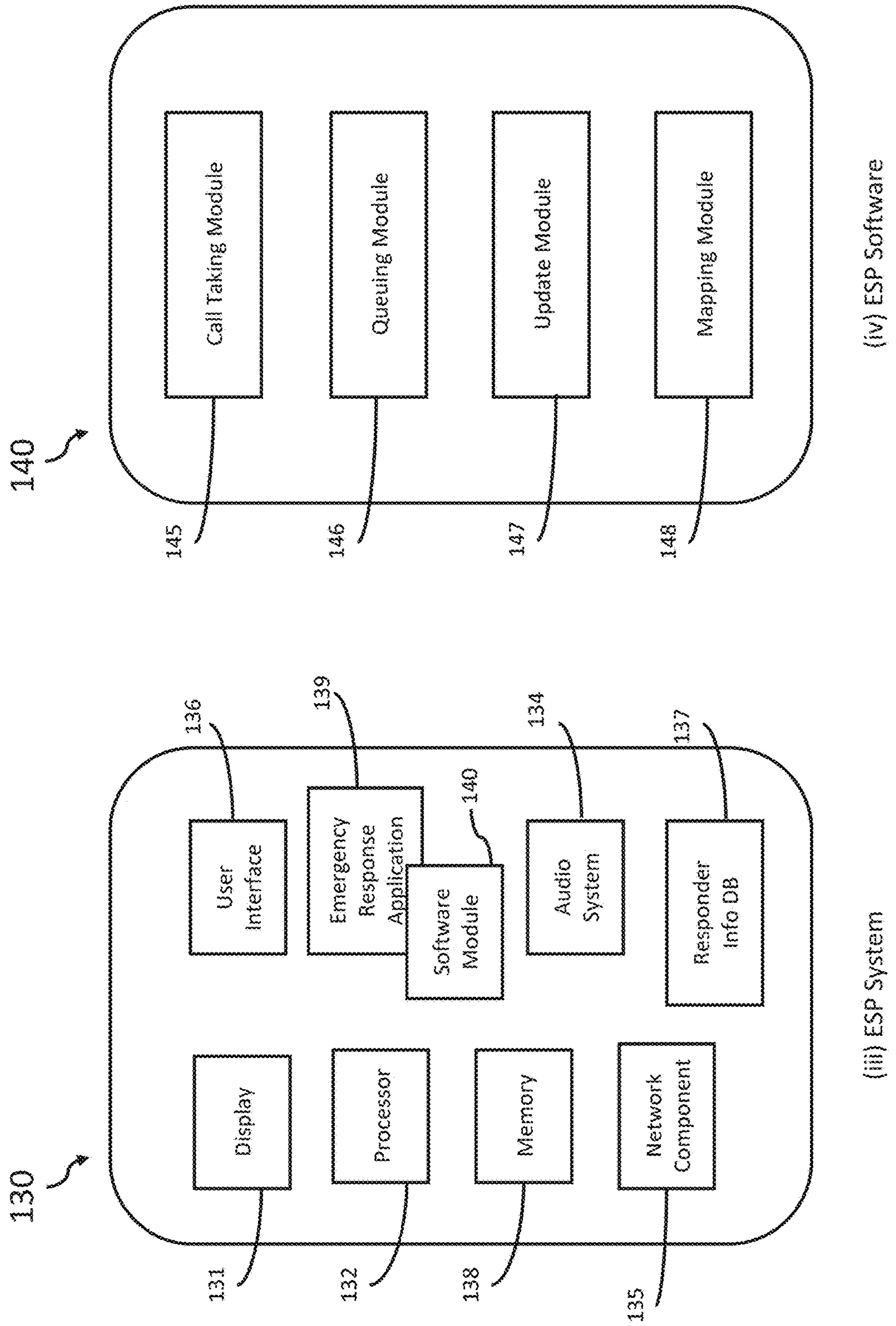
FIG. 1B depicts diagrams of (iii) an emergency service provider (ESP) system and (iv) ESP software in accordance with one embodiment of the present disclosure.

In some embodiments, as depicted in FIG. 1B, an emergency service provider (ESP; e.g., a public safety answering point (PSAP)) system 130 includes one or more of a display 131, a user interface 136, at least one central processing unit or processor 132, a memory 138, a network component 135, an audio system 134 (e.g., microphone, speaker and/or a call-taking headset), and a computer program such as a PSAP Emergency Display Application or Location Display Program (e.g., an Emergency Response Application, CAD program, or calltaking application) 139. In some embodiments, the PSAP application or program 139 comprises one or more software modules 140. In some embodiments, the PSAP system 130 comprises a database of emergency responders 137, such as medical assets, police assets, fire response assets, rescue assets, safety assets, etc.

In some embodiments, as depicted in FIG. 1B, the PSAP application or program 139 installed on a PSAP system 130 comprises a software module 140 that comprises a call taking module 145, a queuing module 146, a supplemental or updated information module 147, a mapping module 148, or any combination thereof. In some embodiments, the PSAP application 139 displays the information on a map (e.g., on the display 131). In some embodiments, location and supplemental information is displayed for emergency service providers (e.g., police, fire, medical, etc.) and/or responders on their devices. It is contemplated that responder devices have optionally installed a responder device program (not shown) similar to PSAP queuing module 146. In some embodiments, the responder device program displays the emergency location on a map.

Figure 1C:
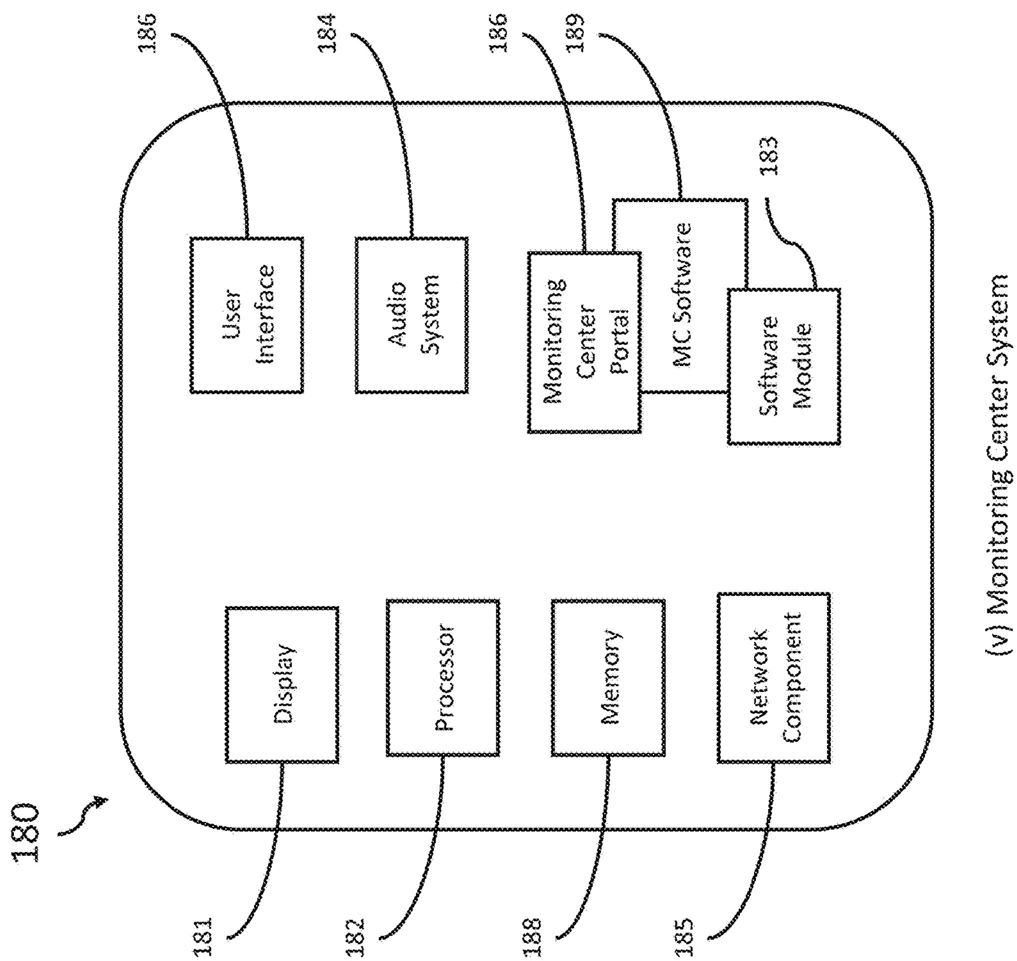
FIG. 1C depicts a diagram of (v) a monitoring center system in accordance with one embodiment of the present disclosure.
Figure 11:
FIG. 11 illustrates an example of an alarm handling application in accordance with one embodiment of the present disclosure.

In some embodiments, as depicted in FIG. 1C, a monitoring center system 180 includes one or more of a display 181, a user interface 186, at least one central processing unit or processor 182, a memory 188, a network component 185, an audio system 184 (e.g., microphone, speaker and/or a call-taking headset), and one or more computer program (e.g., monitoring center software) 189 such as an alarm handling software application (e.g., automation software, as described below with respect to FIG. 11). In some embodiments, the monitoring center software 189 includes a monitoring center portal 187, as described below with respect to FIG. 12. In some embodiments, the monitoring center software includes one or more software modules 183.

Emergency Clearinghouse

In some embodiments, as described above, the emergency management system (EMS) 120 includes a clearinghouse 150 (also referred to as an "Emergency Clearinghouse") for storing and retrieving emergency data. In some embodiments, the clearinghouse 150 includes a location clearinghouse 150A and an additional data clearinghouse 150B. In some embodiments, the location clearinghouse 150A includes a location ingestion module and a location retrieval module, as described below with respect to FIG. 2. In some embodiments, the additional data clearinghouse 150B includes an additional data ingestion module and an additional data retrieval module, as described below with respect to FIG. 2. In other embodiments, additional data and location data (hereinafter "emergency data") are stored in one or more databases in a distributed manner. In some embodiments, the emergency data is stored in an external or third-party server that is accessible to the EMS 120. The clearinghouse 150 optionally functions as an interface that receives and stores emergency data from electronic or communication devices that are then retrieved, transmitted, and/or distributed to recipients (e.g., emergency personnel) before, during, or after emergencies. As described above, the clearinghouse optionally receives emergency data from electronic or communication devices such as mobile phones, wearable devices, laptop or desktop computers, personal assistants, intelligent vehicle systems, home security systems. IoT devices, camera feeds, and other sources. As described above and below, emergency data optionally includes locations or additional data such as medical history, personal information, or contact information. In some embodiments, during an emergency, the clearinghouse 150 detects the emergency and/or otherwise identifies the need to provide emergency data pertaining to the emergency. The clearinghouse 150 then identifies any emergency data pertaining to the emergency stored within the clearinghouse 150 and transmits the pertinent emergency data to the requesting ESP. Accordingly, in some embodiments, the clearinghouse 150 acts as a data pipeline that automatically pushes emergency data to the ESP that would otherwise be without access to emergency data that is critical to most effectively and efficiently responding to an emergency. Accordingly, location data stored within the clearinghouse 150 allows emergency responders to arrive at the scene of an emergency faster, and additional data stored within the clearinghouse 150 allows emergency responders to be better prepared for the emergencies they face.

For example, in one embodiment, an emergency alert is triggered by an electronic device 110 (e.g., by pressing a soft button, a physical button, voice command, or gesture) or autonomously based on sensor data (e.g., smoke alarms). In this example, the user then confirms the emergency and/or provides authorization for sending the emergency alert. Emergency data, such as an enhanced location and additional data regarding the user (e.g., the user's medical history) is delivered by the electronic device 110 to the EMS 120 and stored in the clearinghouse 150 (e.g., in the location clearinghouse 150A and the additional data clearinghouse 150A). In some embodiments, the EMS 120 or clearinghouse 150 formats the emergency data into a format that is compatible with industry standards for storing and sharing emergency data. For example, the emergency data is formatted to be compatible with National Emergency Number Association (NENA) standards. In some embodiments, the clearinghouse 150 transmits the emergency data to a receiving party in response to receiving a query from the receiving party, as described below. In some embodiments, the clearinghouse 150 automatically pushes the emergency data to a receiving party such as the PSAP. For example, in some embodiments, the emergency management system automatically pushes the emergency data to a receiving party using a subscription system, as described below.

In some embodiments, as mentioned above, a requesting party (such as a PSAP responding to an emergency alert) queries the clearinghouse 150 with an emergency data request (such as a HTTP GET request). In some embodiments, the emergency data request is in the form of the Location Information Server (LIS) protocol. In response to the emergency data request, the EMS 120 or clearinghouse 150 sends an appropriate response including relevant emergency data to the requesting party via an encrypted pathway. In some embodiments, the emergency data request is in the form of HTTP-Enabled Location Delivery (HELD) and the response from the EMS 120 or clearinghouse 150 is in the form of Presence Information Data Format Location Object (PIDF-LO). In some embodiments, the emergency data request includes an authorization code (also referred to as an "authorization token" or "temporary access token") in the body, header, or metadata of the request, and the EMS 120 checks that the authorization code is active before providing a response to the requesting party. In some embodiments, authorization is provided in the "Authorization" header of the emergency data request using HTTP Basic Authentication. For example, in some embodiments, authorization is base64-encoded user name and password for an account associated with the requesting party. In some embodiments, emergency data requests are sent over public networks using API access keys or credentials. In some embodiments. Transport Layer Security (TLS) is used in the requests and responses from the EMS 120 for encryption security. In some embodiments, the call taking module 145 includes a call-handling application, which is provided by a third-party vendor. In some embodiments, an ESP personnel interacts with the call-handling application to send an emergency data request to the EMS 120. In some embodiments, the response from the EMS 120 is displayed at the ESP display 131.

In some embodiments, as described above, emergency data includes locations and additional data. In some embodiments, emergency data includes one or more emergency data categories (also referred to as "data categories"). In some embodiments, the emergency data categories include: service data reference, full name, email, emergency contacts, addresses, language, occupation, phone numbers, websites, gender, height, weight, ethnicity, profile picture, allergies, medical conditions, medications, disabilities, blood type, medical notes, birthday, and additional comments. In some embodiments, emergency data categories are tagged with tags for specific types of data such as "demographics" or "medical data." For example, in some embodiments, gender, height, weight, ethnicity, profile picture (image-URL) are tagged as demographic data. In some embodiments, medical data protected under HIPAA and other laws are tagged as "HIPAA" or "private." In some embodiments, medical data includes information on one or more of allergies, medical condition(s) or illness(es), medication(s), disabilities, blood type, medical note(s), and other medical information. In some embodiments, medical information protected under HIPAA are encrypted and/or anonymized. In some embodiments, some data are tagged as "general" or another similar tag, wherein access is not specifically restricted.

An example of an additional data communication from the EMS 120 in a standard format compatible with industry standards, PIDF-LO, is shown below.

HTTP/1.1 200 OK
Date: Tue, 1 Dec. 2016 23:27:30 GMT
Content-Length: 489
Content-Type: application/EmergencyCallData.DeviceInfo+xml
<dev:EmergencyCallData.DeviceInfo
xmlns:dev="urn:ietf:params:xml:ns:EmergencyCallData:DeviceInfo">
<dev:DataProviderReference>
d4b3072df.201409182208075@example.org In some embodiments, when the emergency data is stored at a third-party server and receives a request for emergency data from the EMS 120, as a database query, the third-party server formats the requested emergency data and stores this information in an alternate database, and forwards either a response or a reference to the alternate database for accessing the emergency data requested by the EMS 120, which is provided to the ESP 130 over a hybrid analog and/or a data communication channel, depending on the capabilities of ESP 130. In some embodiments, the third-party server stores the emergency data, requested by the EMS 120 or directly by the ESP 130, in the alternate database for a certain period of time after receiving the request for the emergency data regarding a user and any electronic devices 110. In some embodiments, this period of time is a timer value (e.g., a timer countdown or a set time point) defined by the EMS 120 and the third-party server in conjunction with each other prior to the addition of the requested emergency data to the alternate database at the third-party server. In some embodiments, once the timer value has passed and no new requests for the emergency data pertaining to the particular user and the electronic device 110, or other devices associated with the user, are received by the third-party server, then the third-party server marks the particular alternate database entries to be deleted and waits for another, different, time-out interval. In some embodiments, once this particular second time-out interval has also been completed and no new requests for location data for the particular user or associated electronic devices 110 are received by the third-party server, the third-party server removes the specific marked entries from the alternate database in the next cycle of updates for the alternate database. In some embodiments, after adding the emergency data in the alternate database by the third-party server, the third-party server keeps updating the emergency data in the alternate database on a periodic, or as-needed basis, for the purpose of keeping the emergency data about the user or electronic device 110 current for providing the most recent and accurate emergency data to the EMS 120 and the ESP 130 for the purposes of responding to a request for emergency assistance. In some embodiments, the third-party server is updated by the EMS 120 for all the emergency data pertaining to all users and their associated electronic devices 110 that are served by the EMS 120 at any current time.

In some non-emergency situations, there is a need to access location data, user data, emergency data or sensor data. For example, in some embodiments, a user of an electronic device 110 grants authorization to family members to access location data for the user. Accordingly, when a family member requests location data for a user, access is granted if there is proper authorization. As another example, in some embodiments, a taxi operations company requests and obtains location data of one or more fleet members to keep track of its vehicles (e.g., via onboard vehicle console or terminal).

Figure 2:
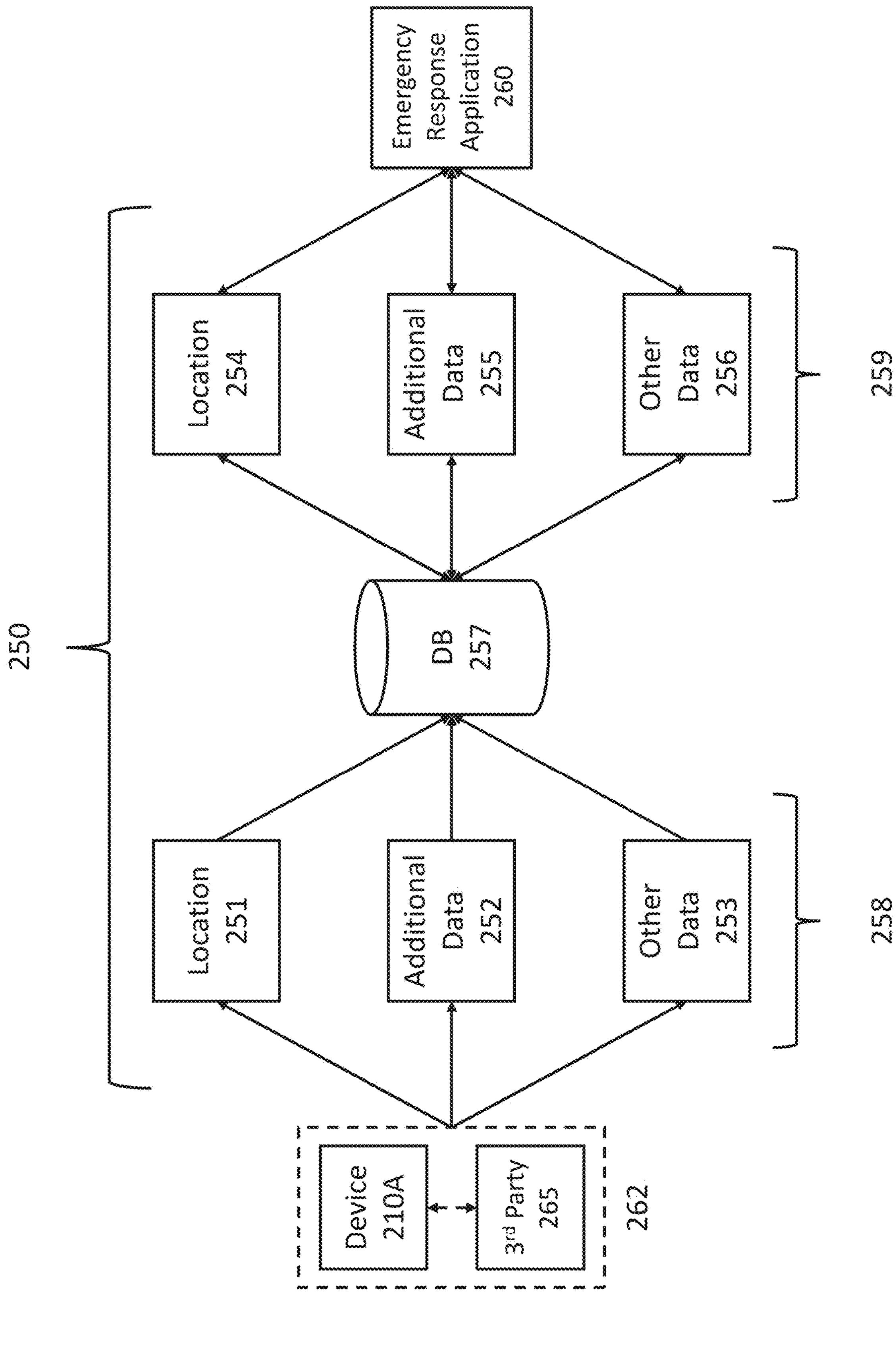
FIG. 2 depicts a diagram of a clearinghouse for emergency data in accordance with one embodiment of the present disclosure.

FIG. 2 depicts an embodiment of an Emergency Clearinghouse 250 for storing and retrieving emergency data. In some embodiments, the clearinghouse 250 includes a set of ingestion modules 258 (also referred to as "ingestion modules") and a set of retrieval modules 259 (also referred to as "retrieval modules"). The set of ingestion modules 258 is configured to receive various forms of emergency data from various emergency data sources 262, such as an electronic device 210A or a third-party server system 265 (hereinafter. "third-party server"). In some embodiments, an electronic device 210A is a communication device (e.g., a mobile phone), a wearable device (e.g., a smartwatch), or an internet of things (IOT) device (e.g., a smart speaker) that can communicate with one or more of the ingestion modules within the set of ingestion modules 258. In some embodiments, a third-party server 265 stores data that is not generated by or stored within an electronic device. For example, in some embodiments, a third-party server includes a database of static medical information that can be sent to the clearinghouse during an emergency. In some embodiments, when the emergency management system 120 detects an emergency (e.g., when a person calls 9-1-1), the clearinghouse can query an emergency data source 262 for emergency data regarding the emergency. For example, in some embodiments, in response to detecting a 9-1-1 call made from a mobile phone, the additional data ingestion module 252 (as described below) sends a query including the phone number of the mobile phone to a third-party server 265 that stores static medical information. The third-party server 265 can then return any available medical information associated with the phone number of the mobile phone to the additional data ingestion module. In some embodiments, multiple ingestion modules within the set of ingestion modules can receive emergency data for a single emergency. For example, in some embodiments, when a person calls 9-1-1 from a mobile phone, the mobile phone can send a device-based hybrid location to the location ingestion module 251 (as described below) and demographic data (as described above) to the additional data ingestion module 252. In some embodiments, the clearinghouse can receive emergency data from multiple emergency data sources 262 for a single emergency. For example, in some embodiments, when a person calls 9-1-1 from a mobile phone, the clearinghouse can receive a location from the mobile phone (such as through the location ingestion module 251) and a heartrate from a smartwatch that the person is wearing (such as through additional data ingestion module 252). Or for example, in some embodiments, when a person calls 9-1-1 from a mobile phone, the clearinghouse can receive a location from the mobile phone and medical information associated with the person from a third-party server 265.

The set of ingestion modules 258 optionally include a location ingestion module 251, an additional data ingestion module 252, and one or more other data ingestion modules 253. In some embodiments, the location ingestion module 251 is an emergency location service ingestion interface for posting or receiving emergency locations. In some embodiments, the location ingestion module 251 is a REST API that receives an HTTP POST including location data when an emergency alert is generated (e.g., when an emergency call is made from a cell phone). The location data includes a location generated concurrently or in response to the generation of the emergency alert. In some embodiments, the location data includes a location generated before the emergency alert. For example, when an emergency call is made from a cell phone, thereby generating an emergency alert, the location ingestion module 251 receives a location recently generated by the phone but before the emergency alert was generated, ensuring that a location for the emergency is available as quickly as possible. In some embodiments, the location data includes a device-based hybrid location generated by an electronic device 210 that generated the emergency alert. In some embodiments, the location data includes a location generated by a second electronic device communicatively coupled to the electronic device that generated the emergency alert. The location ingestion module 251 is integrated into an electronic device 210 through a mobile application installed on the device 210 or integrated into the firmware or operating system of the electronic device 210.

In some embodiments, the location data is generated by the electronic device 210 before the emergency and is accessible to a PSAP during an emergency. For example, a taxi company may have software that transmits the location of its cars or assets to the emergency clearinghouse 250 preemptively. Thus, when an emergency arises, the location of the affected taxi can be made accessible quicker to send help. In some embodiments, the location data is generated by the electronic device 210 after the emergency has commenced and is made accessible to a PSAP during the on-going emergency. For example, updated location data of a hijacked taxi is also periodically transmitted to the emergency clearinghouse 250 and made accessible to a PSAP.

In some embodiments, the additional data ingestion module 252 is an interface for posting or receiving static or dynamic emergency profile data (hereinafter. "additional data" or "additional information"). In some embodiments, additional data comprises medical data, personal data, demographic data, health data, or any combination thereof. Examples of medical data include information relating to a person's medical history, such as past surgeries or preexisting conditions, or current or past diseases or infections (e.g., coronavirus status). Examples of personal data include a person's name, date of birth, height, weight, occupation, address(es) (e.g., home address, work address, etc.), spoken languages, and other personal information. Examples of demographic data include a person's gender, ethnicity, age, etc. Examples of health data include medical history or biometric information such as a person's blood type or heartrate. In some embodiments, additional data comprises data received from connected devices such as vehicles. IoT devices, and wearable devices. For example, some intelligent vehicle systems generate and send data regarding a crash, such as the speed at which the vehicle was moving just before the collision, where the vehicle was struck, the number of occupants, and/or other relevant sensor data. In some embodiments, the additional data ingestion module 252 is a REST API (e.g., a JSON (JavaScript Object Notation) REST API). For example, in some embodiments, when an emergency call is made from a cell phone, thereby generating an emergency alert, the cell phone receives a heartrate of the person who made the emergency call from a smartwatch worn by the person and communicatively coupled to the cell phone (e.g., Wi-Fi or Bluetooth connectivity). The cell phone sends the heartrate to the additional data ingestion module 252, along with any other additional data, in an HTTP POST. In some embodiments, the additional data ingestion module 252 is integrated into an electronic device 210 through a mobile application installed on the device 210 or integrated into the firmware or operating system of the electronic device 210. In some embodiments, additional data is sent to the additional data ingestion module 252 from a network server. The additional data ingestion module 252 is accessed by any connected platform that receives data that might be relevant in an emergency. Connected platforms optionally send additional data to the additional data ingestion module 252 at any time. For example, in some embodiments, a website, web application, or mobile application integrated with the additional data ingestion module 252 that allows users to create profiles sends additional data included in the profiles to the additional data ingestion module 252 every time a profile is created or updated.

In some embodiments, the set of ingestion modules 258 includes one or more other data ingestion modules 253. Another data ingestion module 253 is optionally an interface for posting or receiving data relevant to emergencies that is not received by the location ingestion module 251 or the additional data ingestion module 252. In some embodiments, the other data ingestion module 253 receives audio or video streams during an emergency from electronic or communication devices associated with the emergency or proximal to the emergency. For example, an emergency alert is generated by an intelligent vehicle system installed in a vehicle in response to the vehicle experiencing a collision. In this example, the emergency alert is sent to the EMS 120 by the intelligent vehicle system or by an electronic device communicatively coupled to the intelligent vehicle system, such as a cell phone coupled to the intelligent vehicle system via Bluetooth. In response to generating the emergency alert, the intelligent vehicle system additionally begins streaming audio and video from microphones and cameras installed inside or outside of the vehicle to the clearinghouse 250 through the other data ingestion module 253. A cell phone communicatively coupled to the intelligent vehicle system additionally or alternatively streams audio or video from microphones and cameras integrated into the cell phone to the clearinghouse 250 through the other data ingestion module 253. In some embodiments, the one or more other data ingestion modules 253 are REST APIs that are accessed with an HTTP POST.

After receiving the relevant data, the set of ingestion modules 258 can store the data in one or more clearinghouse databases 257. For example, in some embodiments, the clearinghouse databases 257 includes a location database and an additional data database. In some embodiments, as described above, the one or more clearinghouse databases 257 are stored on a third-party server communicatively coupled to or otherwise accessible by the EMS 120. In some embodiments, the set of ingestion modules 258 tags or otherwise associates the data received by the modules with an identifier of a user or device associated with the data. For example, the set of ingestions modules 258 tag the data the received by the modules with a user ID number, an email address, or a phone number (e.g., caller ID). In some embodiments, the ingestion modules 258 tag the data received by the clearinghouse 250 based on the data source (e.g., device name or type, application name, user name, phone number, corporate account, etc.).

In some embodiments, the emergency data maintained by the clearinghouse is purged. In some embodiments, the data is purged on a regular or periodic basis. In some embodiments, data that is older than a defined threshold is purged. In some embodiments, different data types are purged according to different schedules and/or thresholds. For example, dynamic data (e.g., data that is subject to constant or regular change) such as location data may be more likely to become out-of-date over time and so may be purged more frequently than static data such as a permanent home address, which may remain permanently in the database until it is replaced with an updated address.

In some embodiments, an individual or group of individuals are associated with multiple identifiers. For example, the location ingestion module 251 receives a location generated by a phone associated with the phone number +1-555-555-5555, associated with John Doe. The additional data ingestion module 252 also receives a heartrate from a smartwatch associated with the email address johndoe@email.com, also associated with John Doe. In this example, the set of ingestion modules 258 tag the location with the phone number "+1-555-555-5555." tag the heartrate with the email address "johndoe@email.com." and associate both the location and the heartrate with John Doe in the clearinghouse databases 257.

In some embodiments, as depicted in FIG. 2, the clearinghouse 250 includes a set of retrieval modules 259. The set of retrieval modules 259 optionally include a location retrieval module 254, an additional data retrieval module 255, and one or more other data retrieval modules 256. In some embodiments, the location retrieval module 254 is an interface for retrieving location data from the clearinghouse databases 257. In some embodiments, the location retrieval module 254 is a JSON REST API that receives a query or request (e.g., in the form of an HTTP GET request) from a requesting party, such as an ESP. In some embodiments, the request is sent from a call-taking application (e.g., call taking module 145) integrated into the ESP system 130. In some embodiments, the request (also referred to as an "emergency data request") is sent from an emergency response application 260. In some embodiments, the location retrieval module 254 provides a single GET endpoint for retrieving either the latest or paginated list of locations for a specific caller ID (e.g., an identifier of a user or an electronic device associated with a user, such as a phone number). For example, as described above, a phone number associated with a device 210 from which a location was received is included in the header, body, or metadata of the request sent to the location retrieval module 254. The clearinghouse 250 then retrieves a location or set of locations from the clearinghouse databases 257 and deliver the location or set of locations to the requesting party. In some embodiments, the location retrieval module 254 is a location information server (LIS). In some embodiments, the LIS is a NG911 standards-based XML API for the retrieval of location data from the clearinghouse databases 257. In some embodiments, as described above, the location retrieval module 254 accepts HELD requests from requesting parties and returns location data for a specific caller ID or anonymous reference. However, in some embodiments, the location retrieval module 254 automatically retrieves and transmits location data using a subscription system, as described below.

As depicted in FIG. 2, the set of retrieval modules 259 optionally include an additional data retrieval module 255. In some embodiments, the additional data retrieval module 255 is a JSON REST API for the retrieval of emergency or additional data. As described above, additional data optionally includes medical data, personal data, demographic data, and health data. Additional data also optionally includes data received from connected devices such as vehicles, IoT devices, and wearable devices. In some embodiments, the additional data retrieval module 255 receives a query or request (e.g., in the form of an HTTP GET request) from a requesting party, such as an ESP. In some embodiments, the request (also referred to as an "emergency data request") is sent from an emergency response application 260. The additional data then retrieves additional data associated with a specific or particular identifier of a user or an electronic device associated with the user, such as a phone number, and returns the data to the requesting party. In some embodiments, the set of retrieval modules 259 further includes one or more other data retrieval modules 256, which function similarly to the location retrieval module 254 and additional data retrieval module 255, for the retrieval of data stored in the clearinghouse databases 257 not retrieved by the location retrieval module 254 or additional data retrieval module 255. However, in some embodiments, the additional data retrieval module 255 automatically retrieves and transmits additional data using a subscription system, as described below.

In some embodiments, a retrieval module within the set of retrieval modules 259 and a corresponding ingestion module within the set of ingestion modules 258 form a sub-clearinghouse. For example, in some embodiments, location ingestion module 251 and location retrieval module 254 combine to form location clearinghouse 150A (as shown in FIG. 1B). Likewise, in some embodiments, additional data ingestion module 252 and additional data retrieval module 255 combine to form additional data clearinghouse 150B. In some embodiments, a requesting party is only given access to a particular sub-clearinghouse. For example, a police officer is only given access to the location clearinghouse 150A, while an EMT (emergency medical technician) is only given access to the additional data clearinghouse 150B. However, a requesting party is given differential access to the clearinghouse 150, sub-clearinghouses, or particular emergency data categories within the clearinghouse 150 based on any factor or set of factors. In some embodiments, a requesting party initiates a query or request (e.g., an emergency data request) using an emergency response application 260 (as described below), which in turn generates the query and transmits the query to the clearinghouse 250.

Various embodiments and applications of the clearinghouse 150 are described in detail herein. However, the embodiments and applications described herein should not be considered exhaustive or limiting in any way.

Emergency Data Subscription System

As described above, in some embodiments, an emergency management system (EMS) maintains a clearinghouse 250 that obtains and shares emergency data to aid emergency service providers (ESPs) in responding to emergencies. During an emergency, in some embodiments, an ESP can send an emergency data request to the EMS through the emergency response application 260, and, in response, the EMS can send any available emergency data associated with the emergency back to the emergency response application 260. In some embodiments, as described above, the emergency response application 260 includes an identifier associated with an emergency alert in the emergency data request. The EMS can then use the identifier associated with the emergency alert to retrieve emergency data associated with the emergency alert from the clearinghouse. For example, as described above, an ESP 230 (e.g., a public safety answering point (PSAP)) can receive an emergency alert in the form of a 9-1-1 phone call (representative of an emergency or potential emergency) from a mobile phone associated with a phone number (e.g., (555) 555-5555). The ESP 230 can then send an emergency data request including the phone number (e.g., the identifier of the emergency alert) to the EMS, which can then retrieve any emergency data within the clearinghouse associated with the phone number and return the available emergency data to the requesting ESP 230. This process of returning emergency data to the emergency response application 260 in response to an emergency data request is referred to as "pulling" emergency data from the clearinghouse.

However, in some embodiments, the EMS can "push" emergency data from the clearinghouse 250 to the emergency response application (i.e., the EMS can send emergency data to the emergency response application 260 without receiving an emergency data request). In some embodiments, the EMS pushes emergency data to the emergency response application 260 using an emergency data subscription system. Using the emergency data subscription, a recipient (or potential recipient) of emergency data from the clearinghouse 250 can subscribe to the clearinghouse 250 for a particular device identifier, user identifier, or ESP account (hereinafter. "subscription"). After subscribing to a subscription, the recipient (e.g., an ESP) may automatically receive updates regarding the subscription without first sending an emergency data request. For example, in some embodiments, if an ESP subscribes to a phone number, whenever the clearinghouse 250 receives updated emergency data associated with the phone number, the clearinghouse 250 can automatically send the updated emergency data associated with the phone number to the ESP (e.g., through the emergency response application 260), without first receiving an emergency data request including the phone number. For example, in some embodiments, if a recipient is subscribed to a particular phone number, and the clearinghouse 250 receives a new or updated location associated with the particular phone number, the clearinghouse 250 will instantly and automatically push the new or updated location associated with the particular phone number to the recipient the moment that the new or updated location is received by the clearinghouse 250, without the recipient having to send an emergency data request. In some embodiments, when an ESP or ESP personnel accesses the emergency response application 260 at a computing device associated with the ESP or ESP personnel, the EMS establishes a persistent or active communication link (e.g., a websocket connection) with the computing device in order to push emergency data regarding a subscription to which the ESP or ESP personnel is subscribed to the emergency response application 260.

In some embodiments, an active communication link is a connection, or a potential connection (e.g., two corresponding endpoints), between two entities (e.g., an EMS and an ESP) through which data can be freely transmitted (i.e., without a recipient entity having to actively accept transmitted data). In some embodiments, an active communication link is a persistent communication link. In some embodiments, a persistent communication link is a communication link that endures for a period of time that is not dependent on the transmission of a particular packet of data. For example, in some embodiments, a persistent communication link between two entities (e.g., an EMS and an ESP) endures until the communication link is actively terminated by one of the entities, as opposed to passively terminating once a particular packet of data (e.g., a particular emergency alert) has been transmitted. In another example, a persistent communication link endures for a predetermined amount of time (e.g., five minutes or an hour). In another example, a persistent communication link established between an EMS and an ESP through an emergency response application endures until a login session on the emergency response application is terminated or the emergency response application itself is terminated. In some embodiments, a persistent communication link is a websocket connection. WebSocket is a type of computer communications protocol. A websocket connection is a longstanding or persistent internet connection between a client and a server that allows for bidirectional communication between the client and server without the client needing to send data requests to the server, which differentiates the WebSocket computer communications protocol from other types of computer communications protocols such as the HyperTextual Transfer Protocol (HTTP). The WebSocket protocol is often used by chat clients to facilitate user to user webchats. In some embodiments, the EMS establishes a websocket connection with a computing device (e.g., an ESP console 130) in response to receiving an emergency data request. In some embodiments, the EMS establishes a websocket connection with an ESP console when an ESP personnel logs into the emergency response application 260 at the ESP console. In some embodiments, the EMS establishes a websocket connection with a responder device when an ESP personnel logs into the emergency response application 260 at the responder device. In some embodiments a websocket connection established between the EMS and a computing device associated with an ESP personnel is maintained by the EMS for the duration of the ESP personnel's log-in session.

In some embodiments, the EMS automatically subscribes a recipient to a subscription (e.g., a particular device identifier or user identifier) in response to receiving an emergency data request including the subscription or an identifier of the subscription. For example, in some embodiments, when an ESP personnel sends an emergency data request including a phone number to the EMS through their ESP console (e.g., through the emergency response application 260), the EMS subscribes the ESP personnel to the phone number and establishes a persistent or active communication link with the ESP console. Then, whenever the clearinghouse 250 receives updated emergency data associated with the phone number, the EMS can automatically push the updated emergency data associated with the phone number to the ESP console. For example, an ESP personnel logs into an emergency response application 260 in communication with the EMS on the ESP personnel's ESP console. Subsequently, the ESP personnel receives a 9-1-1 call from a mobile phone and then generates and sends an emergency data request including the phone number of the mobile phone to the EMS through the emergency response application 260. The EMS then uses the phone number of the mobile phone to retrieve the most recent location associated with the mobile phone received by the clearinghouse and returns the most recent location associated with the mobile phone to the ESP personnel through the emergency response application 260. The EMS simultaneously subscribes the ESP personnel to the phone number of the mobile phone and establishes a websocket connection between the EMS and the ESP console and automatically pushes any updated emergency data (e.g., locations) associated with the phone number received by the clearinghouse to the emergency response application 260 as soon as the updated emergency data associated with the phone number is received by the clearinghouse 250.

In some embodiments, an ESP is associated with a unique ESP account ID that an ESP or ESP personnel (also referred to as an "ESP member") can subscribe to. The EMS can then establish a persistent or active communication link (e.g., a websocket connection) with a computing device associated with an ESP or ESP personnel subscribed to the unique ESP account ID and push emergency data associated with the unique ESP account ID to the computing device (e.g., through the emergency response application 260) whenever new or updated emergency data associated with the unique ESP account ID is received by the clearinghouse 250. For example, in some embodiments, when the clearinghouse 250 receives a location associated with an emergency alert (e.g., when a person calls 9-1-1 from a mobile phone and the mobile phone responsively sends a current location of the mobile phone to the clearinghouse 250), the EMS retrieves one or more geofences (as described below) associated with each ESP registered with the EMS and determines which (if any) of the geofences that the location associated with the emergency alert falls within. The EMS then tags the location associated with the emergency alert with the unique ESP account IDs associated with each of the ESPs associated with geofences that the location associated with the emergency alert falls within. For example, if four ESPs are registered with the EMS—ESP A. ESP B. ESP C. and ESP D—and the clearinghouse 250 receives a location associated with an emergency that falls within the one or more of the geofences associated with ESP A and ESP D, the EMS can tag the location associated with the emergency alert with the unique ESP account ID associated with ESP A and the unique ESP account ID associated with ESP D. The EMS can then push the location associated with the emergency alert to any ESPs or ESP personnel with an established websocket connection with the EMS and currently subscribed to either the unique ESP account ID for ESP A or the unique ESP account ID for ESP D. In some embodiments, when an ESP personnel logs into the emergency response application 260, a communication is sent to the EMS that includes one or more unique ESP account IDs that the ESP personnel or their respective ESP is currently subscribed to.

Emergency Data Geofencing

Figure 3:
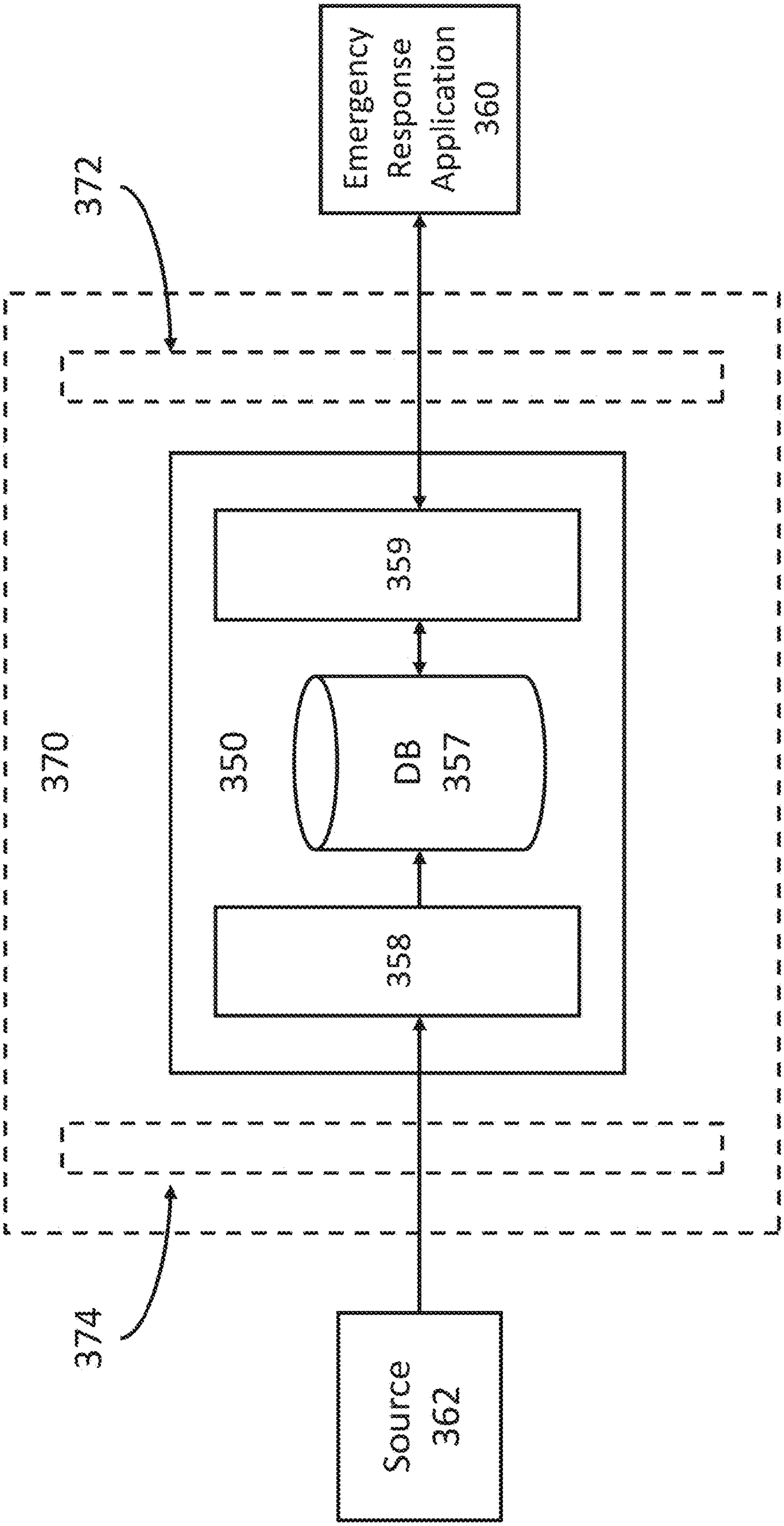
FIG. 3 depicts a diagram of a geofence system applied to a clearinghouse for emergency data in accordance with one embodiment of the present disclosure.

FIG. 3 depicts a diagram of a geofence applied to a clearinghouse for emergency data. In some embodiments, a geofence module 370 is applied to the clearinghouse 350 to protect potentially sensitive emergency data using geospatial analysis. In some embodiments, as described above with respect to FIG. 2, the clearinghouse 350 includes a set of ingestion modules 358 and a set of retrieval modules 359. The set of ingestion modules can receive emergency data, or other information that can be useful in responding to an emergency, from a variety of sources. For example, a smartphone sends emergency data to the clearinghouse 350 in the form of an HTTP POST API call in response to a user of the smartphone initiating a 911 emergency call. As depicted in FIG. 3, when emergency data (e.g., an emergency location or additional emergency data) is sent from an electronic device 310 to the clearinghouse 350, the emergency data is first processed by a geofence module 370 before being received by the set of ingestion modules 358 within the clearinghouse 350, as described below with respect to FIG. 10. Similarly, in some embodiments, when an emergency data request is sent from a requesting party (e.g., the emergency response application 360, as described below), the emergency data request is processed by the geofence module 370 before being received by the set of retrieval modules 359 for display on a GUI of the emergency response application 360 on a computing device of the requesting party.

In some embodiments, as mentioned above, a geofence module 370 is applied to the clearinghouse 350 to protect potentially sensitive emergency data using geofences. For example, data may be provided to a requesting party such as an emergency service provider (ESP) only for alerts that are located within the geofence associated with the ESP. Generally, a geofence is a virtual perimeter for a real-world geographic area. A geofence can be dynamically generated—as in a radius around a point location—or a geofence can be a predefined set of boundaries (such as school zones or neighborhood boundaries). The use of a geofence is called geofencing, and one example of usage involves a location-aware device of a location-based service (LBS) user entering or exiting a geofence. Entry or exit from a geofence could trigger an alert to the device's user as well as messaging to the geofence operator. The geofence information, which could contain the location of the device, could be sent to a mobile telephone or an email account.

For emergency response, an emergency service provider (public or private entities) may be given jurisdictional authority to a certain geographical region or jurisdiction (also referred to as "authoritative regions"). In the context of emergency services, one or more geofences may correspond to the authoritative region of an ESP. In many cases, the ESP is a public entity such as a public safety answering point (PSAP) or a public safety service (PSS; e.g., a police department, a fire department, a federal disaster management agency, national highway police, etc.), which have jurisdiction over a designated area (sometimes, overlapping areas). Geofences are used to define the jurisdictional authority by various methods and in various Geographic Information System (GIS) formats. In some embodiments, geofences only represent authoritative regions if the geofence has been assigned or verified by a local, state, or federal government. In some embodiments, geofences represent assigned jurisdictions that are not necessarily authoritative regions. For example, in some embodiments, a geofence is unilaterally created by its associated ESP without verification or assignment by a local, state, or federal government.

Geofences can be defined in various ways. For example, in some embodiments, a geofence comprises one or more of the following: a county boundary, a state boundary, a collection of postal/zip codes, a collection of cell sectors, simple shapes, complex polygons, or other shapes or areas. In some embodiments, geofences comprise approximations where the "approximated" geofence encloses an approximation of the authoritative region.

Updates to geofences may be required over time because the authoritative regions may change over time. Geofences may change over time (e.g., a new sub-division has cropped up) and require updates. In some embodiments, the systems and methods described herein allow geofences to be updated (e.g., a PSAP administrator can upload updated geofence GIS shapefiles).

For maintaining the privacy, security and integrity of the data, geofencing may be applied to emergency data. For example, applying geofence filters to the emergency data allows additional avenues for monitoring, both visibility and control, over the clearinghouse to detect anomalies/spikes and reduce the risk of security breaches.

In some embodiments, the emergency data is obtained from an emergency data source 362 (such as an electronic device or third-party server, as described above). On the retrieval side, in some embodiments, an emergency data recipient 363 accesses the clearinghouse 350 by sending an emergency data request to the clearinghouse 350, as described above. An ingestion geofence 374 (also referred to as "upstream filtering") is applied to restrict sending of data from emergency data sources 362 to the clearinghouse 350 from geographical areas that are not covered by the "combined authoritative jurisdiction" (e.g., covered one or more provisioned geofences in the geofence database (not shown)). In some embodiments, the ingestion geofence (also referred to as an "ingress filter") is applied to the ingestion module 358 to protect against accidental breaches of privacy. In some embodiments, the ingestion module 358 of the clearinghouse 350 drops location payloads that do fall within the geographical region covered by the "combined authoritative region."

In some embodiments, the clearinghouse 350 comprises one or more databases 357 (e.g., a database storing emergency data). For example, in some embodiments, the retrieval module 359 obtains emergency data from a clearinghouse database 357 to send to an emergency data recipient 363 (e.g., an ESP) in response to an emergency data request, as described above. In some embodiments, the retrieval geofence 372 (also referred to as an "egress filter") is applied at the retrieval module 359 of the clearinghouse 350. Applying geofencing to retrieved emergency data will protect against abuse and limit the scope of security breaches in cases where credentials have been compromised. In some embodiments, one or more geofences are associated with one or more credentials associated with an ESP agency or organization. In some embodiments, the credentials associated with an ESP agency or organization confers authorization to access data such as emergency data from the clearinghouse. In some embodiments, specific authorization to access data is granted individually to members of a PSAP through tokens derived from the credentials for that PSAP.

In some embodiments, when the retrieval module 359 checks the coordinates of current location data (within retrieved emergency data) associated with a device identifier with the geofence(s) associated with the credentials in an emergency data request. If the current location is within the geofence region (enclosed by the geofence(s)), the current location is returned to the ESP and displayed within the ESP console. If not, the module 359 will return a "not found" message (as opposed to the retrieved location is outside the geofence) to protect privacy.

In some embodiments, geofences can be used for reporting results for internal metrics and monitoring the system. For example, the number of emergency data requests, locations provided. "no location found" etc., can be obtained for a geofence(s) associated with a PSAP. Using single or combined geofences, the emergency data can be obtained on county-wide, city-wide, postal code, course grid (rectangle overlay), state-wide, or country-wide basis. In some embodiments, ingress and egress counters (e.g., percent of emergency sessions where the location data was received, but not queried) and other similar metrics can be calculated and analyzed to identify problems and spikes. In some embodiments, different geofences are used for retrieval and for reporting.

In some embodiments, a given incident (e.g., an emergency incident associated alarm, as described below) can be determined to fall within a plurality of geofences, as described below. In some embodiments, emergency data for the incident is pushed to each PSAP having a geofence that the incident (e.g., a location associated with the incident) falls within. In some embodiments, emergency data for the incident is pushed to a subset of PSAPs having a geofence that encloses or encompasses the incident. In some embodiments, the location data of an individual device identifier is not pushed to more than one PSAP at one time. Thus, the emergency data is only pushed to one PSAP (e.g., a primary agency), but may be pushed to multiple secondary agencies (e.g., police departments) and regional agencies. In some embodiments, the emergency data is pushed to one or more emergency responders who may be associated with an ESP (e.g., police officers working for a police department). In some embodiments, wherein a device identifier egresses a geofence in which communication began and ingresses into a neighboring geofence, the location data is autocratically pushed to the neighboring PSAP with jurisdiction over the ingress geofence.

To determine the appropriate ESP(s) for sharing emergency data, the authoritative jurisdiction (defined by one or more geofences) of an ESP (e.g., primary agency) has to be evaluated. In case of irregularities (e.g., overlaps, islands, or other irregular features), steps may be taken to check with respective agency, geographical boundaries (national and international borders, county lines, rivers, hills, etc.), or other authority. In some embodiments, call routing data may be analyzed to see which ESP is answering the emergency call.

Raw geofences may be pre-processed to generate processed geofences using a variety of techniques. For removing irregularities, a geofence may be processed to resolve overlaps, remove islands and projections, smooth boundaries, modifying the file format or size, etc.

In some cases, there may be overlap between geofence of two or more ESPs. In some embodiments, the emergency data may be shared with the two or more ESPs to err on the side of making mission critical information to all entities that may be involved in the emergency response. In some embodiments, the two or more ESPs are primary agencies (e.g., PSAPs) and the emergency data has to be shared with one appropriate ESP. To determine the appropriate ESP(s) for sharing emergency data, the authoritative jurisdiction (defined by one or more geofences) of the overlapping ESPs by checking with respective agency, geographical boundaries (national and international borders, county lines, rivers, hills, etc.), sample routing data, etc. In contrast, if the overlapping ESPs include one or more secondary ESPs, the overlap may be retained and emergency data may be shared with one or more ESPs (e.g., one primary agency and two secondary agencies).

In some embodiments, a buffer (e.g., +10 km) is added to the geofence(s) so that results within the buffer zone are also returned. In many cases, PSAPs have discretion and incentive to respond to emergencies that are beyond their authoritative jurisdiction. As an example, a geofence that is a circular area with a radius of 10 km would have an area of 100π or ~314 km2, whereas the same area with a 10 km buffer around its circumference would have yield a combined radius of 20 km and a combined area of 400π or ~1256 km2. In some embodiments, the buffer is from 0.5 km to 5 km, from 0.5 km to 10 km, from 0.5 km to 15 km, from 0.5 km to 20 km, from 0.5 km to 25 km, or from 0.5 km to 30 km. In some embodiments, the buffer is from 1 km to 5 km, from 1 km to 10 km, from 1 km to 15 km, from 1 km to 20 km, or from 1 km to 30 km. In some embodiments, the buffer is at least 0.1 km, at least 0.2 km, at least 0.3 km, at least 0.4 km, at least 0.5 km, at least 0.6 km, at least 0.7 km, at least 0.8 km, at least 0.9 km, at least 1 km, at least 2 km, at least 3 km, at least 4 km, at least 5 km, at least 6 km, at least 7 km, at least 8 km, at least 9 km, at least 10 km, at least 11 km, at least 12 km, at least 9 km, at least 14 km, at least 15 km, at least 16 km, at least 17 km, at least 18 km, at least 19 km, at least 20 km, at least 25 km, or at least 30 km. In some embodiments, the buffer is no more than 0.1 km, no more than 0.2 km, no more than 0.3 km, no more than 0.4 km, no more than 0.5 km, no more than 0.6 km, no more than 0.7 km, no more than 0.8 km, no more than 0.9 km, no more than 1 km, no more than 2 km, no more than 3 km, no more than 4 km, no more than 5 km, no more than 6 km, no more than 7 km, no more than 8 km, no more than 9 km, no more than 10 km, no more than 11 km, no more than 12 km, no more than 9 km, no more than 14 km, no more than 15 km, no more than 16 km, no more than 17 km, no more than 18 km, no more than 19 km, no more than 20 km, no more than 25 km, or no more than 30 km.

In addition to geofencing analysis, determining an "appropriate" ESP may also involve determining whether the ESP has the capability to receive and process a digital emergency service request (as described below), taking into account the type and severity of the emergency. For example, ESPs with legacy systems may not be able to respond to digital emergency service requests. In some cases, software incompatibility will not allow the ESP to receive such requests. Also, ESPs that have not incorporated responding to digital emergency service requests into their standard operating procedures and trained users may also be unable to receive and process digital emergency service requests.

In some embodiments, the EMS maintains a database of ESPs and their capabilities and checks that the ESP with authoritative jurisdiction (e.g., a PSAP) has the capability to receive and process a digital emergency service request. In some cases, no "appropriate" ESP is found if the ESP having the appropriate authoritative jurisdiction does not have the appropriate capability and/or ability to respond to the type and severity of the emergency.

In some embodiments, the EMS also checks that there is an active communication link with the appropriate ESP for transmitting the digital emergency service request. More details can be found in the description to FIG. 10.

When no "appropriate" ESP can be found, various failsafe procedures may be initiated. For example, the user in the emergency or the monitoring center can be informed and advised to make a traditional emergency call.

Figure 4:
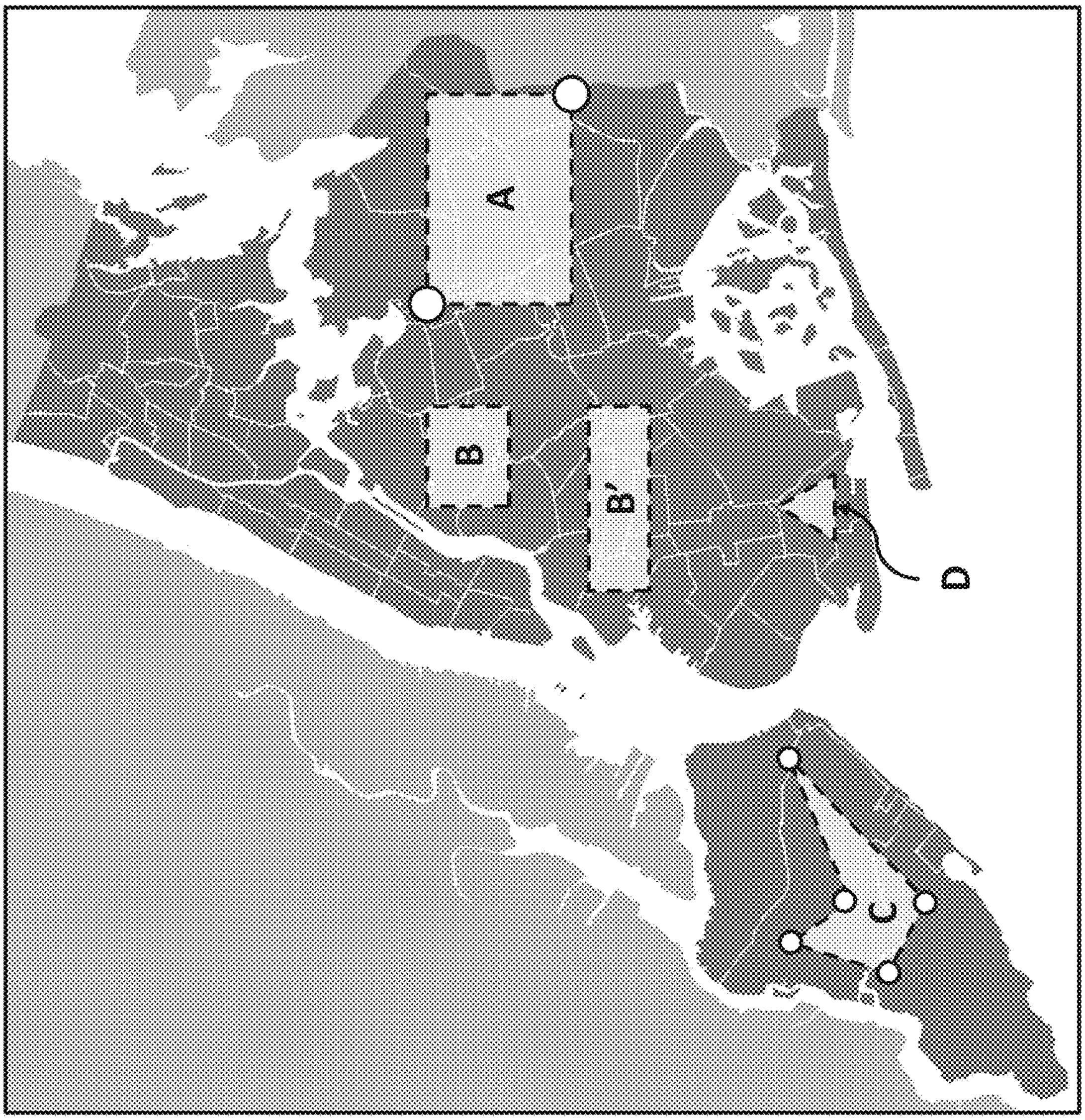
FIG. 4 depicts a map illustrating non-limiting examples of geofence approximations in accordance with one embodiment of the present disclosure.

FIG. 4 illustrates geofence approximations that may be submitted as an "authoritative jurisdiction" for an ESP. One or more geofences enclose the geofenced region which is under the authoritative jurisdiction of an ESP. In some cases, the geofenced region may be a complex polygon, but it may be approximated using an appropriate shape. For example, a/ rectangle (A), two disjointed rectangles (B, B'), a polygon with several sides (C) and a triangle (D), may represent different geofenced regions (defined by one or more geofences).

In some embodiments, an administrator of a PSAP submits the complex authoritative jurisdiction as one or more approximate geofence(s) by specifying points. For example, the PSAP administrator can submit geofenced region A by specifying two points—the north-west corner and the south-east corner using a drawing tool provided by the GUI of the emergency response application. In this example, the two points of the geofenced region are set using two latitude-longitude coordinates. In another example, the multiple-sided polygon C is submitted by specifying the five corners. In some embodiments, a PSAP administrator approximates a geofence for a PSAP by drawing one or more polygons using a drawing tool provided by the GUI of the emergency response application. In some embodiments, a geofence is generated using a series of points that are connected (e.g., entering three longitude-latitude points on a map to form a triangular geofence).

Approximating a complex geofenced region has several advantages. The geofence(s) are simple and the calculations can be quicker and less cumbersome for applications where exact calculations are not needed.

In some embodiments, a PSAP administrator can submit a GIS file (e.g., a shapefile) that represents the actual authoritative jurisdiction of the PSAP, which may then be provisioned in a geofence database. It is appreciated that a GIS file defining the authoritative jurisdiction may be saved in one or more industry-acceptable formats such as a shapefile, a GeoJSON file, KML file, etc. In some embodiments, the GIS file includes one or more features such as points, lines, polygons, density, and other shapes. A GeoJSON is open standard GIS file representing geographical features and non-spatial attributes based on JavaScript Object Notation. Some features include points (such as addresses and locations), line strings (streets, highways and boundaries), polygons (countries, provinces, tracts of land), and multi-part collections of these types. A Keyhole Markup Language (KML) file includes geographic annotations and visualization on internet-based maps on Earth browsers. A shapefile is a vector data format for storing the location, shape, and attributes of geographic features. A shapefile is stored in a set of related files, each of which may contain one feature class (e.g., lines, points, polygons, etc.). In some embodiments, the shapefile is a file with extension. SHP in ESRI file format where SHP is the feature geometry, SHX is the shape index position and DBF is the attribute data.

Various embodiments of the geofence database are contemplated. In some embodiments, one or more databases are searchable using a PSAP identifier, credentials, or other information. In some embodiments, an emergency location is searched through several geofences in the geofence database. In some cases, the geofenced region is shrunk for ease of storage and to simplify calculations.

Figure 5:
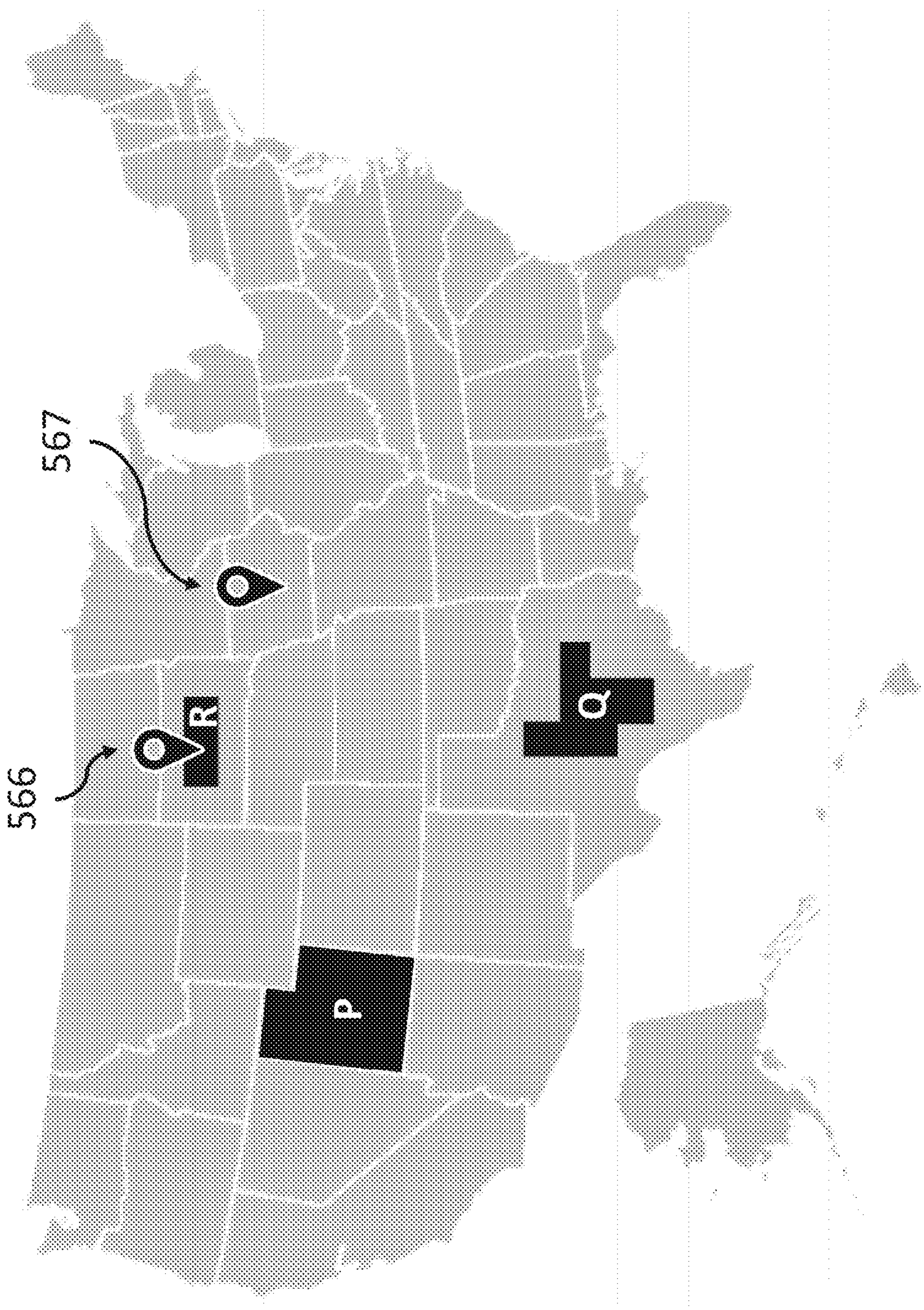
FIG. 5 illustrates non-limiting examples of geofenced regions defined by one or more geofences within the United States in accordance with one embodiment of the present disclosure.

FIG. 5 illustrates geofenced regions defined by one or more geofences within the United States. As shown, the geofenced region (e.g., an authoritative jurisdiction) may comprise an entire state (P), a complex shape within a state (Q), and/or a simple (rectangle) shape (R, which encompasses location 566). As described in FIG. 3, the clearinghouse 350 will return the emergency location if it is within the retrieval geofence(s) associated with the credentials in the emergency data request. Referring back to FIG. 5, if an ESP member or user associated with geofenced region R is requesting an emergency location using the device identifier at location 566 and 567, the emergency location 566 will be returned, while emergency location 567 will be returned as an "unavailable location."

In some embodiments, geofences may be defined on a grid mesh including equal-sized rectangles or grids, for example, on the entire United States. In such scenarios, the gridlines may be used as geofences to define geofenced region comprising each grid. Such grid-geofences may be used as other geofences for filtering, reporting and monitoring emergency data.

Emergency Response Application

Figure 6:
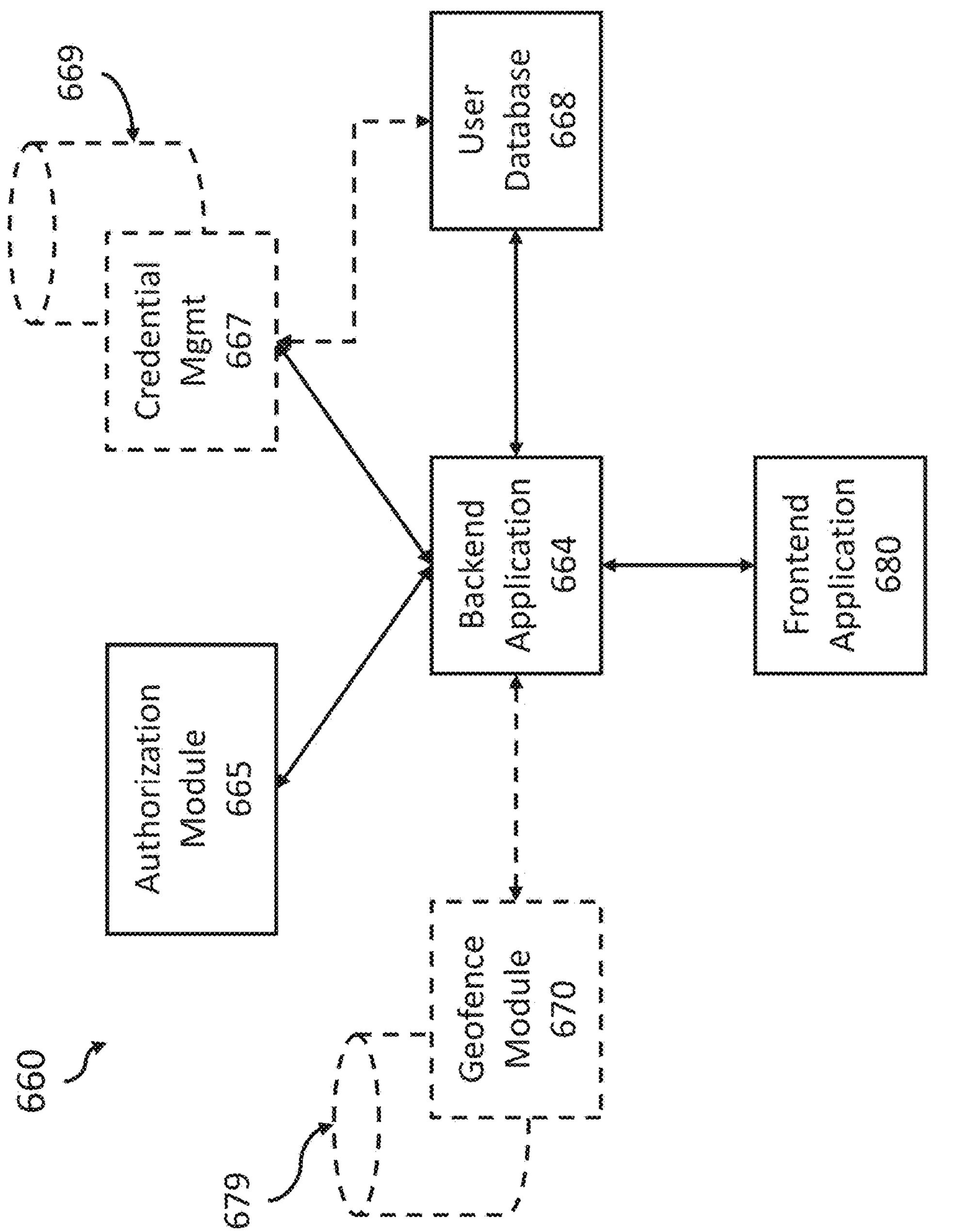
FIG. 6 depicts a diagram of an emergency response application in accordance with one embodiment of the present disclosure.

As mentioned above, in some embodiments, a requesting party (e.g., a PSAP) initiates a query or request for emergency data using an emergency response application, which in turn generates the query and transmits the query to the clearinghouse. FIG. 6 depicts a diagram of an emergency response application 660. In some embodiments, the emergency response application 660 includes a frontend application 680 (hereinafter "graphical user interface" or "GUI"), a backend application 664, an authorization module 665, and a user database 668. In some embodiments, the emergency response application 660 additionally or alternatively includes a credential management system 667 or a geofence module 670. In some embodiments, the credential management system 667 and the geofence module 670 are external to the emergency response application 660 and communicatively coupled to the emergency response application 660. In general, the components of the emergency response application 660 function to provide a graphical user interface for users (e.g., employees of a PSAP) to register for access to the emergency data stored within the clearinghouse, deliver emergency data requests to the clearinghouse, and receive emergency data from the clearinghouse. In some embodiments, the components of the emergency response application 660 additionally function to provide a graphical user interface for users to submit geospatial representations of jurisdictions (hereinafter. "geofences"), which is optionally used by the EMS to protect potentially sensitive emergency data stored within the clearinghouse, as described below.

In some embodiments, users interact with the emergency response application 660 using the frontend application, or graphical user interface (GUI) 680. In some embodiments, the GUI 680 is a webpage that is accessible through a web browser. In some embodiments, the GUI 680 is accessed through a desktop application. In some embodiments, the GUI 680 contains one or more pages each with their own plurality of interactive elements, such as, but not limited to, entry fields, soft buttons, sliders, maps, images, and videos. In some embodiments, the interactive elements of the GUI 680 are configured to instruct the GUI 680 or the backend application 664, or both, to perform various operations. As an example, a soft button (e.g., a "next" button) instructs the GUI 680 to navigate from one page to another. Another soft button (e.g., a "submit" button) instructs the GUI 680 to navigate from one page to another while concurrently instructing the backend application 664 to store and/or process information submitted by a user into an entry field elsewhere within the GUI 680. In some embodiments, the backend application 664 functions to receive inputs from the GUI 680 and coordinates the functions of the authorization module 665, the credential management system 667, the user database 668, and the geofence module 670 to deliver emergency data requests to the clearinghouse, receive emergency data from the clearinghouse, and display the emergency data to the users of the emergency response application 660. In some embodiments, one or more geofences are stored within one or more geofence databases 679 accessible by the geofence module 670. In some embodiments, credentials are stored within one or more credential databases 669 accessible by the credential management system 667.

As mentioned above, in some embodiments, the emergency response application 660 is a webpage that can be accessed through an internet or web browser. In such embodiments, the emergency response application 660 can be quickly and easily integrated into the systems used by emergency service providers (ESPs), such as public safety answering points (PSAPs), because accessing and using emergency response application 660 requires no additional software or hardware outside of standard computing devices and networks. As previously discussed, one of the greatest hinderances that PSAPs face in providing emergency assistance to people experiencing emergency situations is in acquiring accurate locations of the emergencies and the people involved, because PSAPs are currently typically limited to verbally asking for and verbally receiving locations from callers. In some embodiments, the clearinghouse is capable of receiving accurate locations (as well as additional emergency data, as described above) from electronic devices such as smartphones and delivering the accurate locations to the appropriate PSAPs during emergency situations. Therefore, it is advantageous to provide the emergency response application 660 to PSAPs in the form of a webpage accessible through a standard web browser, in order to provide the potentially life-saving information stored within the clearinghouse to those capable of providing emergency assistance as quickly and easily as possible.

In providing the emergency response application 660 to ESPs (and the potentially sensitive emergency data stored within the clearinghouse, by extension) in the most accessible way possible, it is advantageous to provide rigorous security precautions and functions specifically created and suited for the emergency response application 660, as will be described below. In some embodiments, if an ESP desires to access the emergency data stored within the clearinghouse, an administrator of the ESP (hereinafter. "ESP administrator" or "ESP admin") can navigate to the emergency response application 660 using a URL in a standard web browser. The ESP administrator can then use interactive elements of the GUI 680 to request access to the clearinghouse using the emergency response application 660. In some embodiments, upon selecting to request access to the emergency response application 660, the emergency response application 660 prompts the ESP administrator to submit information 683 about the ESP through the GUI 680. In some embodiments, the information about the ESP includes the name of the ESP (hereinafter. "ESP name"), a non-emergency hardline telephone number of the ESP (hereinafter. "non-emergency number"), the coverage area or jurisdiction of the ESP (e.g., a geofence), and other information. In some embodiments, other information includes at least one of a type of computer aided dispatch (CAD) system used by the ESP (e.g., a PSAP), a type of phone system used by the ESP, a type of mapping system used by the ESP, and an estimated population covered by the ESP (e.g., an approximate number of people who reside within the jurisdiction of the ESP). In some embodiments, the ESP administrator can use interactive elements to define a geofence representing the jurisdiction of the PSAP, as described above. In some embodiments, the ESP is not granted access to the emergency response application 660 if some or all of the required information is not submitted by the ESP administrator. In some embodiments, the ESP administrator edits or resubmits the information about the ESP by selecting an ESP Information tab. In some embodiments, after the ESP is granted access to the emergency response application 660 and/or the clearinghouse, the ESP administrator can create accounts for other employees or members of the ESP by selecting an Access tab. In some embodiments, after a request for access to the emergency response application 660 is received by the emergency response application 660, an organization is created for the requesting PSAP within the credential management system 667 and an account node is created for the PSAP administrator within the credential management system 667 and linked with the organization, as described below.

In some embodiments, after the ESP administrator submits a request for access to the emergency response application 660 and/or the clearinghouse, the emergency response application 660 creates an account for the ESP administrator and stores the account for the ESP administrator in the user database 668. In some embodiments, the account created for the ESP administrator includes information about the ESP administrator such as, but not limited to, the name of the ESP administrator, an email address and/or telephone number of the ESP administrator, a system identifier (hereinafter. "system ID") for the ESP administrator, and an identifier of the ESP (e.g., the name of the ESP). In some embodiments, the request for access to the emergency response application 660 submitted by the ESP administrator must be verified before the ESP administrator is given further access to the emergency response application 660. For example, in some embodiments, the request for access must be verified before the ESP administrator is granted the ability to perform functions such as creating accounts for other employees or members of the ESP or requesting emergency data through the emergency response application 660. In some embodiments, requests for access to the emergency response application are manually verified by public safety professionals, such as by communicating with local government agencies to determine that the information about the ESP requesting access is true and correct. In some embodiments, requests for access to the emergency response application are automatically verified by the EMS or emergency response application 660 if all of the information about the ESP requesting access correctly match previously received or confirmed information. In some embodiments, if some or all of the information about the ESP requesting access is determined to be untrue or false, the request for access to the emergency response application 660 is denied. In some embodiments, if some or all of the information about the ESP requesting access is determined to be untrue or false, the request for access is denied and the ESP is flagged for further investigation.

In some embodiments, after an account is created for the ESP administrator in the user database 668, the ESP administrator can create accounts for employees or other members of the ESP. In some embodiments, the emergency response application 660 will not allow an ESP administrator to create accounts for other members of the PSAP until a request for access to the emergency response application from the ESP administrator is verified. In some embodiments, neither the ESP administrator nor any account other created by the ESP administrator can access emergency data stored within the clearinghouse until after the request for access to the emergency response application 660 has been approved. In some embodiments, when a new account is created within the user database 668, a new account node is concurrently created for the new account within the credential management system 667, as described below. In some embodiments, access keys or credentials allow for differential access to different recipients, as described below.

Authentication, Credentials, and Roles

To ensure the security, privacy and integrity of the data provided to the ESP, proper authentication may be required at various steps. The authorization process may require the ESP member or user of the emergency response application to verify their identity through the use of credentials such as log-in password, config file (e.g., a configuration created in a third-party system), etc. In some embodiments, the ESP member provides fingerprint, voice command, etc. to log-in, which can be verified.

Various types of credentials may be utilized as a part of the authentication process. Credentials may be generated, stored, verified and validated by the EMS. For example, the credentials may be generated, but must be verified (e.g., phone verification) before use. In some embodiments, the credentials are valid for a specific duration of time (e.g., 1 minute, 5 minutes, 1 hour, 24 hours). Some credentials that may be used are access keys, admin credentials, time-limited tokens, etc. In some embodiments, credentials are transmitted through secure pathways (e.g., using encryption).

In some embodiments, credentials are used in a two-step authentication process. For example, the authentication may require: (i) a log-in and password for the ESP member to log-in the ESP system and (ii) a time-limited token to be generated based on an authentication request. In some embodiments, a role (as described above) may be combined with to create a three-step authentication process. For example, an administrator of the ESP could have designated roles for various ESP members and selected specific data categories to be made accessible for each role.

In contrast to system-generated credentials which must be created, stored and managed in specific ways, roles can be assigned by the admin to each member of the ESP. For example, roles can include admin, agent, call taker, supervisor, manager, etc. In contrast to credentials, roles do not need to be verified by system as they are usually admin-defined. In addition, the admin can update the role of an ESP member to accurately reflect changes in jobs, positions and responsibilities. In this way, the use of the roles allows the admin to customize the management portal to reflect the organizations under their supervision. In some embodiments, an ESP member can have multiple admin-defined roles.

In some embodiments, the authentication of the data request may be through the use of a credential, which is included in the data request (e.g., in the header of the request). When the emergency clearinghouse receives the request, the credential (e.g., a token) is verified to ensure that it is valid and has not expired. In some embodiments, the data request may also include an identifier for the admin-defined role for the ESP member.

In some embodiments, the ESP member or user is subscribed to the emergency data received within the ESP jurisdiction, as described above and below. In this way, the credential system ensures that emergency data that is relevant for the ESP member is accessible and updates are available quickly and efficiently.

Due to the diversity of ESP members (e.g., call dispatcher, PSAP manager, police, paramedic) and the need for accurate and relevant data, there are specific challenges for emergency response. Although system-defined credentials may also be used to restrict access to emergency data, admin-defined roles were incorporated to allow the customization needed for different ESP members. In this way, the present system allows for both secure authentication and significant customizations for managing access to emergency data for various members of the organization.

Emergency Data and Alarm Data Sharing System

Figure 7:
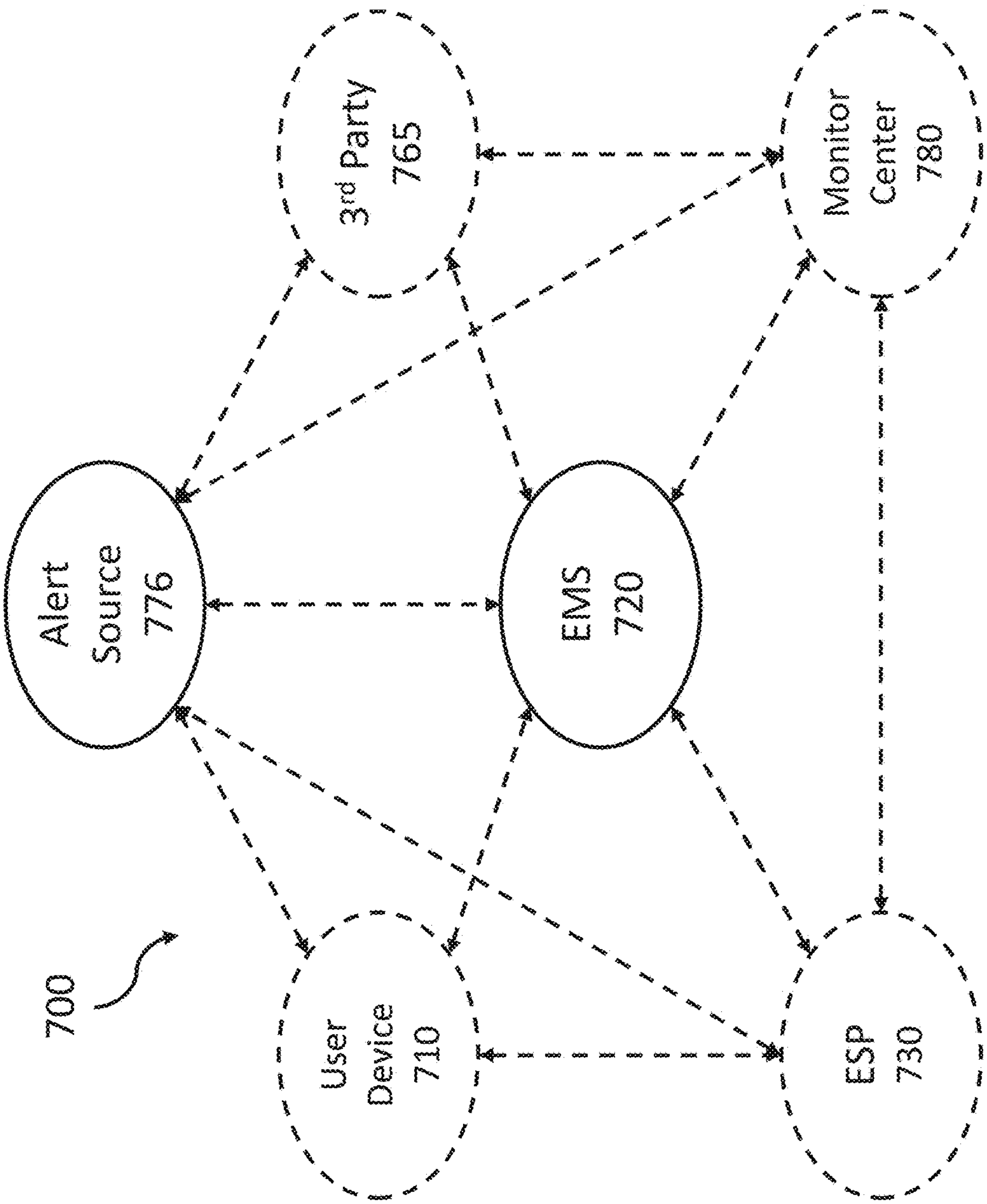
FIG. 7 depicts a system for providing emergency response assistance by an emergency management system (EMS) in accordance with one embodiment of the present disclosure.

FIG. 7 depicts a diagram of a system 700 for providing emergency response assistance by an emergency management system. In some embodiments, as depicted by FIG. 7, the system 700 includes an alert source 776, an emergency management system (EMS) 720 (as described above), and a monitoring center 780 (as described above). In some embodiments, the system 700 includes the alert source 776, the EMS 720, the monitoring center 780, and an emergency service provider (ESP) 730 (as described above). In some embodiments, the system 700 includes the alert source 776, the EMS 720, and the ESP 730. In some embodiments, the system 700 optionally includes a user device 710 or a third-party server system 765. In general, the components of the system 700 work cooperatively to generate emergency alerts, transmit the emergency alerts to relevant parties, and deliver emergency data related to the emergency alerts to the relevant parties. As depicted in FIG. 7, the EMS 720 may be communicatively coupled to any and all components of the system 700 and is thereby able to function as a central communication hub for any and all of the components of the system 700.

Typically, as mentioned above, emergency service providers (ESPs; e.g., public safety answering points) are only capable of receiving verbal requests for emergency service (hereinafter, "traditional emergency service requests") through telephone calls. For example, typically, when a person in the United States experiences an emergency, they must dial 9-1-1 using a telephone to be connected to emergency service providers. Then, after dialing 9-1-1 and being connected to an emergency service provider, they must verbally relay the nature of their emergency as well as any additional relevant information (such as their location or medical history) to the emergency service provider over the phone. Or, for example, when a home security alarm is tripped (such as by a burglar), a notification is sent to a monitoring center (e.g., a central monitoring station), and a call taker at the monitoring center must call 9-1-1 and verbally relay the nature of the emergency to an emergency service provider. System 700 provides systems and methods for delivering digital emergency service requests and emergency data associated with emergency alerts to emergency service providers, as described below. System 700 also provides systems and methods for delivering digital emergency service requests and alarm data associated with alarms to emergency service providers. System 700 also provides systems and methods for sharing emergency data associated with emergency alerts with monitoring centers, as described below. System 700 also provides systems and methods for sharing emergency data between monitoring centers and emergency service providers, as described below.

Supplemental Data for Monitoring Centers

Figure 8:
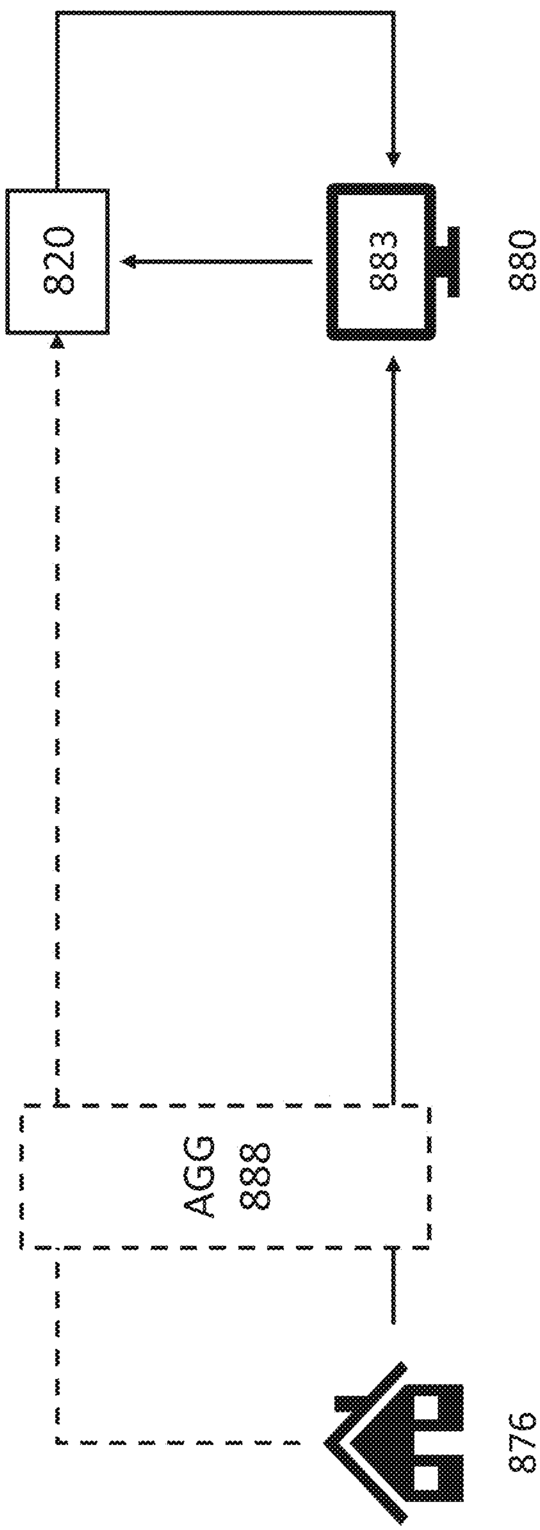
FIG. 8 depicts a flow diagram of a method for providing emergency response assistance by an emergency management system (EMS) in accordance with one embodiment of the present disclosure.

FIG. 8 depicts a flow diagram of a method for providing emergency assistance by an emergency management system (EMS). In some embodiments, as mentioned above, the system 700 (as depicted in FIG. 7) provides systems and methods for sharing emergency data associated with emergency alerts with monitoring centers. In some embodiments, a method for providing emergency response assistance by an emergency management system (EMS) comprises: a) providing an emergency response application to a monitoring center, wherein the emergency response application is a web application accessed by the computing device at the monitoring center using an internet browser; b) receiving an emergency data request associated with an emergency alert from the monitoring center through the emergency response application; c) gathering emergency data associated with the emergency alert; d) transmitting the emergency data associated with the emergency alert to the monitoring center; and e) displaying the emergency data associated with the emergency alert within the emergency response application.

For example, as depicted in FIG. 8, in some embodiments, when an alarm (also referred to as an "automatic alarm"; i.e., an emergency alert automatically generated by a device or system without user input) is generated by an alarm source 876 (e.g., when a home security alarm is triggered), the alarm (e.g., a notification regarding the alarm) is transmitted to a monitoring center 880 (also referred to as a "central station"). For example, a call taker at the monitoring center 880 may receive the alarm at the call taker's computing device at the monitoring center 880, such as through a call handling or alarm handling software application 883 (also referred to as "automation software") executed on the computing device. In some embodiments, the alarm is first received by an alarm aggregator 888 (also referred to as a "receiver") before being transmitted to the monitoring center 880 by the alarm aggregator 888.

Figure 9A:
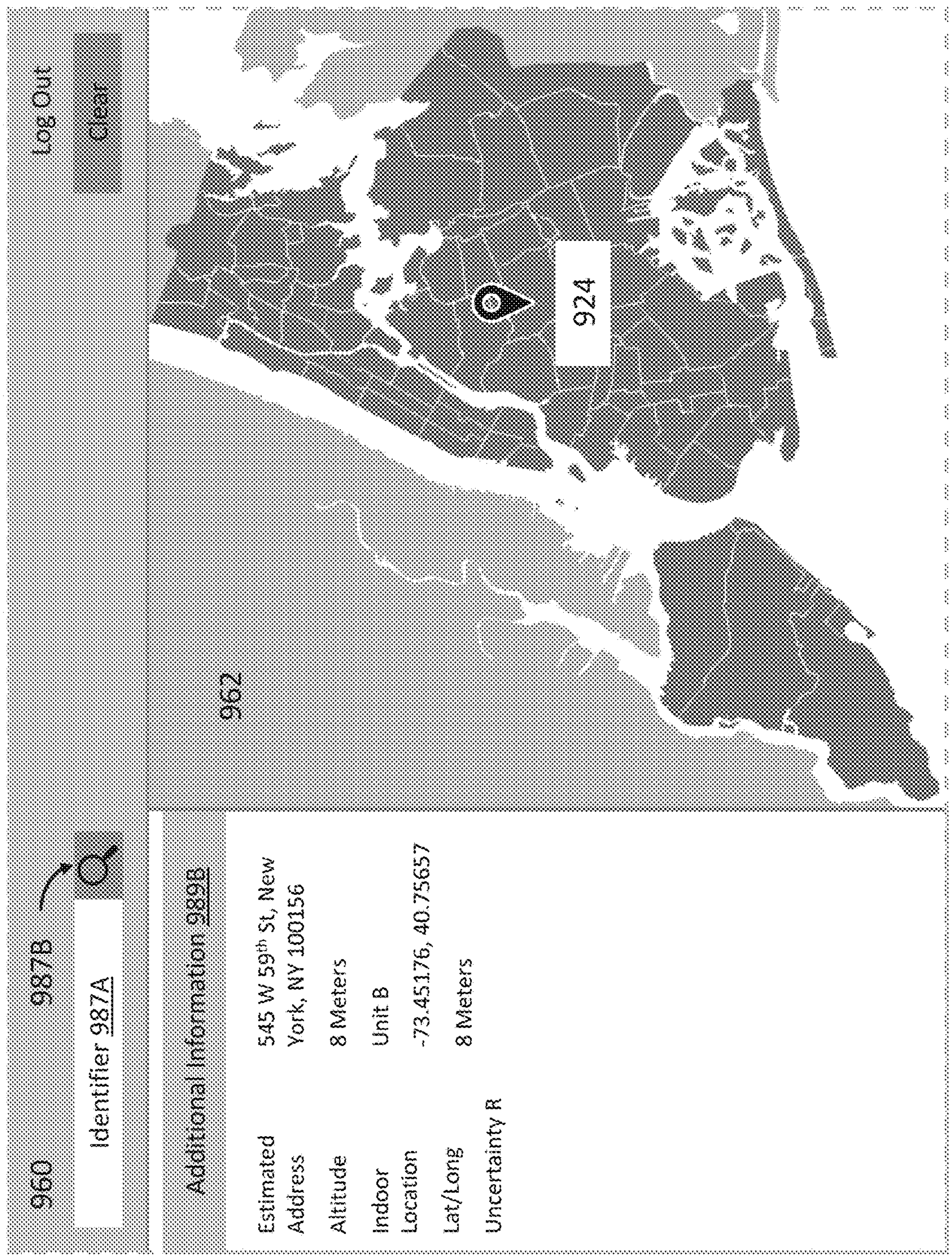
FIGS. 9A and 9B illustrate examples of a graphical user interface of an emergency response application in accordance with one embodiment of the present disclosure.
Figure 9B:
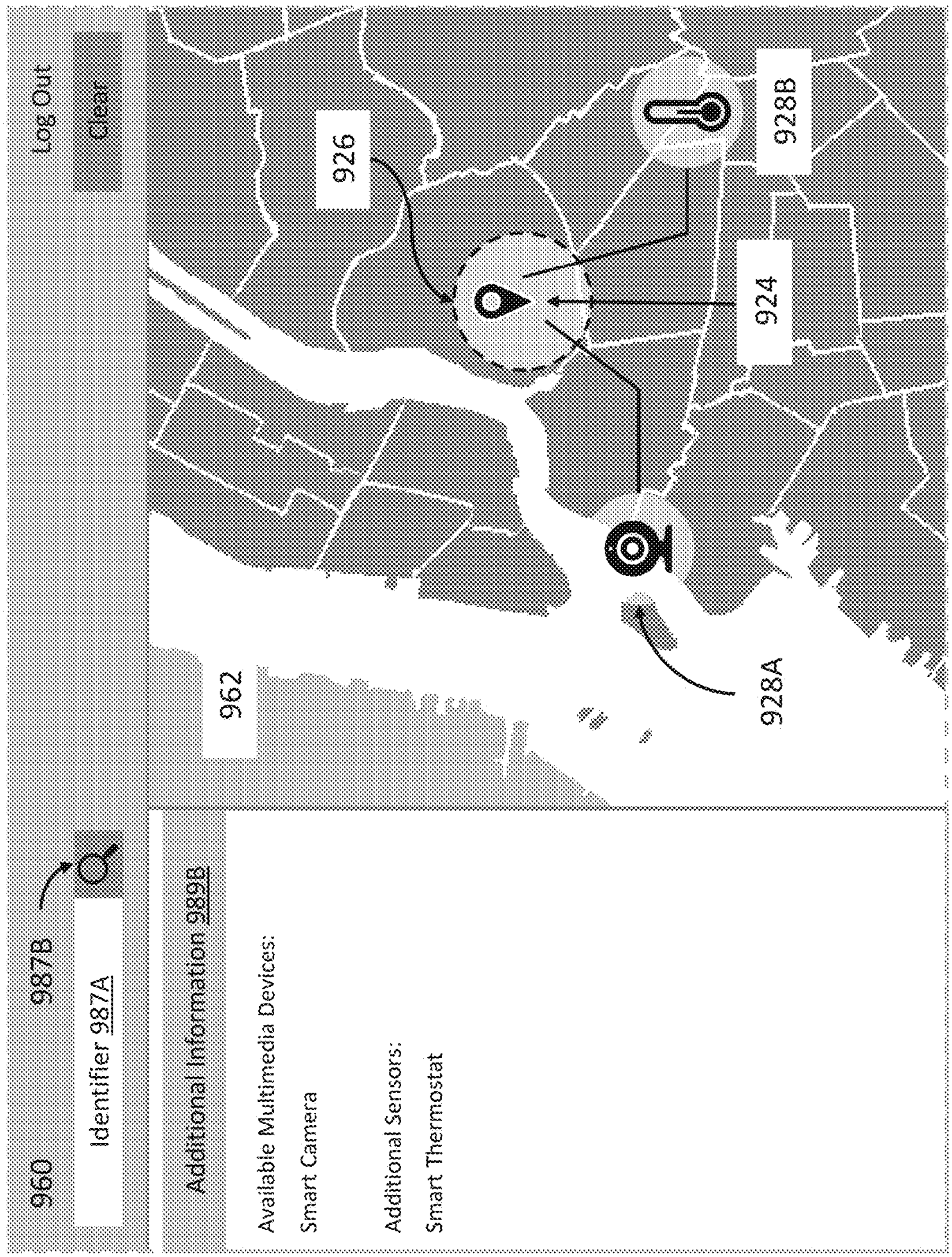
Figure 12:
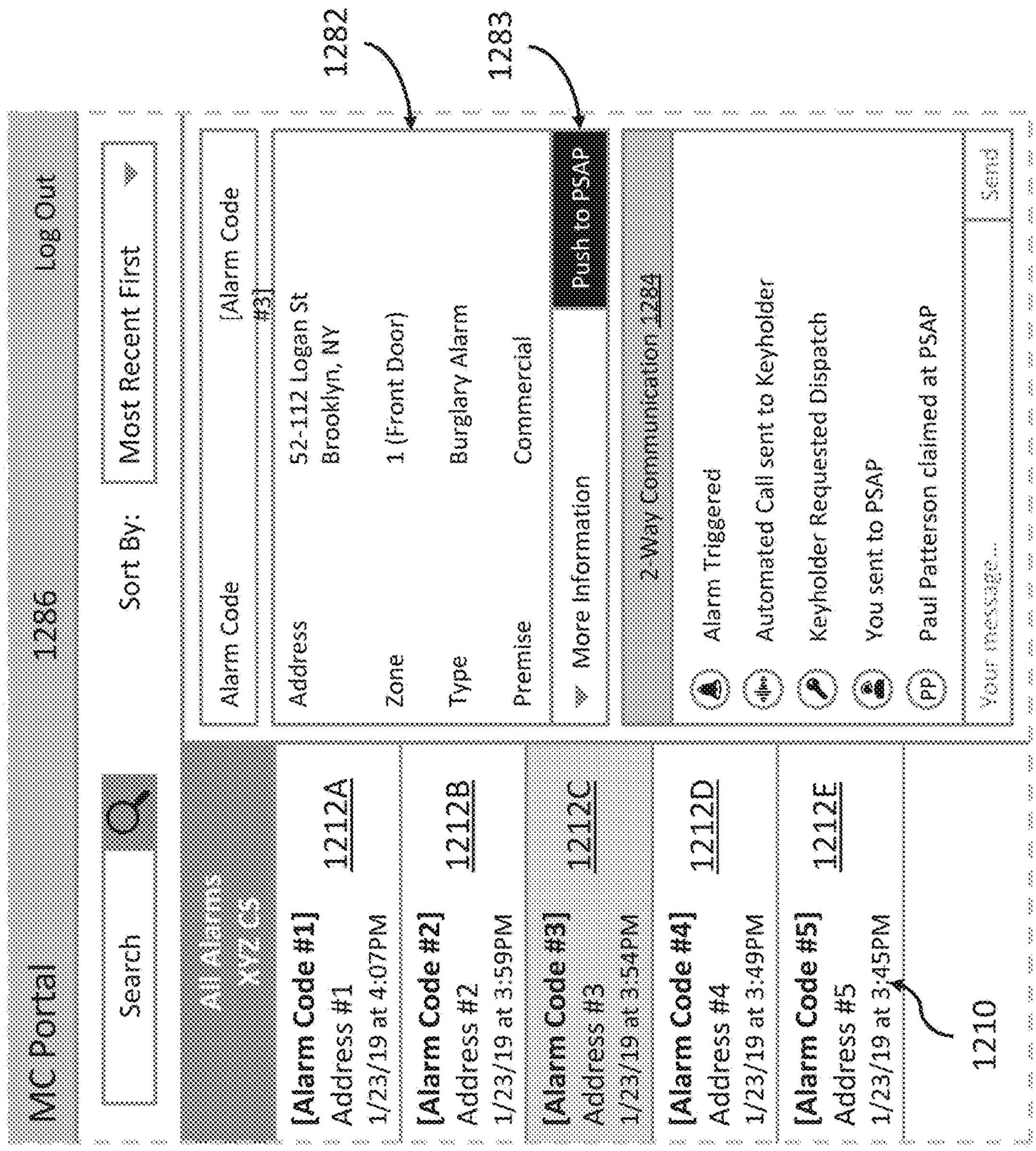
FIG. 12 illustrates an example of a graphical user interface of a monitoring center portal in accordance with one embodiment of the present disclosure.

After the monitoring center 880 receives the alarm (e.g., the notification of the alarm), the monitoring center 880 can transmit an emergency data request to the emergency management system 820 through a computing device at the monitoring center 880. In some embodiments, the emergency data request is submitted and transmitted through a call handling or alarm handling software application 883 executed on the computing device at the monitoring center 880. In some embodiments, the emergency data requested is submitted and transmitted through an emergency response application (e.g., a monitoring center portal, as depicted in FIG. 12) provided by the EMS 820 and accessed by the computing device at the monitoring center 880, as mentioned above. FIGS. 9A and 9B illustrate examples of a graphical user interface of an emergency response application provided to a monitoring center by the EMS 820.

In some embodiments, when the alarm is transmitted to the monitoring center 880, either by the alarm source 879 or an alarm aggregator, the alarm (e.g., a notification of the alarm) and any available data associated with the alarm (hereinafter. "alarm data") is transmitted to the emergency management system 820 in parallel. In such an embodiment, the emergency data request transmitted to the EMS 820 can include a unique identifier of the alarm (also referred to as an "alarm identifier"). In the example graphical user interface (GUI) of an emergency response application 960 provided by the EMS 820 to a monitoring center illustrated in FIG. 9A, a call taker 890 at a monitoring center can transmit an emergency data request to the EMS 820 by typing the alarm identifier into the entry field 987A and selecting the search button 987B. The EMS 820 can then use the alarm identifier included in the emergency data request to identify and gather emergency data associated with the alarm. The EMS 820 can gather emergency data associated with an alarm from various sources. For example, in some embodiments, the EMS 820 gathers emergency data associated with an alarm from data included in the alarm data. In some embodiments, the EMS 820 gathers emergency data associated with an alarm from one or more databases stored within a clearinghouse for emergency data, as described above. In some embodiments, the EMS 820 gathers emergency data associated with an alarm from a third-party server system. After the EMS 820 gathers emergency data associated with the alarm, the EMS 820 can then transmit the emergency data associated with the alarm to the monitoring center 880 (e.g., through a computing device at the monitoring center) and display the emergency data associated with the alarm within the emergency response application 960. For example, the emergency response application 960 may display additional information 989B associated with the alarm within one section of the GUI and a location 924 associated with the alarm within an interactive map 962.

In some embodiments, when an alarm (e.g., a notification of an alarm) is transmitted to the monitoring center 880, the alarm is not transmitted to the EMS 820. In such embodiments, the EMS 820 can receive an emergency data request regarding the alarm and gather emergency data associated with the alarm in various ways. For example, in some embodiments, the alarm is associated with an alternative identifier, such as a phone number or email address. The monitoring center 880 (e.g., a call taker at the monitoring center using a software application at the monitoring center) can then submit the alternative identifier (e.g., a phone number or email address) associated with alarm into the entry field 987A and select the search button 987B, thereby transmitting an emergency data request including the alternative identifier to the EMS 820. The EMS 820 can then use the alternative identifier (e.g., a phone number or email address) associated with the alarm to identify and gather emergency data associated with the alarm, as described above.

Geospatial Queries

In some embodiments, geospatial queries (i.e., queries or requests that include identifiers of geospatial areas) may be used for obtaining emergency data (as opposed to queries or requests that include only user identifiers or device identifiers). Geospatial queries may include a location such as lat-long (and z-axis), an address, a building a landmark, an area, a campus, etc. In some embodiments, the geospatial query can be generated by a function on a geographical map (e.g., a zoom in function around the emergency location), where sensors within the vicinity of the emergency are displayed.

As shown in the GUI of an emergency response application 960 provided by the EMS 820 to a monitoring center illustrated in FIG. 9B, in some embodiments, a user of an emergency response application 960 provided to a monitoring center 880 (e.g., a call taker) may submit an emergency data request in the form of a geospatial query. In some embodiments, when a monitoring center 880 receives an alarm (e.g., a notification of an alarm), the alarm includes a location associated with the alarm (e.g., an address of the house where a home security alarm was triggered). The monitoring center 880 can then transmit an emergency data request to the EMS 820 in the form of a geospatial query by providing the location associated with alarm through the GUI of the emergency response application 960 (e.g., through the interactive map 962 or the search function 987B). However, a geospatial query may include other types of identifiers of geospatial areas, such as geospatial boundaries and identifiers associated with geofences, as described below with respect to FIG. 20. Just as geospatial queries may be transmitted to the EMS by a monitoring center 880, geospatial queries may also be transmitted to the EMS by emergency service providers (ESPs), as described below.

In some embodiments, emergency data is made available to a specific requesting party with proper authorization and/or user consent. For example, in some embodiments, a geospatial query will be available only for authorized users (e.g., PSAPs with authoritative jurisdiction over the emergency location) and other types of access controls (e.g., medical data is available to ESP users with medical training). A user may be prompted to provide consent for sharing emergency data during registration of the device, after an emergency signal has been initiated or at another time.

After receiving a geospatial query including a location associated with alarm, the EMS 820 can then use the location associated with alarm to identify and gather emergency data associated with the alarm. For example, the EMS 820 can identify other electronic devices associated with or in proximity to the location of the alarm and identify emergency data associated with identifiers associated with those electronic devices as emergency data associated with the emergency alert. Alternatively or additionally, in some embodiments, the EMS 820 can identify sensor devices 928 that the EMS 820 may have access to within a radius 926 of the location associated with the emergency alert and display these sensors devices 928 within the GUI of the emergency response application 960. For example, in the example illustrated by FIG. 9B, the EMS 820 has identified two sensors within the radius 926 of the location associated with the emergency alert, smart camera 928A and smart thermostat 928B. The call taker can then select a sensor device 928 to receive emergency data from. In some embodiments, the radius 926 is defined or specified by the geospatial query. In some embodiments, the radius 926 is predetermined by the EMS 820.

Sensor Database

In some embodiments, a method for identifying relevant sensors is disclosed. When the EMS receives an emergency signal from a communication device, for example, a panic button on a mobile wireless device, the EMS identifies relevant sensors in the vicinity. In some embodiments, the EMS may send a query to a database of IoT devices associated with that location (e.g., address) or user. The IoT devices may include temperature sensors, or pressure sensors, which may have addition information about the emergency situation. In some embodiments, the database may include communication devices associated with a physical address or user.

Upon receiving a returned list of IoT devices that may have situational awareness information about the emergency from the database, the EMS may request to establish a communication link with each of these sensors, either directly or via in-directly via an intermediate device for example a hub. When the communication link is established, a communication session with these individual sensors can provide pertinent information stored on the sensor about emergency assistance. Once the EMS has received sensor data, it may proceed with a verification process and provide relevant and reliable sensor data to the appropriate ESP and responders.

In some embodiments, the EDC or EMS may assign unique numbers to each sensor or hub so they can be called for information during an emergency. In some embodiments, the unique number assigned to individual sensors may follow a set format wherein the unique number assigned to a given sensor is sensitive to the location, type and housing structure where the sensor is located. In some embodiments, the sensor name can be used to identify the area and building where the sensor is location.

In some embodiments, the sensor database is displayed on a geographical map and the ESP user can click on each link to get more information and request data from the sensor. In some embodiments, a prompt may be sent to the user for access to the sensor data by the ESP user, EMS or others. In some embodiments, a prompt may be sent to the user for consent or permission to access emergency data before the data is shared. In some embodiments, the validity of the credentials associated with the requesting party is checked. In some embodiments, the location of the sensor is not shared unless it is found to be within the geofence associated with the requesting party.

Figure 10A:
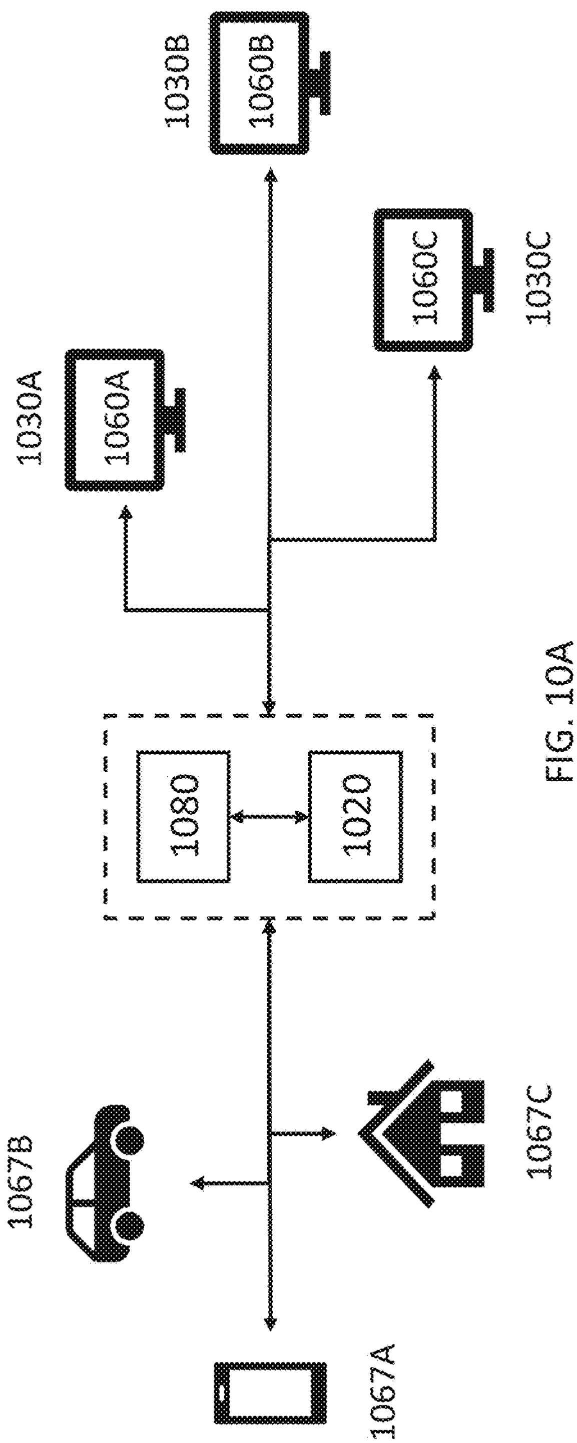
FIGS. 10A and 10B depict flow diagrams of methods for providing emergency response assistance by an emergency management system (EMS) in accordance with one embodiment of the present disclosure.

Facilitating Data Sharing Between Monitoring Centers and Emergency Service Providers In some embodiments, as mentioned above, the system 700 (as depicted in FIG. 7) provides systems and methods for sharing emergency data between monitoring centers and emergency service providers. In some embodiments. FIG. 10A depicts a flow diagram of methods for providing emergency response assistance by an emergency management system (EMS). In some embodiments, a method for providing emergency response assistance by an emergency management system (EMS) comprises: a) receiving emergency data associated with an emergency alert from a monitoring center, wherein the emergency data comprises a location associated with the emergency alert; b) retrieving a plurality of geofences associated with a plurality of ESPs; c) determining that the location associated with the emergency alert is within a geofence associated with a first ESP from the plurality of ESPs; and d) in response to determining that the location associated with the emergency alert is within the geofence associated with the first ESP: i) transmitting the emergency data to the first ESP; and ii) displaying the emergency data through an emergency response application executed on a computing device at the first ESP. In some embodiments, a method for providing emergency assistance by an emergency management system (EMS) comprises: a) receiving credentials associated with an account of an ESP personnel through an emergency response application executed on a computing device associated with a first ESP; b) identifying an ESP ID associated with the account of the ESP personnel; c) receiving emergency data associated with an emergency alert from a monitoring center, wherein the emergency data comprises a location associated with the emergency alert; d) retrieving a plurality of geofences associated with a plurality of ESP IDs associated with a plurality of ESPs; e) determining that the location associated with the emergency alert is within a geofence associated with the ESP ID associated with the account of the ESP personnel; and f) in response to determining that the location associated with the emergency alert is within the geofence associated with the ESP ID associated with the account of the ESP personnel: i) transmitting the emergency data to the first ESP; and ii) displaying the emergency data through the emergency response application executed on the computing device at the first ESP.

For example, as depicted in FIG. 10A, in some embodiments, when an emergency alert is generated by an alert source 1067 (e.g., mobile phone 1067A, intelligent vehicle system 1067B, or home security system 1067C), the emergency alert is transmitted to a monitoring center 1080. In some embodiments, the emergency alert is first received by an alert aggregator (e.g., an alarm aggregator) before being transmitted to the monitoring center 1080. In some embodiments, when the emergency alert is transmitted to the monitoring center 1080, either by the alert source 1067 or an alert aggregator, the emergency alert and any available emergency data associated with the emergency alert is transmitted to the emergency management system (EMS) 1020 in parallel (e.g., directly transmitted to the EMS by the alert source or alert aggregator or automatically transmitted to the EMS by the monitoring center upon receipt). In some embodiments, when the emergency alert is transmitted to the EMS 1020 in parallel, the EMS can then attempt to obtain verification of the emergency alert, as described below. In some embodiments, when the emergency alert is received by the monitoring center 1080, the emergency alert is displayed through an alarm handling software application, as illustrated in FIG. 11. In some embodiments, the alarm handling software application 1191 additionally displays information regarding the emergency alert. In some embodiments, the emergency alert or information regarding the emergency alert is additionally or alternatively displayed within an emergency response application (e.g., a monitoring center portal, as described below) provided by the EMS 1020 and accessed at the monitoring center 1080. In some embodiments, after the emergency alert is received by the monitoring center 1080, the monitoring center 1080 (e.g., a call taker at the monitoring center 1080) attempts to verify the emergency alert by calling a person associated with emergency alert. For example, if the emergency alert is an alarm (e.g., a home security alarm), a call taker at the monitoring center 1080 may call the homeowner of the house where the home security alarm was triggered or a neighbor of the house where the home security alarm was triggered. If a person associated with the emergency alert verifies that the emergency alert was legitimate (e.g., that a break-in to the house where the home security alarm was triggered did occur), or if the call taker is unable to contact any of the persons associated with the emergency alert, the call taker can select a Push to PSAP button 1193 (also referred to as a "request dispatch button") to digitally deliver emergency data associated with the emergency alert to an emergency service provider (ESP) 1030 through the EMS 1020.

In some embodiments, the EMS 1020 attempts to obtain verification of the emergency alert, as described below. In some embodiments, if the EMS 1020 successfully obtains verification of the emergency alert, the EMS 1020 can automatically deliver emergency data associated with the emergency alert to an emergency service provider 1030. In some embodiments, if the EMS 1020 successfully obtains verification of the emergency alert, the EMS 1020 can display verification of the emergency alert within the alarm handling software application 1191 (or an emergency response application provided to the monitoring center 1080 by the EMS 1020), such as within the alarm details section 1192. A call taker at the monitoring center 1080 can then select the Push to PSAP button 1193 to digitally deliver emergency data associated with the emergency alert to an emergency service provider 1030 through the EMS 1020. In some embodiments, emergency data associated with an emergency alert may be delivered to an emergency service provider 1030 without verification of the emergency alert being obtained by the EMS 1020 or the monitoring center 1080. Emergency alerts may be displayed at the emergency service provider 1030 with a label or other indicator of their verification status (e.g., verified vs unverified). In some embodiments, when the Push to PSAP button 1193 is selected, emergency data associated with the emergency alert is transmitted from the monitoring center 1080 to the EMS 1020, which can then transmit the emergency data associated with the emergency alert to an emergency service provider 1030. In some embodiments, emergency data associated with the emergency alert is transmitted from the monitoring center 1080 to the EMS 1020 when the emergency alert is received by the monitoring center 1080, but the EMS 1020 does not transmit the emergency data associated with the emergency alert to an emergency service provider 1030 until the Push to PSAP button 1193 is selected. In some embodiments, when the Push to PSAP button 1193 is selected, emergency data associated with the emergency alert is transmitted directly from the monitoring center 1080 to an emergency service provider 1030. In some embodiments, the emergency data associated with the emergency alert is transmitted to an emergency service provider 1030, whether by the EMS 1020 or the monitoring center 1080, using an application programming interface (API). In some embodiments, the emergency data associated with the emergency alert is transmitted to an emergency service provider 1030, whether by the EMS 1020 or the monitoring center 1080, using a standardized protocol, such as the automated secure alarm protocol (ASAP, also referred to as "ASAP to PSAP"). In some embodiments, when emergency data associated with an emergency alert is transmitted directly from the monitoring center 1080 to an emergency service provider 1030, the EMS 1020 provides the monitoring center 1080 with the endpoint for the appropriate emergency service provider 1030. In some embodiments, when emergency data associated with an emergency alert is transmitted to an emergency service provider (ESP) 1030, the EMS 1020 establishes a two-way communication link between the monitoring center 1080 and the ESP 1030 to facilitate a text-based communication session 1194 between the monitoring center and the ESP 1030. In some embodiments, the text-based communication session 1194 is facilitated through an alarm handling software application 1191, as illustrated in FIG. 11. In some embodiments, the alarm handling software application 1191 provides a GUI showing an activity log 1195. In some embodiments, the text-based communication session is facilitated through an emergency response application provided to the monitoring center 1080 by the EMS 1020. For example, the text-based communication session may be facilitated through a monitoring center portal, as illustrated in FIG. 12.

FIG. 12 illustrates an exemplary embodiment of a monitoring center portal. As mentioned above, in some embodiments, an emergency management system (EMS) provides an emergency response application to monitoring centers. In some embodiments, the emergency response application is a monitoring center portal, as illustrated in FIG. 12. In some embodiments, the monitoring center portal 1286 is a web application accessible by the monitoring center 1080 through a standard web browser. In some embodiments, the monitoring center portal 1286 includes an alarm queue 1210, an alarm details section 1282, and a two-communication session 1284. In some embodiments, the alarm queue 1210 displays one or more alarms 1212 (such as alarms 1212A-1212E). In some embodiments, when a monitoring center 1080 receives an emergency alert (e.g., an alarm), the emergency alert and any associated data are not transmitted to the EMS 1020 in parallel. Instead, in some embodiments, the monitoring center 1080 (e.g., a call taker at the monitoring center) must choose to transmit the emergency alert and any associated emergency data to the EMS 1020, such as by selecting a Push to PSAP button within an alarm handling software application, as described above. In some embodiments, as described above, when a monitoring center 1080 receives an emergency alert (e.g., an alarm), the emergency alert and any associated emergency data (e.g., an alarm and any associated alarm data) is transmitted to the EMS 1020 in parallel. After receiving an emergency alert and any associated emergency data (e.g., from an alert source in parallel to the monitoring center, in response to an action by the monitoring center, or automatically transmitted from by the monitoring center), the EMS 1020 can then display the emergency alert and the associated data within the monitoring center portal 1286. In the example illustrated in FIG. 12, the EMS 1020 has received five alarms (alarms 1212A-1212E) and displays the five alarms 1212 within the alarm queue 1210. As illustrated in FIG. 12, in some embodiments, an alarm 1212 can be selected within the alarm queue 1210 to show alarm data associated with the alarm within the alarm details section 1282. In the example illustrated in FIG. 12, alarm 1212C has been selected and alarm data associated with alarm 1212C is shown within the alarm details section 1282.

In some embodiments, the EMS 1020 can facilitate a two-way text-based communication session 1284 between a monitoring center 1080 and an emergency service provider (ESP) 1030 through the monitoring center portal 1286. For example, in some embodiments, when a call taker at a monitoring center selects a Push to PSAP button (also referred to as a "request dispatch button") within an alarm handling software application (also referred to as "automation software") for a particular alarm, the alarm handling software application is configured to launch the monitoring center portal 1286 (e.g., by autonomously launching an internet browser window and navigating to a URL associated with the monitoring center portal) and prompt the EMS 1020 to transmit the alarm and any associated alarm data to an ESP 1030. The EMS 1020 can then facilitate a two-way text-based communication session between the monitoring center 1080 and the ESP 1030 through the monitoring center portal 1286, as illustrated in FIG. 12. In another example, in some embodiments, as described above, when a monitoring center 1080 receives an alarm, the alarm and any associated alarm data are automatically transmitted to the EMS 1020 (e.g., through an alarm handling software application), which can subsequently display the alarm and associated alarm data within the monitoring center portal 1286, accessed by the monitoring center 1080. In this example, a two-way text-based communication session between the monitoring center 1080 until a call taker at the monitoring center 1080 selects a Push to PSAP button (also referred to as a "request dispatch button") 1283 within the monitoring center portal 1286. Selecting the Push to PSAP button 1283 prompts the EMS 1020 to transmit the alarm and any associated data to an appropriate emergency service provider (ESP) 1030 and facilitate a two-way text-based communication session 1284 between the monitoring center 1080 and the ESP 1030, as illustrated in FIG. 12. Through the two-way text-based communication session 1284, text-based messages may be exchanged between the monitoring center 1080 (e.g., a call taker at the monitoring center) and the ESP 1030 (e.g., a call taker at the ESP). Additionally, information or updates regarding the alarm may also be exchanged between the monitoring center 1080 and the ESP 1030. For example, as illustrated by FIG. 12, statuses such as when an alarm was triggered, if any persons associated with the alarm have been contacted, if any persons associated with the alarm have requested dispatch (e.g., they have confirmed the alarm), when a call taker at the monitoring center requested dispatch (e.g., by selecting the Push to PSAP button 1283), when a call taker has claimed the alarm at the ESP (as described below), and more can be exchanged and displayed through the two-way text-based communication session 1284, as described in further detail below.

Figure 13A:
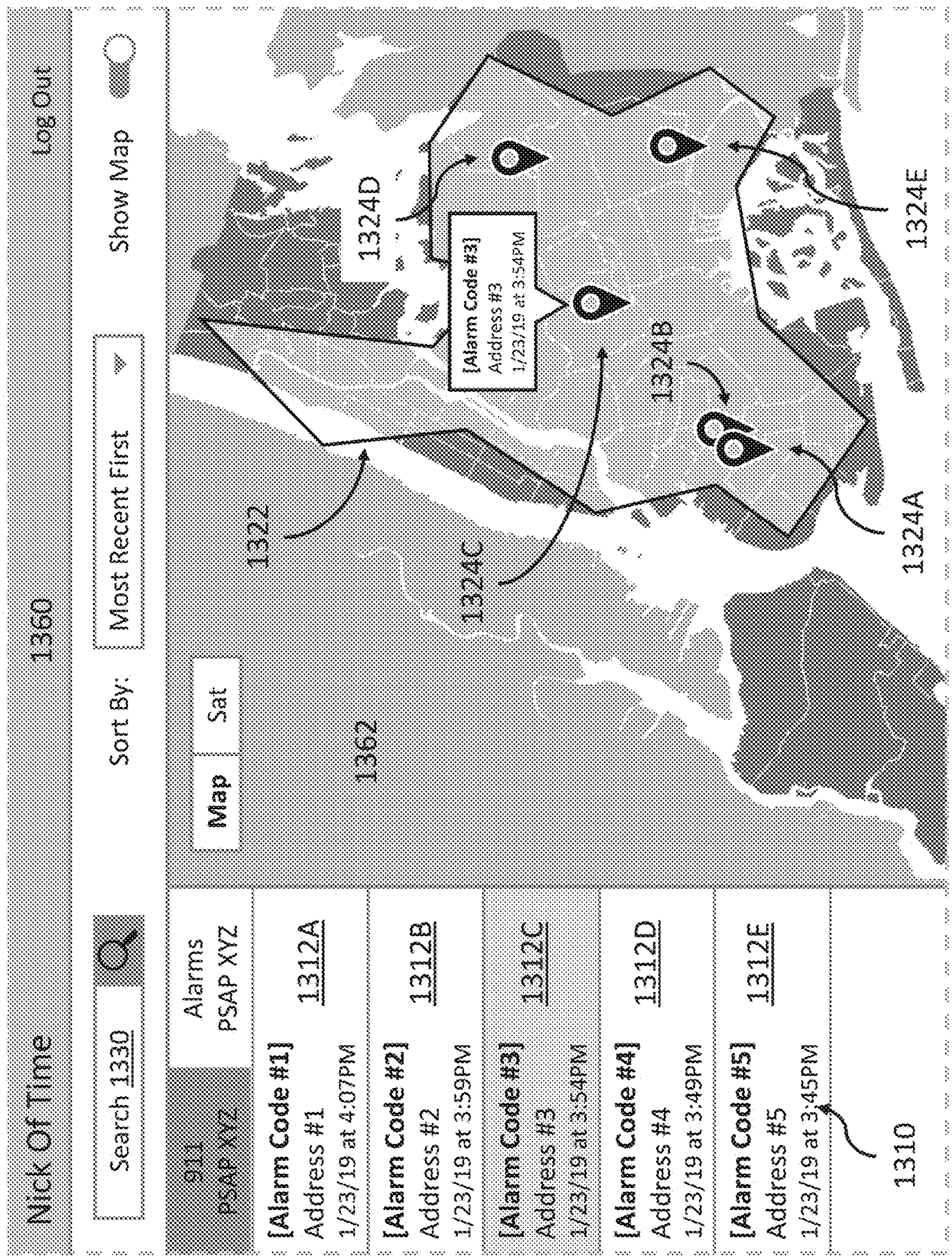
FIGS. 13A, 13B, and 13C illustrate examples of a graphical user interface of an emergency response application in accordance with one embodiment of the present disclosure.
Figure 13B:
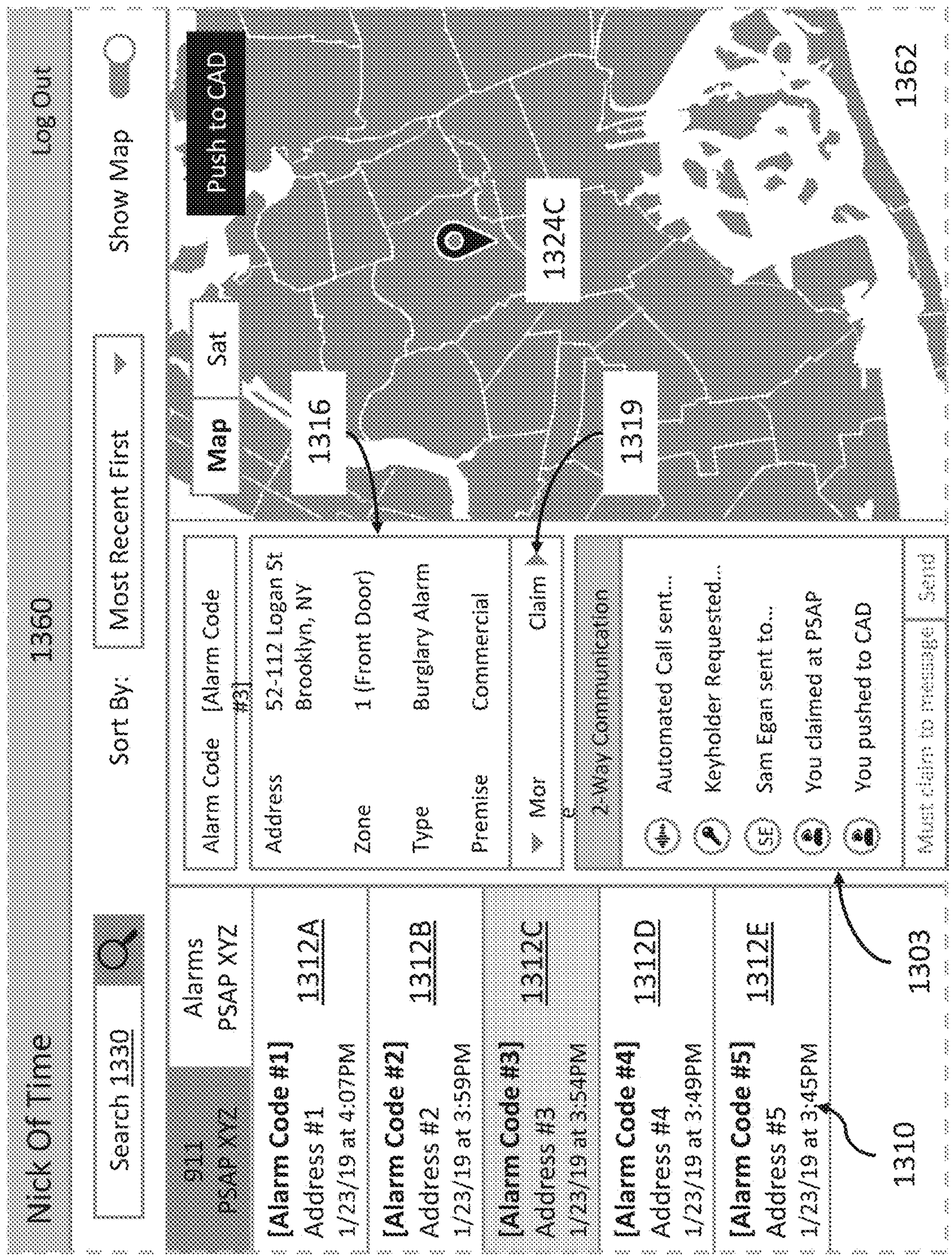
Figure 13C:
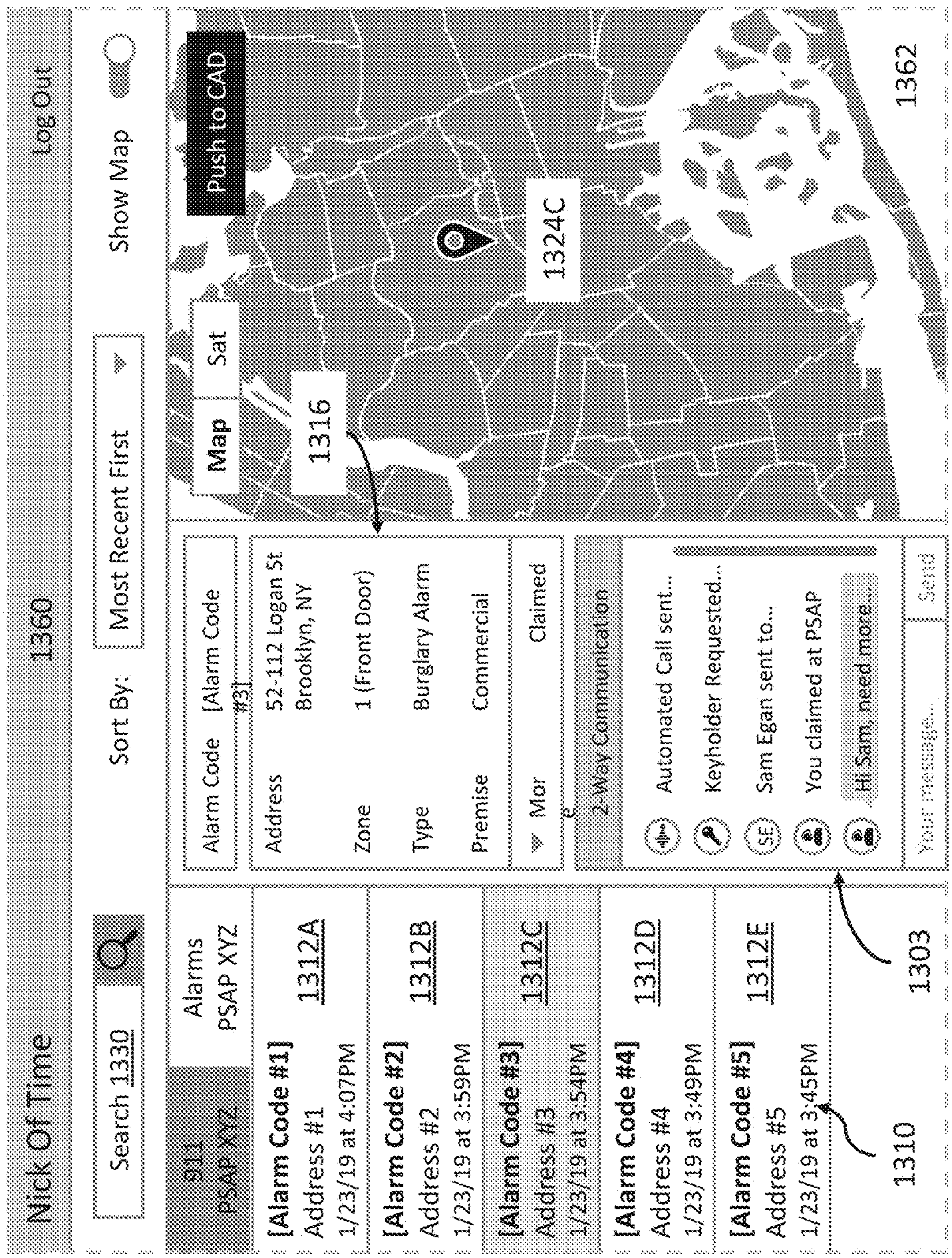

In some embodiments, as mentioned above, a monitoring center 1080 can select to transmit emergency data associated with an emergency alert to an emergency service provider (ESP) 1030 through the emergency management system (EMS) 1020. In some embodiments, the EMS 1020 the transmits the emergency data associated with the emergency alert to the ESP 1030 and displays the emergency data associated with the emergency alert within an emergency response application. FIGS. 13A13B, and 13C illustrate examples of a graphical user interface (GUI) of an emergency response application provided by the EMS 1020 to an ESP 1030. In some embodiments, the emergency response application 1360 is a desktop application. In some embodiments, the emergency response application 1360 is a web application accessed by the ESP 1030 using an internet browser. In some embodiments, the emergency response application 1360 includes an incident queue that displays one or more incidents associated with one or more emergency alerts. In some embodiments, the emergency response application additionally or alternatively includes an interactive map that displays one or more incident locations associated with the one or more incidents associated with the one or more emergency alerts.

As described above, in some embodiments, the EMS 1020 can push emergency data to ESPs using an emergency data subscription system (hereinafter. "subscription system"). For example, a member of an ESP (e.g., a PSAP staff member) logs into the emergency response application 1060B at an ESP console 1030B (e.g., a computing device associated with the ESP) by accessing the emergency response application 1060B (e.g., by navigating to the emergency response application 1060B through a web browser) and submitting their login information through the GUI of the emergency response application 1060B. In some embodiments, when the ESP member logs into the emergency response application 1060B by submitting their login information, the emergency response application 1060B or EMS 1020 then determines an ESP account ID associated with the ESP member's account and establishes an active or persistent communication link (e.g., a websocket connection) with the ESP console 1030B, automatically subscribing the ESP console 1030B to the ESP account ID for the duration of their login session. Then, when a monitoring center 1080 selects to transmit emergency data associated with an emergency alert to an emergency service provider 1030, the EMS 1020 identifies a location associated with the emergency alert (e.g., a location included in the emergency data associated with the emergency alert), retrieves a geofence associated with every ESP registered with the EMS 1020, and determines if the location falls within any of the geofences. In response to determining that the location falls within a geofence associated with the ESP associated with the ESP account ID, the EMS 1020 then associates the location with the ESP account ID and determines if there are any active or persistent communication links established between the EMS 1020 and any computing devices subscribed to the ESP account ID. In this example, because the ESP console 1030B is subscribed to the ESP account ID and actively linked to the EMS 1020 through the active or persistent communication link, the EMS 1020 automatically pushes the emergency data associated with the emergency alert to the ESP console 1030B for display within the emergency response application 1060B. In some embodiments, after receiving an emergency alert and any emergency data associated with the emergency alert, the EMS 1020 identifies a location associated with the emergency alert and retrieves geofences associated only with each ESP for which an active or persistent communication link has been established with the EMS. The EMS 1020 can then determine if the location associated with the emergency alert falls within any of those geofences and automatically push the emergency alert and associated emergency data to the ESP(s) associated with those geofences.

In another example, ESP console 1030A and ESP console 1030B are two different ESP consoles associated with the same ESP (e.g., two computing devices at the same public safety answering point (PSAP)). PSAP A. ESP console 1030C is associated with a second ESP. PSAP B. One day. PSAP call-takers access and successfully log into the emergency response application 1060 (emergency response application 1060A-1060C) at each of the three ESP consoles (ESP console 1030A-1030C), thereby establishing three separate active or persistent communication links, one active or persistent communication link between the EMS 1020 and each of the three ESP consoles. The ESP consoles are automatically subscribed by the EMS 1020 to the ESP account IDs associated with their respective ESPs (ESP ID A for PSAP A and ESP ID B for PSAP B). Both PSAP A and PSAP B are associated with only one geofence, geofence A and geofence B, respectively. Geofences A and B do not overlap. The geofences have previously been tagged within the EMS 1020 with their respective ESP account IDs (e.g., during the registration process for the emergency response application).

Later that day, a home security alarm is triggered by home security system 1067C, which causes home security system 1067C to generate an emergency alert (e.g., an alarm) including a location associated with the home in which home security system 1067C is installed and transmit the emergency alert to monitoring center 1080. A call taker at monitoring center 1080 then calls the homeowner of the home in which home security system 1067C is installed and the homeowner tells the call taker that there has indeed been a break-in to the home. The call taker, having thus obtained verification of the emergency alert, selects a Push to PSAP button within their alarm handling software application, which causes emergency data associated with the emergency alert to be transmitted to the EMS 1020 to be delivered to an ESP 1030. When the EMS 1020 receives the emergency data associated with the emergency alert, the EMS 1020 retrieves some or all of the geofences stored within the EMS 1020 and determines if the location associated with the home (identified by the EMS 1020 within the data associated with the emergency alert) falls within any of the geofences stored within the EMS 1020. In this example, the EMS 1020 determines that the location falls within geofence A, associated with PSAP A. In response, the EMS 1020 tags the location with the ESP account ID associated with geofence A. ESP ID A. The EMS 1020 then determines if there are any active or persistent communication links established between the EMS 1020 and any ESP consoles 1030 subscribed to ESP ID A and automatically pushes the emergency data associated with the emergency alert to those ESP consoles for display within the emergency response application 1060. In this example, both ESP console 1030A and ESP console 1030B are subscribed to ESP ID A, so the EMS 1020 automatically pushes the emergency data associated with the emergency alert to both ESP console 1030A and ESP console 1030B for display within emergency response application 1060A and 1060B, respectively. The location associated with the home does not fall within geofence B, however, because geofence A and geofence B do not overlap, so the emergency data associated with the emergency alert is not pushed to ESP console 1030C, even though an active or persistent communication link has been established between the EMS 1020 and ESP console 1030C.

In some embodiments, once the emergency data associated with the emergency alert is transmitted to an ESP 1030 for display within the emergency response application 1360, an incident 1312 is created for the emergency alert within the emergency response application 1360. In some embodiments, as depicted in FIG. 13A, the emergency response application 1360 includes an incident queue 1310 (also referred to as a "list of incidents") that displays incidents 1312 associated with emergency alerts (which may be represented within the list of incidents as digital emergency service requests, as described below). In some embodiments, when emergency data associated with the emergency alert is transmitted to the emergency response application 1360, an incident 1312 is created for the emergency alert and displayed within the incident queue 1310. In some embodiments, the incident queue is prioritized based on type and severity of the emergency. For example, in some embodiments, as illustrated by FIG. 13A, the incident queue 1310 may be divided into two or more tabs for different types of emergency alerts or different priority emergency alerts. For example, in the example illustrated by FIG. 13A, the incident queue 1310 may be divided into two tabs, one for emergency alerts associated with 911 calls and one for emergency alerts associated with alarms. In some embodiments, as depicted by FIG. 13A, an incident 1312 created for an emergency alert is displayed with emergency data associated with the emergency alert, such as an alarm code, a location or address, and the date and time at which the emergency alert was generated. In some embodiments, an incident 1312 created for an emergency alert displays an alarm identifier associated with the emergency alert. For example. FIG. 13A depicts five incidents 1312 associated with five different emergency alerts. 1312A-1312E. Incident 1312A is displayed with the [Alarm Code #1] representing the type of alarm of the emergency alert that incident 1312A was created for. It is contemplated that incidents within the incident queue 1310 may be displayed or ordered in any manner for clarity and efficiency. In some embodiments, the incident queue 1310 is ordered sequentially based on the time that the incidents 1312 are created. In some embodiments, the incident queue 1310 is prioritized based on type of emergency, severity of the emergency or other appropriate factors. In some embodiments, the ESP user is required to respond to incidents 1312 in the incident queue 1310 sequentially. In some embodiments, the ESP user may select or respond to any incident 1312 the incident queue 1310 in any order. In some embodiments, the incident queue 1310 includes a search box 1330 that allows the user to quickly find incidents within the incident queue 1310. In some embodiments, the search box 1330 allows for searching in current incidents within the incident queue 1310. In some embodiments, the search box 1330 allows for searching through historical incidents. In some embodiments, the search box 1330 allows for searching current incidents and historical incidents. In some embodiments, a historical incident is an incident terminated or resolved anytime in the previous 5 mins, 30 mins, 60 mins, 3 hours, 6 hours, 12 hours, or 24 hours. In some embodiments, a historical incident is an incident terminated or resolved at a previous time.

In some embodiments, the emergency response application 1360 includes an interactive map 1362. In some embodiments, the emergency response application 1360 displays one or more geofences 1322 associated with the ESP for which the emergency response application has been accessed. In some embodiments, the emergency response application 1360 displays one or more incident locations 1324 (e.g., a location marker) for each incident 1312 listed in the incident queue 1310 within the interactive map 1220. For example. FIG. 13A depicts five incident locations 1324 within the interactive map 1362, incident locations 1324A-1324E, one for each of the five incidents 1312 listed in the incident queue 1310, incidents 1312A-1312E, respectively. In some embodiments, the emergency response application 1360 displays at least one incident location 1324 for each incident 1312 listed in the incident queue 1310. In some embodiments, the emergency response application 1360 displays only one incident location 1324 for each incident 1312 listed in the incident queue 1310. In some embodiments, each incident location 1324 is customizable by the user. In some embodiments, the shape and/or color of each incident location 1324 is customizable. In some embodiments, the shape and color of the incident location 1324 is denoted in the incident queue 1310. In some embodiments, the user is enabled to annotate text next to or within a text box associated with a particular incident location 1324. In some embodiments, the user is enabled to annotate text next to or below each incident 1310 within the incident queue 1310. For example, a user may customize three incident locations 1324 currently displayed within the interactive map 1362 by changing the incident locations 1324 to a "yellow star", and the associated incidents 1312 in the incident queue 1310 are automatically denoted with a "yellow star" adjacent to their respective device identifiers.

In some embodiments, each incident location 1324 is automatically updated or changed. In some embodiments, the incident location 1324 is updated or changed to reflect response status at a PSAP. For example, the incident location 1324 may be flashing to indicate that no user at the PSAP has attended to the associated incident 1312. In another example, the incident location 1324 may automatically change color to indicate that a first responder has been dispatched to the associated emergency location. In another example, an incident location 1324 may automatically change to reflect that an emergency is no longer active. In some embodiments, the user is enabled to toggle on and off incident location customization preferences. In some embodiments, the user is enabled to display emergency data adjacent to an incident location 1324. For example, as depicted in FIG. 13A, an additional data overlay associated with incident 1312C (e.g., the alarm code and the time and date that the associated emergency alert was received) is displayed directly above the incident location 1324C associated with incident 1312C. In some embodiments, data associated with an incident is displayed within the interactive map 1320 in response to the incident 1312 or associated incident location 1324 being selected within the incident queue 1310 or interactive map 1362. In some embodiments, a user can select an incident 1312 or an incident location 1324 by clicking on or hovering over the incident 1312 or incident location 1324. In some embodiments, data associated with the incident is displayed within a GUI, including information 1316 such as the address, zone, type, premise, and contact information.

The emergency response application 1360 may allow an ESP user (e.g., a PSAP call taker) to mark one or more incidents as "Cancel". "Duplicate". "Push to CAD", etc. For example, a fire that is being reported in two incidents 1312A and 1312B may be reporting the same fire. The ESP user (e.g., PSAP call taker, supervisor, emergency responder) may mark one of these incidents as a duplicate. In some embodiments, the ESP user links the two incidents 1312A and 1312B as related. In some embodiments, the ESP user consolidates the two incidents 1312A and 1312B as the same incident. By allowing identification of redundant emergency alerts, the emergency response application 1360 improves efficiency and efficacy of the emergency response. By selecting a "Push to CAD" option for an incident 1312, an ESP user could initiate a CAD (e.g., a computer aided dispatch (CAD) software program included in preexisting PSAP software) incident based on the selected incident 1312. For example, an emergency alert may have been triggered by smoke alarms in a home. By creating a CAD incident, the ESP user could initiate dispatch to the home. In such an embodiment, the emergency response application can communicate with the CAD program to push an incident 1312 listed in the incident queue 1310 to the CAD program where the CAD program can then create a CAD incident for the incident 1312.

In some embodiments, a user of the emergency response application 1360 is enabled to access a single incident view. In some embodiments, the single incident view is accessed by the user selecting an incident location or an incident listed on the incident queue. FIG. 13B illustrates the selection of an incident 1312C in the incident queue 1310 to enter the single incident view. In some embodiments, the single incident view enlarges or moves the user's interactive map 1320 to detail the environment around the incident location 1324 (in the example depicted by FIG. 13B, incident location 1324C) corresponding to the selected incident 1312 (in the example depicted by FIG. 13B, incident 1312C). In some embodiments, enhanced location data 1316 or additional data is available in the single incident view. In some embodiments, the emergency response application 1360 shows information relating to two-way communications 1303 and optionally allows for messages to be sent by the user of the emergency response application 1360 to a recipient such as the contact person for the alarm and/or a first responder. In some embodiments, as described above and below, the EMS 1020 can facilitate a two-way text-based communication session between a monitoring center 1080 and an EMS 1030. In some embodiments, as illustrated by FIGS. 13B and 13C, the EMS 1020 facilitates a two-way text-based communication session 1303 between a monitoring center 1080 and an ESP 1030 through an emergency response application 1360 accessed by the ESP. In some embodiments, information regarding an emergency alert, such as statuses, may always be accessible through the two-way text-based communication session 1303, but a user of the emergency response application 1360 must claim an emergency alert (e.g., by selecting a claim button 1319) before the user is able to exchange messages with a monitoring center 1080. For example, as illustrated in FIG. 13B, before a user of the emergency response application 1360 selects to claim an emergency alert, statuses regarding the emergency alert are shown within the two-way text-based communication session 1303, but the user of the emergency response application 1360 cannot send messages to a monitoring center 1080 through the two-way text-based communication session 1303. However, as illustrated in FIG. 13C, the claim button 1319 has been selected and the user of the emergency response application 1360 can now submit messages to a monitoring center through the two-way text-based communication session 1303.

Emergency Alert Verification

Figure 14:
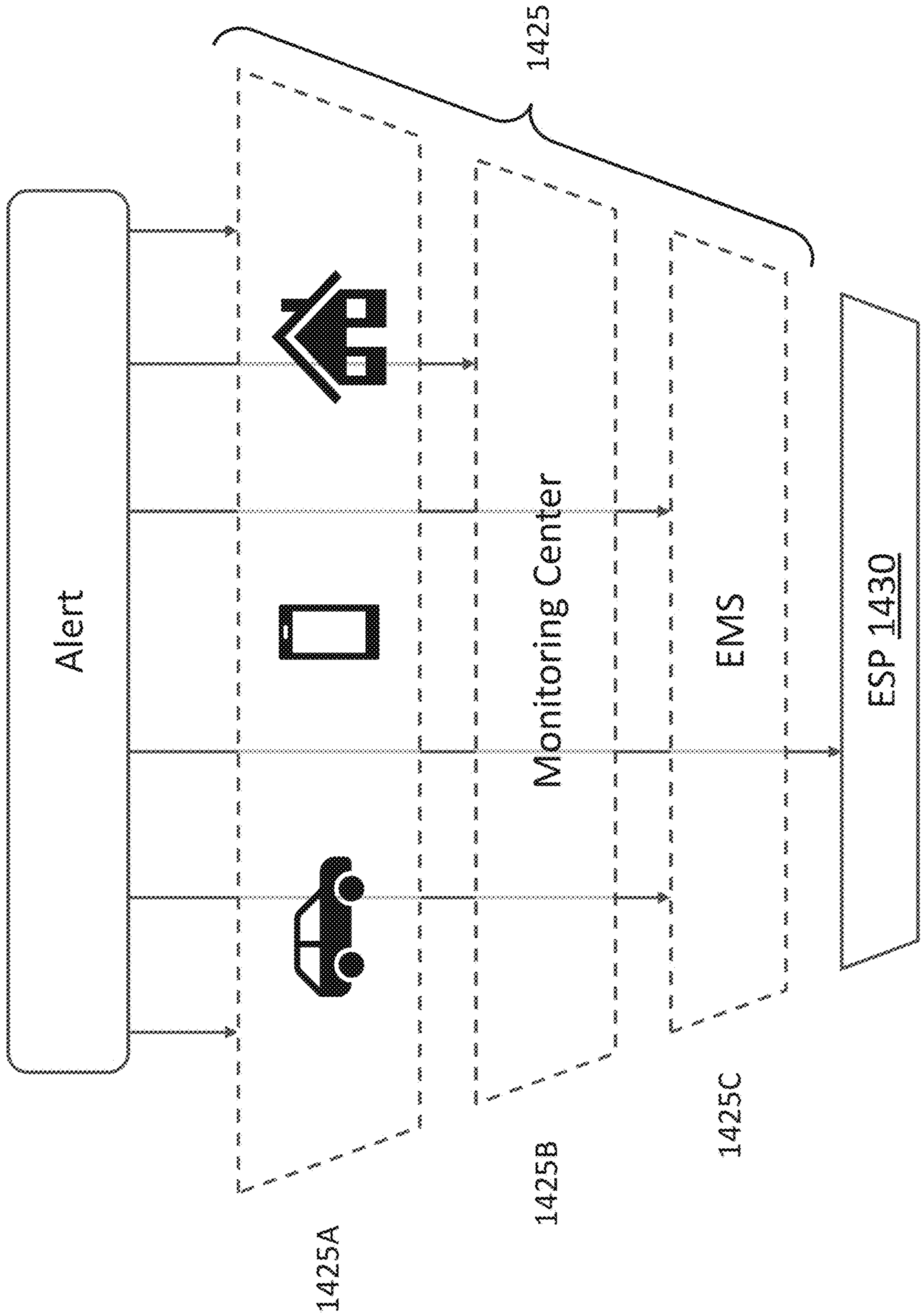
FIG. 14 depicts a diagram of a system for verifying automatic alarms in accordance with one embodiment of the present disclosure.

As mentioned above, in some embodiments, when an emergency alert is received by a monitoring center 1080 or the emergency management system (EMS) 1020, the monitoring center 1080 or the EMS 1020 can attempt to verify or otherwise obtain verification of the emergency alert before transmitting emergency data (as described above) or a digital emergency service request (as described below) associated with the emergency alert to an emergency service provider (ESP) 1030. Because many if not most emergency alerts are false positives, it is important that a monitoring center 1080 or the EMS 1020 attempts to verify the emergency alert before passing it along to an ESP 1030 (and presenting the emergency alert as an emergency incident or a digital emergency service request, as described below), as to not potentially waste life-saving emergency response resources. FIG. 14 depicts a diagram of an emergency alert verification funnel 1425, where the result may be a verified emergency alert, which may be passed on to a particular ESP 1430 as a request for emergency service request (e.g., a digital emergency service request, as described below). In some embodiments, as depicted in FIG. 14, the verification funnel 1425 can include one or more layers, such as a device verification layer 1425A, a monitoring center verification layer 1425B, and an EMS verification layer 1425C. The various verification layers can function separately or cooperatively to verify or obtain verification of an emergency alert.

In some embodiments, emergency calls are verified through a similar verification process. There are many cases of butt dials or prank calls that puts pressure on the emergency response resources, which can be overcome with verified emergency calls. In some cases, the emergency call may be verified by determining a likelihood that the emergency call is real or that the emergency call is not real. For example, based on typical patterns and user information, a determination can be made. The determination may be verified by additional steps. e.g., checking sensor, contacting the user, etc.

At the device verification layer 1425A, an electronic device (e.g., alert source 1067) that generated an emergency alert (or any other electronic device associated with or communicatively coupled to the electronic device) can use sensors, device intelligence, or user input to verify the emergency alert. For example, in some embodiments, when an intelligent vehicle system installed in a vehicle detects that the vehicle has been in an accident, thereby generating an emergency alert, the intelligent vehicle system can allow passengers within the vehicle to confirm or deny that they are in need of emergency assistance, such as by pressing a button within the vehicle or by verbally providing their status. If the intelligent vehicle system receives confirmation (e.g., user input) from a passenger within the vehicle or does not receive any indication from a passenger within the vehicle within a predetermined amount of time (e.g., 60) seconds), the intelligent vehicle system can positively verify the emergency alert and transmit the verification of the emergency alert to a monitoring center 1080 or the EMS 1020. The intelligent vehicle system can include the verification of the emergency alert in the emergency alert when the emergency alert is transmitted to the monitoring center 1080 or the EMS 1020. Or, for example, in some embodiments, when a home security alarm is triggered by a home security system installed in a home, thereby generating an emergency alert (e.g., an alarm), the home security system can access one or more cameras installed within the home. If the home security system detects the presence of any people within the view or feed of any of the one or more cameras installed within the home, the home security system can positively verify the emergency alert and transmit verification of the emergency alert to a monitoring center 1080 or the EMS 1020. In some embodiments, if an emergency alert is generated in response to an explicit action taken by a user (e.g., the selection of a panic button), the emergency alert is inherently verified (and verification of the emergency alert may be automatically included in the emergency alert). In some embodiments, even if an emergency alert is generated in response to an explicit action taken by a user, the emergency alert is unverified until a second explicit action is taken by the user to confirm the emergency alert.

At the monitoring center verification layer 1425B, a monitoring center 1080, after receiving an emergency alert from an alert source 1067, can attempt to manually verify the emergency alert. For example, as described above, a monitoring center 1080 can attempt to verify the emergency alert by calling a person associated with emergency alert. For example, if the emergency alert is a home security alarm, a call taker at the monitoring center 1080 may call the homeowner of the house where the home security alarm was triggered or a neighbor of the house where the home security alarm was triggered. If a person associated with the emergency alert verifies that the emergency alert was legitimate (e.g., that a break-in to the house where a home security alarm was triggered did occur), or if the call taker is unable to contact any of the persons associated with the emergency alert, the call taker can positively verify the emergency alert. The call taker can then transmit verification of the emergency alert to the EMS 1020 or an ESP 1030, such as by selecting a Push to PSAP button within an alarm handling software application, as described above.

Figure 15:
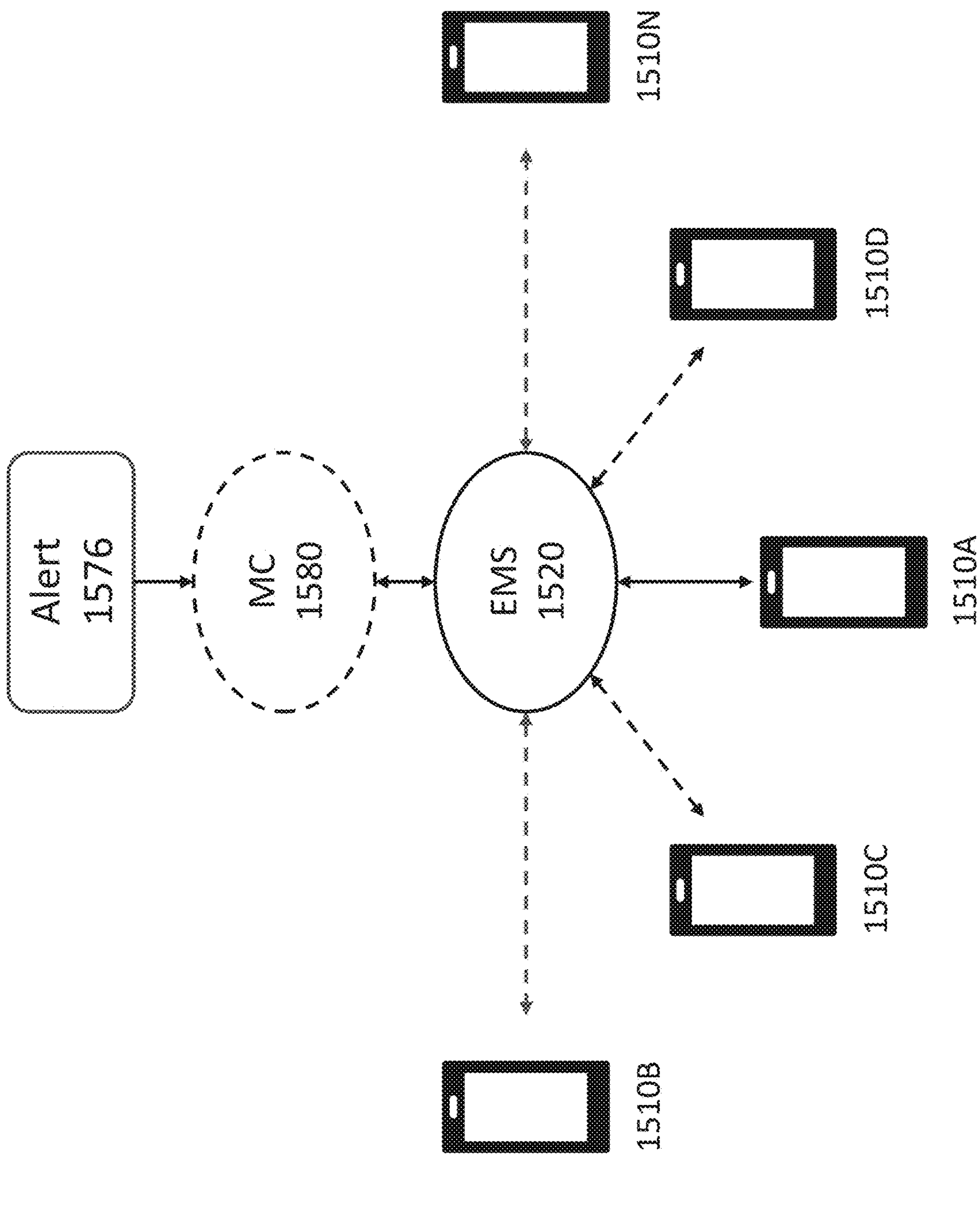
FIG. 15 depicts a diagram of a process for verifying automatic alarms in accordance with one embodiment of the present disclosure.

At the EMS verification layer, after receiving an emergency alert or emergency data associated with an emergency alert, the EMS 1020 can attempt to digitally verify the emergency alert. For example, in some embodiments, after receiving an emergency alert or emergency data associated with an emergency alert, the EMS 1020 identifies one or more emergency contacts associated with the emergency alert (e.g., contact information for the one or more emergency contacts is included in the emergency data associated with the emergency alert) and delivers a verification inquiry to the one or more emergency contacts. FIG. 15 depicts a diagram of a process for verifying emergency alerts by an emergency management system (EMS). In some embodiments, when an emergency alert is generated by an alert source 1576 and transmitted to a monitoring center 1580 or an EMS 1520, the EMS 1520 can deliver a verification inquiry to one or more electronic devices 1510 (1510A, B, C, D . . . N) associated with one or more emergency contacts associated with the emergency alert. The EMS 1520 can then receive verification from one or more of the emergency contacts associated with the emergency alert.

In some embodiments, the verification inquiry is a voice over internet protocol (VOIP) call. For example, in some embodiments, the EMS 1520 includes a telephony module constructed using hardware and software components such as voice over internet protocol (VOIP) gateways and open source communication software. The telephony module is configured to autonomously execute phone calls, such as interactive phone calls (e.g., an automated phone call that accepts inputs from the recipient of the call; also referred to as “IVR calls”). In such an embodiment, the EMS 1520 can deliver a verification query to the one or more emergency contacts in the form of an IVR call. For example, if the emergency alert is a home security alarm triggered by a home security system installed within a home, and the emergency alert includes a phone number for the homeowner, the homeowner's spouse, and homeowners of two neighboring houses, the EMS 1520 can attempt to verify the emergency alert by delivering an IVR call sequentially or simultaneously to an electronic device 1510 associated with each of the homeowner, the homeowner's spouse, and the homeowners of the two neighboring houses. The IVR call may play a text-to-speech (TTS) message asking the recipient of the IVR to call to press 1 if they can confirm the home security alarm, press 2 if the home security alarm is a false alarm, or press 3 if they are unable to confirm nor deny the home security alarm. If any one of the homeowner, the homeowner's spouse, or the homeowners of the two neighboring houses presses 1 to confirm the home security alarm, the EMS 1520 can positively verify the emergency alert. In some embodiments, the verification inquiry is a first text message and the verification is a second text message received from an emergency contact in response to the first text message. In some embodiments, the verification inquiry is a push notification and the verification is a selection of the push notification by an emergency contact associated with the emergency alert.

In some embodiments, when an emergency alert (from a triggering device e.g., a car alarm) is received, a verification process may be triggered. For example, a TTS phone call may be made to a device associated with the account holder to confirm the emergency. The TTS phone call may pose a verification inquiry to the user or another account associated with the triggering device, such as press 1 to confirm and 9 to cancel the emergency. When the user presses 1 to confirm the emergency, the verification of the emergency will be received. Additional steps may be done to confirm the emergency such as receiving an updated alarm signal, reviewing contextual data, etc., to determine if the emergency exists.

In some embodiments, the emergency alert may be scored by the triggering device, a user at the monitoring center, the EMS, the user, etc. For example, a score of 1-10 may be used, where a score of 1 is less urgent (e.g., low battery, low memory), while a score of 10 is very urgent (e.g., a fire). In some embodiments, an algorithm is used to determine the score. In other embodiments, scoring is done based on a set of rules (e.g., low battery is score of 1). In addition to the score of the alarm, there can be a confidence level for the alarm, which is a measure of the chance for a false alarm.

Once the emergency alert has been verified (referred to as an emergency incident), an indication of the verification may be transmitted to the monitoring center and/or an ESP. The indication of verification may be a symbol or words indicating a level of reliability or trustworthiness. For example. "verified alarm". "confirmed burglary", or a level of severity (e.g., a scale of 1-10 or priority of the emergency), which is shared with the ESP to efficiently transfer information about the emergency alert. In some embodiments, the indication of verification is a confidence level such as a category (e.g., low confidence, medium confidence, high confidence) or percentage (1-100%).

Figure 16:
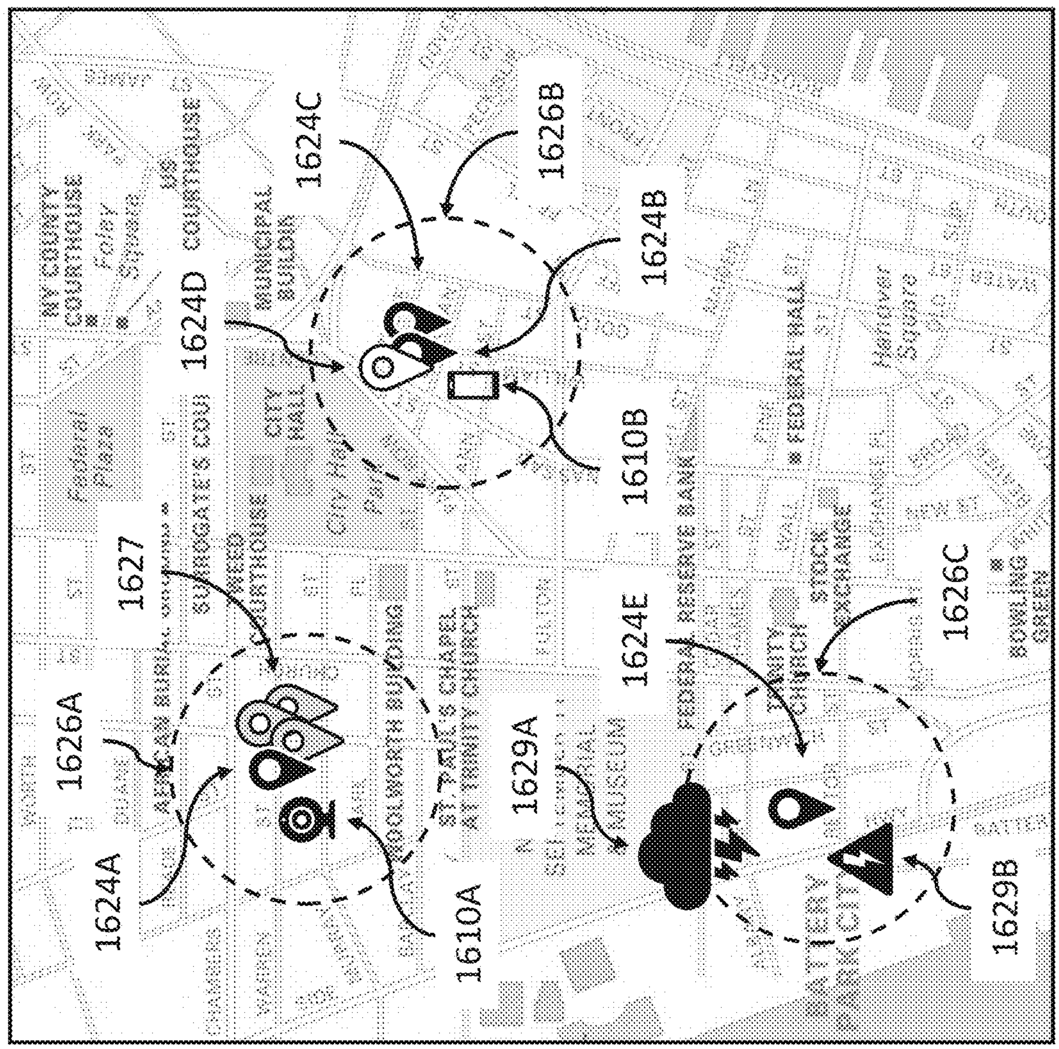
FIG. 16 illustrates a process for verifying automatic alarms in accordance with one embodiment of the present disclosure.

FIG. 16 illustrates a process for verifying emergency alerts by an emergency management system (EMS). In some embodiments, after receiving an emergency alert or emergency data associated with an emergency alert from an alert source, the EMS attempts to verify the emergency alert using contextual data available to the EMS. In some embodiments, the contextual data can include (but is not limited to) weather, historic emergency alerts, concurrent emergency alerts, infrastructural data, and multimedia. For example, location 1624A represents an emergency alert received by the EMS from a particular alert source. Locations 1627 represent historical emergency alerts received from the particular alert source. In some embodiments, the EMS can access a database of historical emergency alerts received by the EMS, wherein each entry in the database of emergency alerts includes an alert source and a verification result or status (e.g., whether or not an emergency alert was confirmed, denied, or neither). The EMS can then identify each entry in the database of historical emergency alerts in which the source was the particular alert source and calculate an average of the verification statues (e.g., what percentage of the emergency alerts received from the particular alert source were confirmed or positively verified). The EMS can then compare the average of the verification statuses to a predefined threshold, and positively verify the new emergency alert if the average of the verification statuses meets or exceeds the predefined threshold. In some embodiments, the EMS can access a multimedia feed from an electronic device 1610A associated with the particular alert source (e.g., the electronic device 1610A may be owned by the owner of the alert source or associated with an account of the owner of the alert source, communicatively coupled to the alert source, or within a radius 1626A of the alert source) and use the multimedia feed to verify the emergency alert. For example, in some embodiments, the EMS can positively verify the emergency alert if the EMS detects the presence or an indication of a person in the multimedia feed. In some embodiments, the multimedia feed is an audio or video feed.

In another example, locations 1624B and 1624C represent two recent emergency alerts for which the EMS has received emergency data from a first monitoring center. Both emergency alerts represented by locations 1624B and 1624C have been positively verified by the first monitoring center and the verifications have been transmitted to the EMS. Location 1624D represents a third recent emergency alert for which the EMS has received emergency data from a second monitoring center. The third recent emergency alert has not been verified by the second monitoring center. However, in some embodiments, because the third recent emergency alert has occurred within the same vicinity and time frame as the first two recent emergency alerts, which have been positively verified, the EMS can positively verify the third recent emergency alert. In another example, the EMS receives a notification of an emergency from mobile phone 1610B in the vicinity (e.g., a radius 1626B) of the third recent emergency alert and positively verifies the third recent emergency alert based on the notification received from mobile phone 1610B. In another example, location 1624E represents an emergency alert received by the EMS. In this example, the EMS detects that there is a thunderstorm 1629A and a power outage 1629B within the vicinity (e.g., a radius 1626C) of the emergency alert. In some embodiments, the EMS can determine that the emergency alert is a false alarm based on the presence of the thunderstorm 1629A and the power outage 1629B in the vicinity of the emergency alert.

Digital Request for Emergency Service

As mentioned above, typically, a person may only submit a request for emergency service (also referred to as an "emergency service request") to an emergency service provider (e.g., a public safety answering point (PSAP)) verbally, such as by dialing 9-1-1 in the United States and verbally articulating the details of their emergency over a phone call. This process takes time away from providing emergency response, is prone to human error, and requires that the person is physically able to verbally articulate the details of their emergency, which is far from a given. Even in the case of a home security alarm, the alarm is typically sent to a monitoring center where a call taker must call an emergency service provider and verbally articulate the details of the potential emergency. Provided herein are systems and methods for delivering digital emergency service requests to emergency service providers. By delivering digital emergency service requests to emergency service providers, as opposed to verbally delivering emergency service requests (e.g., emergency phone calls), significant time can be saved in providing emergency response, human error can be eliminated, and people who are not able (physically, such as when a person has fallen unconscious, or otherwise, such as when a person is kidnapped and fearing for their life) to verbally articulate the details of their emergency may still submit an emergency service request to an emergency service provider. Traditional emergency service requests (e.g., emergency calls) can and typically must be serviced by an emergency service provider (e.g., a call taker at a PSAP can and typically must answer an emergency call received by the PSAP). Similarly, a digital emergency service request must provide one or more options for servicing (e.g., the ability to be claimed or ignored, as described below).

Figure 10B:
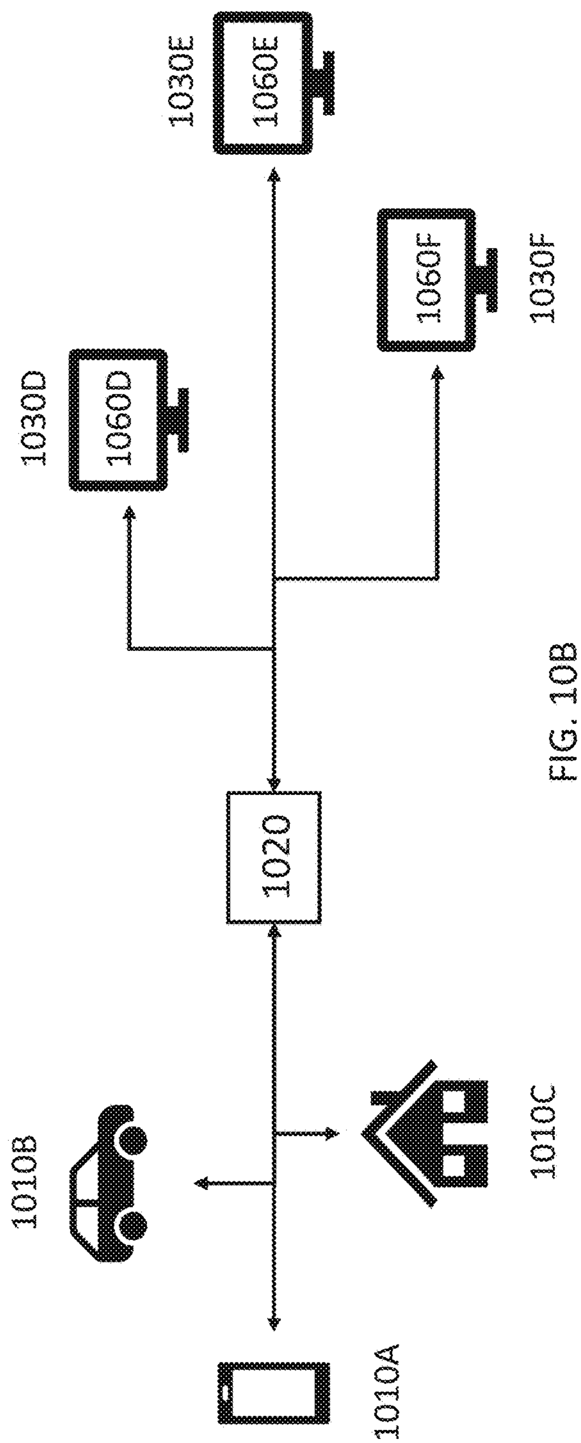

In some embodiments, as mentioned above, the system 700 (as depicted in FIG. 7) provides systems and methods for delivering digital emergency service requests and emergency data associated with emergency service requests to emergency service providers. In some embodiments. FIGS. 10A and 10B depict flow diagrams of methods for delivering digital emergency service requests and emergency data associated with digital emergency service requests to emergency service providers.

For example, as depicted in FIG. 10A, in some embodiments, when an emergency alert is generated by an alert source 1067 (e.g., mobile phone 1067B, intelligent vehicle system 1067C, or home security system 1067D), the emergency alert is transmitted to a monitoring center 1080. In some embodiments, the emergency alert is first received by an alert aggregator (also referred to as a "receiver" or an "alarm receiver") before being transmitted to the monitoring center 1080. In some embodiments, when the emergency alert is transmitted to the monitoring center 1080, either by the alert source 1067 or an alert aggregator, the emergency alert and any available emergency data associated with the emergency alert is transmitted to the emergency management system (EMS) 1020 in parallel. In some embodiments, after receiving the emergency alert from the alert source 1067 or an alert aggregator, the monitoring center 1080 selects to push the emergency alert to an emergency service provider (ESP) 1030 (e.g., by selecting a "Push to PSAP" button within an alarm handling software application or a monitoring center portal, as described above), which causes the monitoring center 1080 to transmit the emergency alert and any emergency data associated with the emergency alert to the EMS 1020. In some embodiments, when the EMS 1020 receives the emergency alert, the EMS 1020 generates and transmits a digital emergency service request associated with the emergency alert to an ESP 1030. In some embodiments, once the emergency alert has been received by the monitoring center 1080 or the EMS 1020, the EMS 1020 waits to obtain verification of the emergency alert (as described above) before generating and transmitting a digital emergency service request associated with the emergency alert to an ESP 1030. In some embodiments, the monitoring center 1080 verifies the emergency alert and then transmits verification of the emergency alert to the EMS 1020, as described above. In some embodiments, the EMS 1020 digitally verifies the emergency alert, as described above. In some embodiments, the EMS 1020 obtains verification of the emergency alert from the alert source 1067 or an electronic device associated with the alert source 1067, as described above.

In another example, as depicted in FIG. 10B, in some embodiments, when an emergency alert is generated by an alert source 1067 (e.g., mobile phone 1010A, intelligent vehicle system 1010B, or home security system 1010C), the emergency alert is transmitted to an emergency management system (EMS) 1020. In some embodiments, the emergency alert is first received by an alert aggregator before being transmitted to the EMS 1020. In some embodiments, when the EMS 1020 receives the emergency alert, the EMS 1020 generates and transmits a digital emergency service request associated with the emergency alert to an emergency service provider (ESP) 1030. In some embodiments, when the EMS 1020 receives the emergency alert, the EMS 1020 waits to obtain verification of the emergency alert (as described above) before generating and transmitting a digital emergency service request associated with the emergency alert to an ESP 1030. In some embodiments, the EMS 1020 digitally verifies the emergency alert, as described above. In some embodiments, the EMS 1020 obtains verification of the emergency alert from the alert source 1067 or an electronic device associated with the alert source 1067, as described above.

In some embodiments, when the EMS 1020 generates and transmits a digital emergency service request associated with an emergency alert to an ESP 1030, the EMS 1020 determines an appropriate ESP 1030 to receive the digital emergency service request using a location associated with the emergency alert. For example, in some embodiments, the emergency alert includes a location associated with the emergency alert, and the EMS 1020 determines an appropriate ESP 1030 to receive the digital emergency service request associated with the emergency alert using a subscription system, as described above. For example, using the subscription system, the EMS 1020 gathers geofences associated with ESPs 1030 and determines if the location associated with the emergency alert falls within any of the geofences. After determining that the location associated with the emergency alert falls within the geofence of a particular ESP 1030, the EMS 1020 then determines if there are any active or persistent communication links with the EMS 1020 established by a user associated with or subscribed to the ESP ID associated with the particular ESP 1030, as described above. If so, the EMS 1020 can automatically generate and transmit a digital emergency service request associated with the emergency alert to the ESP 1030 through the active or persistent communication link with the EMS 1020 established by the user associated with or subscribed to the ESP ID associated with the particular ESP 1030. In some embodiments, multiple active or persistent communication links with the EMS 1020 may be concurrently established by multiple users associated with or subscribed to the ESP ID associated with the particular ESP 1030 (e.g., when multiple members of the same public safety answering point (PSAP) have logged into separate computers and established active or persistent communication links with the EMS 1020 from the separate computers). In such an embodiment, the EMS 1020 can transmit the digital emergency service request to the particular ESP 1030 through each of the multiple active or persistent communication links established with the EMS 1020 by the multiple users associated with or subscribed to the ESP ID associated with the particular ESP 1030. For example, ESP console 1030D. ESP console 1030E, and ESP console 1030F are three separate computing devices at the same ESP. ESP D. Three separate call takers at ESP D have logged onto the three separate computing devices (ESP consoles 1030D-1030F) at ESP A and established separate active or persistent communication links between their respective computing devices and the EMS 1020. If the EMS 1020 receives an emergency alert including a location that falls within a geofence associated with ESP D, the EMS 1020 can generate a digital emergency service request associated with the emergency alert and transmit the digital emergency service request to each of the three separate computing devices (ESP consoles 1030D-1030F) through the three separate and respective active or persistent communication links.

However, in some embodiments, when the EMS 1020 generates and transmits a digital emergency service request, the EMS 1020 determines an appropriate ESP 1030 to receive the digital emergency service request using additional data alternatively or additionally to a location associated with the emergency alert, such as the type of alert or the alert source. For example, in some embodiments, if an emergency alert is generated by a home security system (e.g., the home security system detects a break in through a window), the EMS 1020 can generate a digital emergency service request and transmit the digital emergency service request directly to a police department based on the type of the emergency alert being a home security alarm. In another example, in some embodiments, if an emergency alert is generated by a smoke detector, the EMS 1020 can generate a digital emergency service request and transmit the digital emergency service request directly to a fire department based on the source of the emergency alert being a smoke detector. However, the EMS 1020 may determine an appropriate ESP 1030 to receive a digital emergency service request based on any other factor.

Figure 17A:
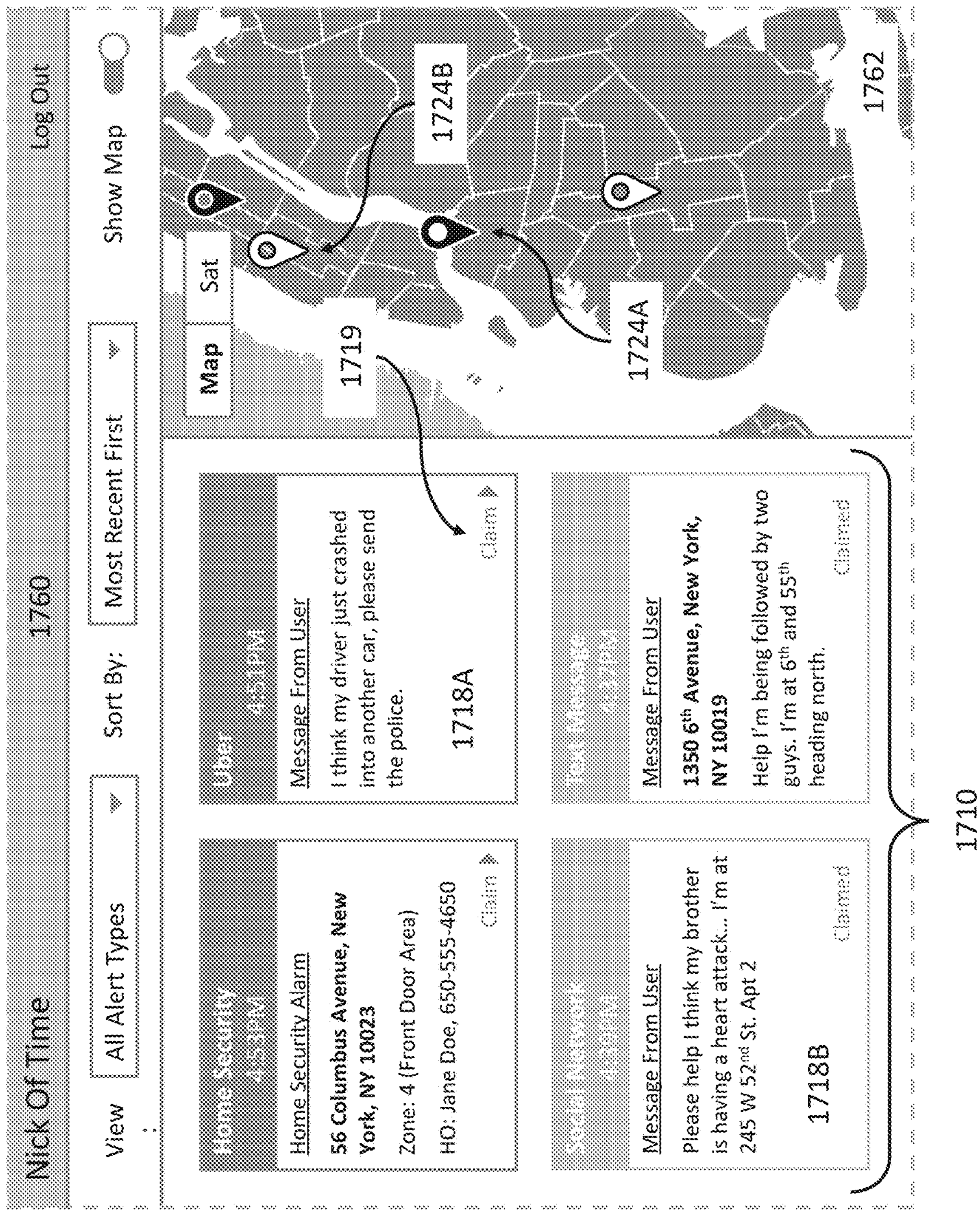
FIGS. 17A and 17B illustrate examples of a graphical user interface of an emergency response application in accordance with one embodiment of the present disclosure.
Figure 17B:
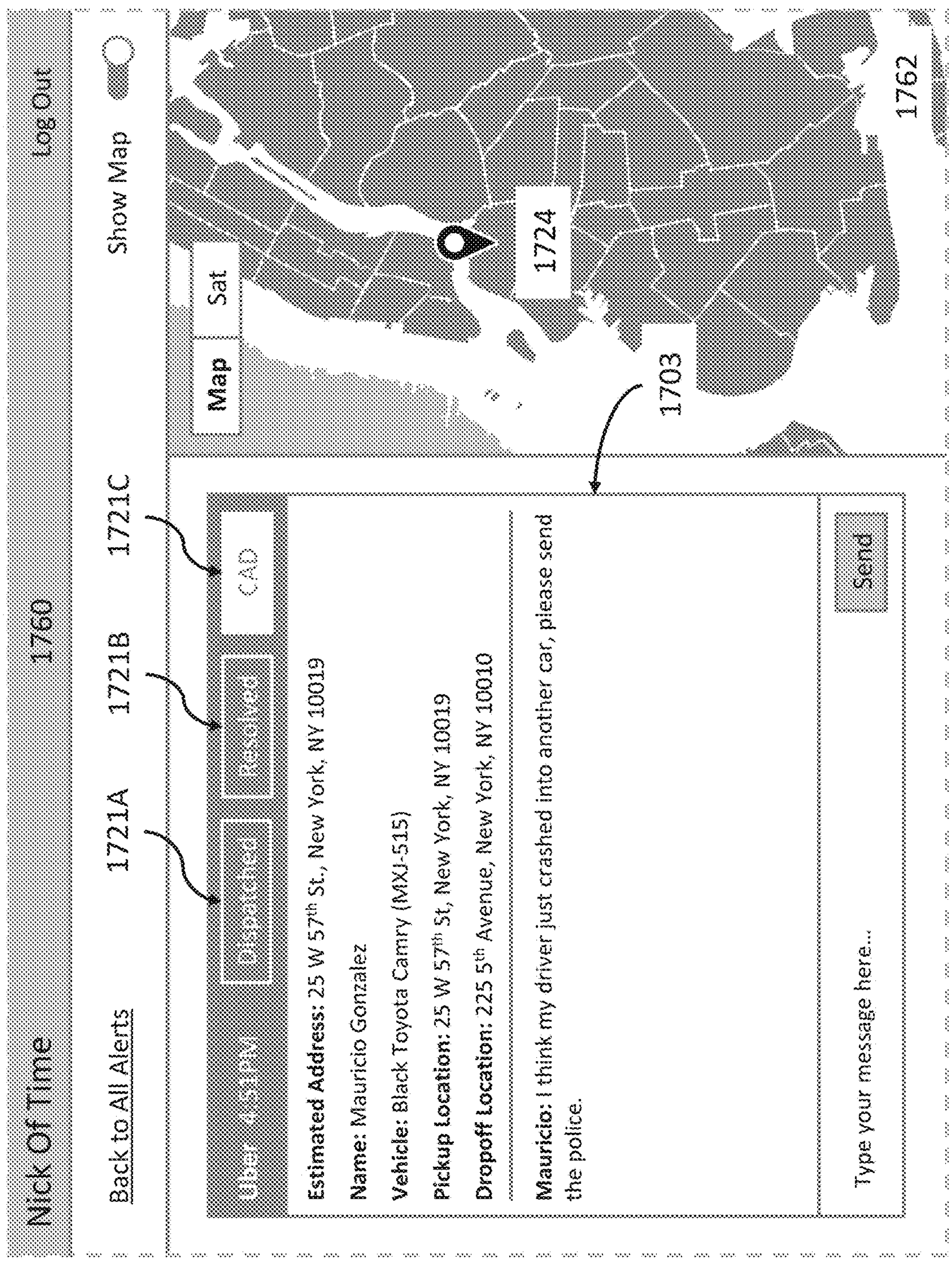

In some embodiments, the emergency management system (EMS) 1020 is integrated into existing systems within an emergency service provider (ESP) 1030, such as a call handling software application or computer aided dispatch (CAD) system. In some such embodiments, the EMS 1020 can transmit a digital emergency service request to an ESP 1030 through the integrations with the existing systems within the ESP 1030. In some embodiments, the EMS 1020 provides an emergency response application to ESPs 1030 through which the EMS 1020 can transmit digital emergency service requests, as depicted in FIGS. 17A and 17B. FIGS. 17A and 17B illustrate examples of a graphical user interface of an emergency response application provided by an emergency management system (EMS) for delivering digital emergency service requests to emergency service providers (ESPs). In some embodiments, as illustrated by FIG. 17A, the emergency response application 1760 includes a list of digital emergency service requests 1710 that displays digital emergency service requests 1718 that have been transmitted from the EMS 1020 to an ESP 1030. In some embodiments, the digital emergency service requests 1718 display emergency data associated with their respective emergency alerts. For example. FIG. 17A shows four digital emergency service requests 1718 displayed within the list of digital emergency service requests 1710: a first digital emergency service request from a home security system, a second digital emergency service request 1718A from a ridesharing mobile application (e.g., Uber), a third digital emergency service request 1718B from social media, and a fourth digital emergency service request from a text message. The digital emergency service request from the home security system was generated for a home security alarm (e.g., an automatically generated emergency alert) triggered by the home security system installed in a home and displays emergency data associated with the home security alarm, including an address of the home, a zone of the home where alarm was triggered, the name of an emergency contact (e.g., a homeowner), and contact information for the emergency contact. In this case, the address of the home is 56 Columbus Avenue. New York. NY, 10023, the zone is Zone 4 (which represents the Front Door Area of the home), the homeowner is Jane Doe, and her phone number is (650) 555-4650. The digital emergency service request 1718A from the ridesharing mobile application displays a message from the user of the ridesharing mobile application.

It is contemplated that digital emergency service requests 1718 within the list of digital emergency service requests 1710 may be displayed or ordered in any manner for clarity and efficiency. In some embodiments, the list of digital emergency service requests 1710 is ordered sequentially based on the time that the digital emergency service requests 1718 were transmitted to the ESP 1030. In some embodiments, the list of digital emergency service requests 1710 is prioritized based on type of emergency, alert source, severity of the emergency, or other appropriate factors. In some embodiments, an ESP user is required to respond to digital emergency service requests 1718 in the list of digital emergency service requests 1710 sequentially. In some embodiments, the ESP user may select or respond to any digital emergency service request 1718 in the list of digital emergency service requests 1710 in any order. In some embodiments, unclaimed digital emergency service requests (e.g., emergency service request 1718A) are prioritized within the list of digital emergency service requests 1710 above claimed digital emergency service requests (e.g., digital emergency service request 1718B), as described below.

As mentioned above, a digital emergency service request must provide one or more options for servicing (e.g., the ability to be claimed or ignored) by an emergency service provider (ESP). In some embodiments, a user of the emergency response application 1760 (e.g., a PSAP call taker) may (and typically must) take one or more actions on a digital emergency service request 1718 displayed within the emergency response application 1760. For example, in some embodiments, a user of the emergency response application can claim a digital emergency service request 1718, such as by selecting a Claim button 1719, as shown in FIG. 17A. By selecting to claim a digital emergency service request 1718, a user of the emergency response application 1760 is providing an indication that they are actively responding to the digital emergency service request 1718. In some embodiments, when a digital emergency service request 1718 is claimed (such as when an ESP user selects to claim an unclaimed digital emergency service request by selecting a Claim button 1719), the now claimed digital emergency service request is moved to a section of the list of digital emergency service requests 1710 below unclaimed digital emergency service requests, as shown in FIG. 17A, where the digital emergency service requests from the social network and the text message have been claimed and are below the unclaimed digital emergency service requests from the home security system and the ridesharing mobile application. In some embodiments, when a digital emergency service request 1718 is claimed, the digital emergency service request is marked as claimed within the emergency response application 1760 at every computing device (e.g., ESP console 1030) that the digital emergency service request 1718 was transmitted to. For example, as described above, in some embodiments, if ESP consoles 1030D-1030F are three separate computing devices at the same ESP 1030. PSAP A. and three separate PSAP call takers have successfully logged into the emergency response application 1060, when the EMS 1020 receives an emergency alert including a location that falls within a geofence associated with PSAP A, the EMS 1020 can generate a digital emergency service request 1718 associated with the emergency alert and simultaneously transmit the digital emergency service request 1718 to all three ESP consoles 1030D-1030F and display the digital emergency service request 1718 at each of emergency response application 1060D-1060F. In this example, if a PSAP call taker claims the digital emergency service request 1618 at emergency response application 1060D, the digital emergency service request 1618 will instantly be marked as claimed at emergency response applications 1060E and 1060F, as well as at emergency response application 1060D. In some embodiments, a user of the emergency response application 1760 can select other actions for an emergency service request 1718, such as ignore, mark as duplicate, mark as dispatched, mark as resolved, or push to CAD, as described below in reference to FIG. 17B.

In some embodiments, as illustrated by FIG. 17A, the emergency response application 1760 includes an interactive map 1762. In some embodiments, the emergency response application 1760 displays one or more geofences associated with the ESP 1030 for which the emergency response application has been accessed. In some embodiments, the emergency response application 1760 displays one or more event locations 1724 (e.g., a location marker; also referred to as an "incident location") for each digital emergency service request 1718 transmitted to the ESP 1030 within the interactive map 1762. In some embodiments, the emergency response application 1760 displays one or more event locations 1724 for each digital emergency service request 1718 listed in the list of digital emergency service requests 1710 within the interactive map 1762. For example. FIG. 17A shows four event locations 1724, one for each of the four digital emergency service requests 1718 listed in the list of digital emergency service requests 1710. In some embodiments, the event locations 1724 shown within the interactive map 1762 are colored or otherwise stylized to represent information about or a status of the respective digital emergency service requests 1718. For example, as shown in FIG. 17A, in some embodiments, event locations for unclaimed digital emergency service requests, such as event location 1724A (representing unclaimed digital emergency service request 1718A) are colored differently than event locations for claimed digital emergency service requests, such as event location 1724B (representing claimed digital emergency service request 1718B). In some embodiments, as with changes to digital emergency service requests 1718, changes to an event location associated with a digital emergency service request 1718 can be reflected within the emergency response application 1760 at every computing device that the digital emergency service request 1718 was transmitted to.

In some embodiments, a user of the emergency response application 1760 is enabled to access a single emergency view. In some embodiments, the single emergency view is accessed by the user selecting a particular event location 1724 or a particular digital emergency service request 1718 listed in the list of digital emergency service requests 1710. In some embodiments, a user enters a single emergency view by claiming a digital emergency service request 1718, as described above. FIG. 17B illustrates a single emergency view of a digital emergency service request. In some embodiments, the single emergency view enlarges or moves the user's interactive map 1762 to detail the environment around the event location 1724. In some embodiments, as depicted by FIG. 17B, the digital emergency service request is enlarged in the single emergency view to display additional data associated with the digital emergency service request or present the user with additional actions to take for the digital emergency service request. For example, in some embodiments, as depicted by FIG. 17B, the single emergency view presents the user with options to mark the digital emergency service request as dispatched 1721A (e.g., an indication that first responders have been dispatched to the location of the emergency), to mark the digital emergency service request as resolved 1721B (e.g., an indication that the emergency has been resolved), or to push the digital emergency service request or emergency data associated with the digital emergency service request to CAD 1721C (as described below). In some embodiments, after a digital emergency service request has been claimed, the EMS facilitates a two-way communication session (e.g., text-based communication session 1703) between the ESP and one or more contacts associated with the digital emergency service request. For example, in some embodiments, as depicted by FIG. 17B, the single emergency view provides an interface for a two-way communication session (text-based communication session 1703), which presents the user of the emergency response application 1760 with an option to message a contact associated with the digital emergency service request (e.g., the user that initiated the emergency alert associated with the digital emergency service request). For example, the digital emergency service request from the ridesharing mobile application (e.g., Uber) shown in FIG. 17A (digital emergency service request 1718A) has been selected for the single emergency view shown in FIG. 17B (e.g., it was claimed by a user of the emergency response application 1760). In this example, if the user of the emergency response application 1760 inputs a message and presses the Send button, the message will be sent to the user of the ridesharing mobile application, either through the ridesharing mobile application or to a phone number or email address associated with the user of the ridesharing mobile application. In some embodiments, when a user of the emergency response application 1760 selects to send a message to a contact associated with a digital emergency service request, the EMS 1020 establishes a two-way communication link to facilitate a text-based communication session between the user of the emergency response application 1760 and the contact associated with the digital emergency service request.

Prioritization

In some embodiments, after the EMS receives an emergency alert, the EMS prioritizes or assigns a priority level to the emergency alert (or an incident or a digital emergency service request associated with the emergency alert). For example, as described above with respect to FIG. 12A, the EMS can prioritize an incident queue based on various factors, such as emergency type, severity, or the time that the emergency alerts for which incidents were added to the incident queue were received. However, the EMS may prioritize an emergency alert based on any other factor and at any point after an emergency alert is received. For example, in some embodiments, the EMS prioritizes an emergency alert only after an incident or a digital emergency service request has been generated or transmitted for the emergency alert. In some embodiments, an emergency alert includes a priority level when it is received by the EMS. For example, in some embodiments, a monitoring center assigns a priority level to an emergency alert before the emergency alert is transmitted from the monitoring center to the EMS or before the emergency alert is transmitted from the EMS to an ESP. In some embodiments, incidents within an incident queue or digital emergency service requests within a list of digital emergency service requests are listed or displayed within the emergency response application according to their priority levels or according to prioritization by the EMS. In some embodiments, users of the emergency response application (e.g., a PSAP call taker) can manually edit the priority level or prioritization of incidents within an incident queue or digital emergency service requests within a list of digital emergency service requests. In some embodiments, incidents or digital emergency service requests are prioritized based on a confidence level (as described above) of an associated emergency alert.

Failsafe Procedures

In some embodiments, it is necessary to implement to implement some failsafe features to ensure that an emergency alert (or a digital emergency service request associated with the emergency alert) is being addressed. In some embodiments, the EMS implements failsafe procedures to check that an emergency alert (or a digital emergency service request associated with the emergency alert) was received by an emergency service provider (ESP). For example, the EMS may failsafe check that a PSAP has received a digital emergency service request based on the emergency alert and that it has responded to (e.g., claimed) or canceled the request. In some embodiments, the failsafe procedures include failsafe check that an emergency alert has been sent to an ESP with primary authority to respond to emergencies in the area (an ESP with primary authority has an obligation to respond, while an ESP with secondary authority may be called to respond when needed). Additional failsafe procedures (e.g., contacting the ESP, rerouting to an alternate ESP, contacting the user or emergency contacts) may be warranted if a digital emergency service request is not claimed or otherwise interacted with by a receiving ESP.

In some embodiments, if a digital emergency service request is not claimed or not acted on within a specific time window, a failsafe emergency call may be initiated. The emergency call may be an IVR call connecting a user in an emergency or a call taker at the monitoring center to the appropriate PSAP. The time window may vary based on type of emergency, severity of emergency, characteristics of the ESP (e.g., typical response times for that ESP), input from admin, etc. In some implementations, the time window is between 5 seconds to 600 seconds. In some implementations, the time window is between 1 minute to 30 minutes. In some implementations, the time window is 5 minutes. In some implementations, the time window is 10 minutes.

In some embodiments, the EMS automatically detects various aspects of the emergency alert transmission including establishing a two-way IP connection, Blue-tooth connection, SIP connection, etc. In some embodiments, a receipt is sent from the ESP system when the emergency alert is received. In some embodiments, the failsafe procedures require an ESP user to confirm receipt of the emergency alert such clicking on a button, physical button press or making a phone call.

In some implementations, a time-out function is implemented as a failsafe feature. For example, a timer is started and additional steps are taken if a request is not responded to within a specific time-out period. The time-out period may be between 5 minutes to 24 hours.

In some case, when an appropriate response has not been received based on a first emergency alert or digital emergency service request, a second alarm or digital emergency service request may be initiated with the expectation that the second alarm or digital emergency service request will elicit an appropriate response.

In another implementation, an emergency call is initiated to an ESP or emergency response agency as a failsafe feature to get an appropriate response. In some embodiments, the emergency call may be an automated voice call instructing an ESP call taker at the ESP to claim a digital emergency service request. In some embodiments, the emergency call might be a voice call between the end user and the ESP call taker. In some embodiments, the end user is a monitoring center in charge of or tasked with managing the emergency alert. In some embodiments, the end user is a person who owns or is affiliated with the device that triggered the emergency (also referred to as the "triggering device"), such as an owner or a manager of the building where smoke has been detected.

Use of other forms of communication such a messaging (text SMS, data SMS, web-based messages, push notifications, etc.) are also contemplated in addition to voice calls. For example, an end user could be connected via two-way chat session with an ESP call taker or dispatcher.

In some embodiments, failsafe measures are taken if the EMS is unable to verify an emergency alert. As described above, in some embodiments, the EMS attempts to verify or obtain verification of an emergency alert before transmitting the emergency alert or a digital emergency service request associated with the emergency alert to an ESP. For example, as described above, the EMS can attempt to verify or obtain verification of an emergency alert in various ways, such as receiving verification of the emergency alert included in the emergency alert, delivering a verification inquiry to one or more emergency contacts associated with the emergency alert and receiving confirmation of the verification inquiry from the one or more emergency contacts associated with the emergency alert, or using contextual data available to the EMS. In some embodiments, if the EMS is able to verify the emergency alert or otherwise obtain verification of the emergency alert, the EMS can transmit the emergency alert or a digital emergency service request to an appropriate emergency service provider (ESP), as described above. In some embodiments, if the EMS is unable to verify or otherwise obtain verification of the emergency alert, the EMS implements a failsafe procedure, because the EMS may not be able to simply assume that the emergency alert was falsely or erroneously triggered or generated. In some embodiments, in response to being unable to verify the emergency alert, the EMS transmits the unverified emergency alert to an appropriate monitoring center, where a human call taker at the monitoring center can manage the emergency alert or represent the emergency alert before an emergency service provider (ESP).

In some embodiments, the EMS determines an appropriate monitoring center to receive the emergency alert using a geofence system (such as the system described above with respect to determining an appropriate ESP to receive an emergency alert or digital emergency service request associated with an emergency alert). For example, the EMS can identify a location associated with the emergency alert, retrieve geofences associated with one or more monitoring centers registered with the EMS, and determine if the location associated with the emergency alert falls within any of the geofences associated with the one or more monitoring centers. If the location associated with the emergency alert does fall within one of the geofences, the EMS can identify the monitoring center associated with that geofence as the appropriate monitoring center to receive the emergency alert. In some embodiments, particular emergency service providers (ESPs) are associated with particular monitoring centers, or vice versa. In such an embodiment, if the EMS has already determined an appropriate ESP to receive an emergency alert (but has not transmitted the emergency alert to the ESP because the EMS has not been able to verify the emergency alert), the EMS need only identify a monitoring center associated with the ESP as a monitoring center appropriate to receive the emergency alert. However, the EMS may determine an appropriate monitoring center to receive an emergency alert in any other way.

Once the EMS has determined an appropriate monitoring center to receive the unverified emergency alert, the EMS transmits the unverified emergency alert to the monitoring center. In some embodiments, the EMS transmits the unverified emergency alert to the monitoring center through an alarm handling software application (also referred to as "automation software") and displays the unverified emergency alert within a graphical user interface (GUI) of the alarm handling software application. In some embodiments, the EMS transmits the unverified emergency alert to the monitoring center through a monitoring center portal provided to the monitoring center by the EMS (as described above with respect to FIG. 12) and displays the unverified emergency alert within a graphical user interface (GUI) of the monitoring center portal. After receiving the unverified emergency alert, the monitoring center (e.g., a call taker at the monitoring center) may prompt the EMS to transmit the emergency alert or a digital emergency service request associated with the emergency alert (as described above) to an appropriate emergency service provider (ESP), such as by selecting a Push to PSAP button (or request dispatch button) within the GUI of the alarm handling software application or the monitoring center portal (as described above). In some embodiments, the monitoring center may first attempt to verify the unverified emergency alert (as described above) before prompting the EMS to transmit the emergency alert or a digital emergency service request associated with the emergency alert to an ESP.

In some embodiments, after transmitting the emergency alert to an appropriate emergency service provider (ESP) in response to a prompt from a monitoring center, the EMS facilitates a two-way communication session between the monitoring center and the ESP, as described above. In some embodiments, the two-way communication session is voice-based (e.g., a Voice over Internet Protocol (VOIP) call). In some embodiments, the two-way communication session is a text-based communication session. In some embodiments, the two-way communication session is facilitated through an alarm handling software application or monitoring center portal accessed by the monitoring center. In some embodiments, the two-way communication session is facilitated through an emergency response application accessed by the ESP. In some embodiments, the two-way communication session is facilitated through both an alarm handling software application or monitoring center portal accessed by the monitoring center and an emergency response application accessed by the ESP.

For example. FIG. 17B illustrates a claimed digital emergency service request associated with an emergency alert received from a ridesharing application (e.g., Uber), for which the EMS has facilitated a two-way text-based communication with the user of the ridesharing application who triggered the emergency alert. If, for example, the emergency alert from the ridesharing application had been autonomously generated (e.g., if the ridesharing application had autonomously detected that the associated ridesharing vehicle (in this example, the black Toyota Camry with the license plate MXJ-515) had been impacted in an auto emergency), and the EMS had unsuccessfully attempted to contact the user of the ridesharing application (e.g., Mauricio Gonzalez), the EMS could have transmitted the unverified emergency alert to a monitoring center (e.g., through a monitoring center portal provided by the EMS) instead of transmitting the digital emergency service request associated with the emergency alert to the ESP (e.g., the ESP accessing the emergency response application 1760 illustrated in FIG. 17B). If the monitoring center subsequently prompted the EMS to transmit a digital emergency service request to the ESP (e.g., by selecting a Push to PSAP button within the graphical user interface (GUI) of the monitoring center portal, as described above) and display the digital emergency service request within the GUI of the emergency response application 1760, and the ESP (e.g., a call taker at the EMS) subsequently claimed the digital emergency service request, the EMS could then facilitate the two-way text-based communication session 1703 between the monitoring center and the ESP, as opposed to between the ESP and the user of the ridesharing application (e.g., Mauricio Gonzalez, as illustrated in FIG. 17B).

Computer Aided Dispatch (CAD) & Record Management System (RMS) Integration

Figure 18:
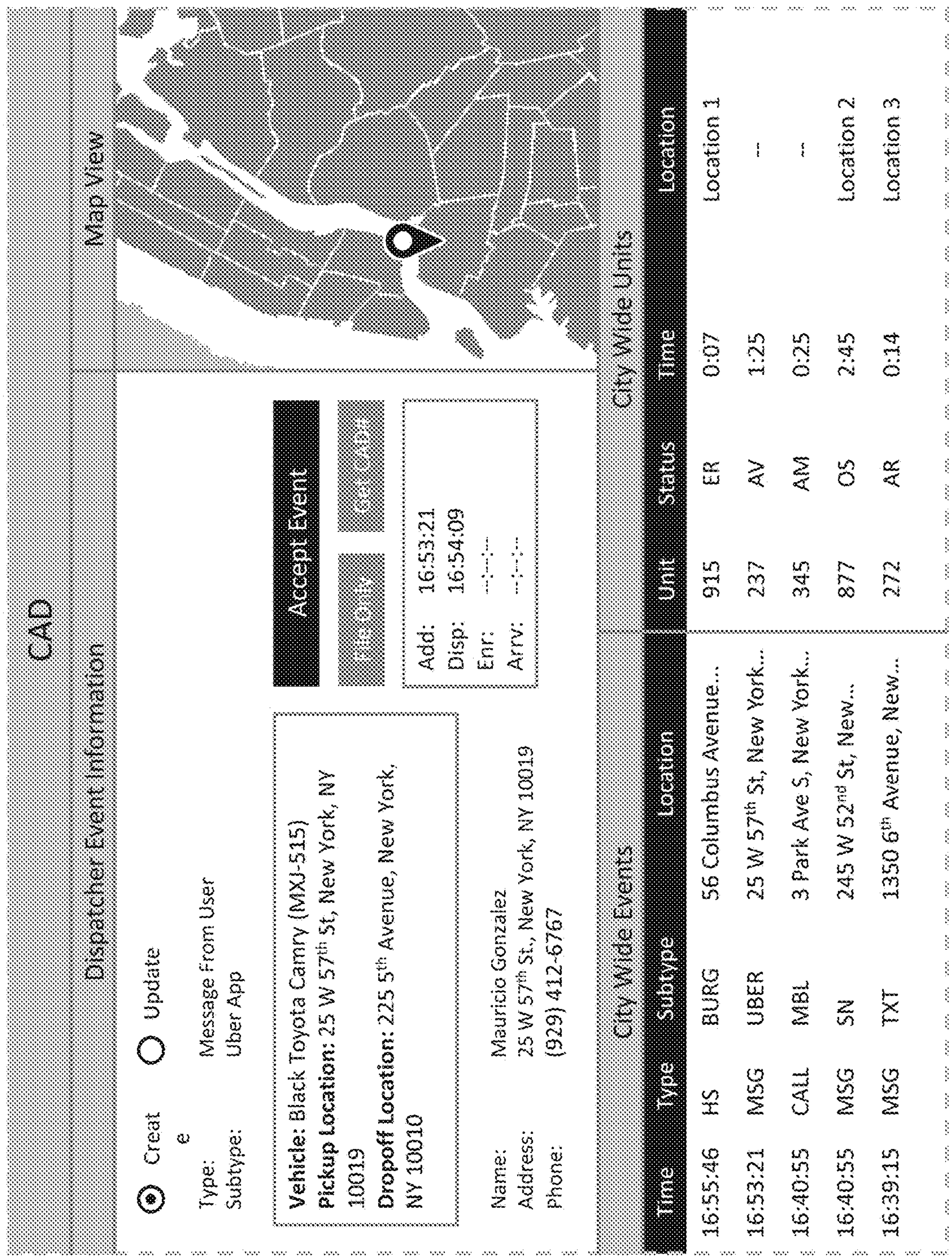
FIG. 18 illustrates an example of a computer aided dispatch (CAD) system in accordance with one embodiment of the present disclosure.

In some embodiments, after an emergency service provider (ESP) receives emergency data regarding or associated with an emergency alert, the ESP can pass the emergency data onto downstream systems based on user selection or other inputs, such as the selection of a button within the graphical user interface (GUI) of an emergency response application 1760. For example, once an ESP call taker determines that a digital emergency service request should be passed on for dispatching, he or she may press a "Send to CAD" button 1721C, which will transmit (or prompt the EMS to transmit) the emergency data to a computer aided dispatch (CAD) system accessed by or associated with the ESP. The emergency data can then be displayed within the GUI of the CAD system, as illustrated by FIG. 18. In some cases where the emergency alert is verified with sufficient confidence, it may be passed on to CAD directly for dispatch (as illustrated by FIG. 18).

In some embodiments, when the emergency management system (EMS) transmits a digital emergency service request associated with an emergency alert to an ESP, the digital emergency service request is transmitted to the ESP through a computer aided dispatch (CAD) system associated with the ESP. For example, in some embodiments, the CAD system is a software application installed on one or more computing devices at or associated with the ESP and communicatively coupled to the EMS. Alternatively, the CAD system is a cloud-based CAD system that provides a web application that the ESP can access on its computing devices. When the EMS receives an emergency alert and determines that the ESP is appropriate for receiving a digital emergency service request associated with the emergency alert (as described above), the EMS transmits the digital emergency service request (and any associated emergency data) to the CAD system installed on the one or more computing devices at or associated with the ESP. For example, the CAD system may expose an endpoint (e.g., a web callback or HTTP push API;

also referred to as a "webhook") that the EMS can transmit the digital emergency service request (and any associated emergency data) to. The digital emergency service request associated with the emergency alert (or any associated emergency data) can then be displayed within the graphical user interface (GUI) of the CAD system, as illustrated in FIG. 18.

In some embodiments, a CAD system associated with an ESP can query the EMS for relevant digital emergency service requests (and any associated emergency data) (e.g., the CAD system can "pull" digital emergency service requests and associated emergency data from the EMS, as described above). For example, in some embodiments, a CAD system (whether cloud-based or installed on one or more computing devices at an ESP) transmits an emergency data request including an identifier of an ESP (e.g., a geospatial query including the identifier of the ESP as a representative area, as described below) to the EMS. The EMS can then retrieve a geofence associated with the identifier of the ESP and identify any current emergency alerts (e.g., emergency alerts generated or received less than an hour (or any predetermined amount of time) before the EMS received the emergency data request including the identifier of the ESP) having emergency locations within the geofence associated with the identifier of the ESP. The EMS can then transmit digital emergency service requests associated with those emergency alerts to the CAD system for display at the ESP. In some embodiments, a CAD system is configured to query the EMS with an identifier of an ESP at a regular or periodic interval, such as every five seconds.

In some embodiments, when an ESP user (e.g., a call taker) accesses a CAD system (either installed on a computing device at an associated ESP or accessed through a web application by a computing device at an associated ESP) associated with or accessed by the ESP user's ESP, the CAD system is configured to automatically establish an active or persistent communication link (e.g., a websocket connection) with the EMS, as described above. The active or persistent communication link is associated with an identifier of the ESP, as described above. Then, when the EMS receives an emergency alert associated with an emergency location, the EMS can retrieve a geofence associated with the identifier of the ESP and determine if the emergency location falls within the geofence, as described above. If the EMS determines that the emergency location does fall within the geofence associated with the identifier of the ESP, the EMS can automatically transmit (e.g., "push") a digital emergency service request associated with the emergency alert (and any associated emergency data) to the CAD system for display or transmission to the ESP.

In some embodiments, when the EMS transmits a digital emergency service request associated with an emergency alert (and any associated emergency data) to an ESP, the digital emergency service request and any associated emergency data is only transmitted to the ESP through a CAD system. In some embodiments, when the EMS transmits a digital emergency service request associated with an emergency alert to an ESP, the EMS transmits the digital emergency service request (and any associated emergency data) to both a CAD system associated with the ESP and an emergency response application provided by the EMS and accessed by the ESP in parallel. In some embodiments, when the EMS transmits a digital emergency service request associated with an emergency alert (and any associated emergency data) to an ESP, the digital emergency service request and any associated emergency data is only transmitted to the ESP through an emergency response application provided by the EMS. In some embodiments, after a digital emergency service request is transmitted to an ESP through an emergency response application provided by the EMS, the digital emergency service request or any associated emergency data can be transmitted to a CAD system associated with or accessed by the ESP in response to a query received from the CAD system (as described above) or the selection of a button within the graphical user interface (GUI) of the emergency response application (e.g., the Push to CAD button 1721C illustrated by FIG. 17B), as described above.

FIG. 18 illustrates an exemplary embodiment of a graphical user interface (GUI) of a computer aided dispatch (CAD) system. As mentioned above, a CAD system may be a software application installed on a computing device at an emergency service provider (ESP) or a cloud-based system accessible by an ESP through a website or a web application. Generally, a CAD system helps facilitate the process of dispatching emergency personnel (e.g., first responders, police officers, firefighters, emergency medical personnel, etc.) to emergencies. As mentioned above, in some embodiments, a digital emergency service request (or emergency data associated with the digital emergency service request) may be transmitted by an emergency management system (EMS) to a CAD system for transmission or display to an ESP, alternatively or additionally to the digital emergency service request or any associated emergency data being transmitted to the ESP through an emergency response application provided by the EMS. As illustrated by FIG. 18, all four of the digital emergency service requests 1718 transmitted to an ESP shown in FIG. 17A have been additionally transmitted to and displayed within the GUI of the CAD system illustrated by FIG. 18. In some embodiments, a digital emergency service request (or associated emergency data) is transmitted to the CAD system in response to an ESP user claiming the digital emergency service request within the GUI of the emergency response application, as described above. In some embodiments, a digital emergency service request is transmitted to the CAD system in response to an ESP user selecting a Push to CAD button within the GUI of the emergency response application, as described above.

As described above and below, in some embodiments, an emergency management system (EMS) is configured to facilitate communications between a monitoring center and an emergency service provider (ESP). In some embodiments, the EMS can facilitate communications between a monitoring center and an ESP through the use of preexisting software installed on computing devices at the monitoring center and the ESP and without the use of any additional software or emergency response applications provided by the EMS (e.g., a monitoring center portal, as described above). For example, in some embodiments, an alarm handling software application (also referred to as "automation software") is previously installed on a computing device at a monitoring center and a computer aided dispatch system (CAD system) is previously installed on a computing device at the ESP. In some embodiments, the EMS provides application programming interfaces (APIs) that can be integrated into the alarm handling software application and the CAD system to allow the alarm handling software application and the CAD system to communicate directly with the EMS. The EMS can then use its connections with the alarm handling software application and the CAD system to act as a communication bridge between the alarm handling software application and the CAD system, through which any and all steps of providing data communications between a monitoring center and a CAD system described herein may be facilitated, without the use of any additional software or applications provided by the EMS. For example, in some such embodiments, when the monitoring center receives an emergency alert (e.g., an alarm) through the alarm handling software application, a user of the alarm handling software application can select to request dispatch through the alarm handling software application (e.g., selecting a request dispatch button within a graphical user interface (GUI) of the alarm handling software application), which prompts the alarm handling software application to transmit the emergency alert (or emergency data associated with the emergency alert to the EMS, such as through an API. The EMS can then determine an appropriate ESP to receive a digital emergency service request associated with the emergency alert (and any associated emergency data), as described above. Once an appropriate ESP has been determined, the EMS can transmit the digital emergency service request (and any associated emergency data) to the ESP through the CAD system, such as through an API, and present the digital emergency service request (and any associated emergency data) within a GUI of the CAD system. If a user of the CAD system selects to claim or accept the digital emergency service request, the EMS can then facilitate a two-way communication session between the monitoring center and the ESP through its separate connections with the alarm handling software and the CAD system.

In some embodiments, different CAD systems are integrated for easy transfer of data from one ESP system to another ESP system (e.g., CAD-to-CAD. CAD-to-RMS. CAD-to-RMS, CAD-to-Mobile). In some embodiments, the emergency data is in XML or JSON. In some embodiments, the emergency data is transferred following various standards including Federal Enterprise Architecture (FEA). National Information Exchange Model (NIEM). Next Generation 911 (NG-911). Health Insurance Portability and Accountability Act (HIPAA).

In some embodiments, emergency data regarding or associated with an emergency alert is passed onto a secondary ESP being called to respond to the emergency and/or emergency responders that have been dispatched to the emergency. In some embodiments, the emergency data regarding or associated with the emergency alert is passed onto a records management system (RMS) for documentation or archiving.

Emergency Response Assistance System

Figure 19A:
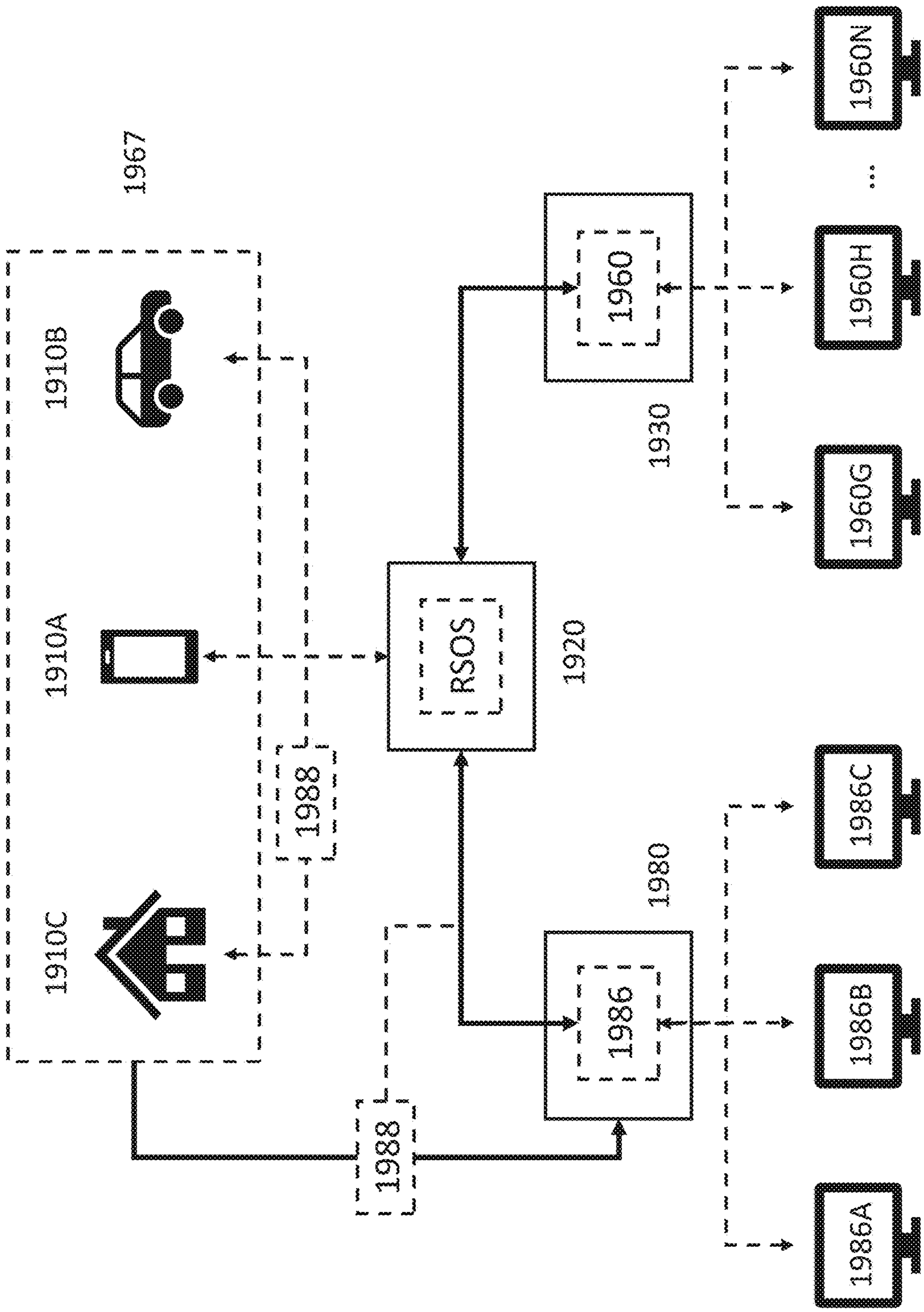
FIGS. 19A and 19B depict a system for providing emergency response assistance by an emergency management system (EMS) in accordance with one embodiment of the present disclosure.
Figure 19B:
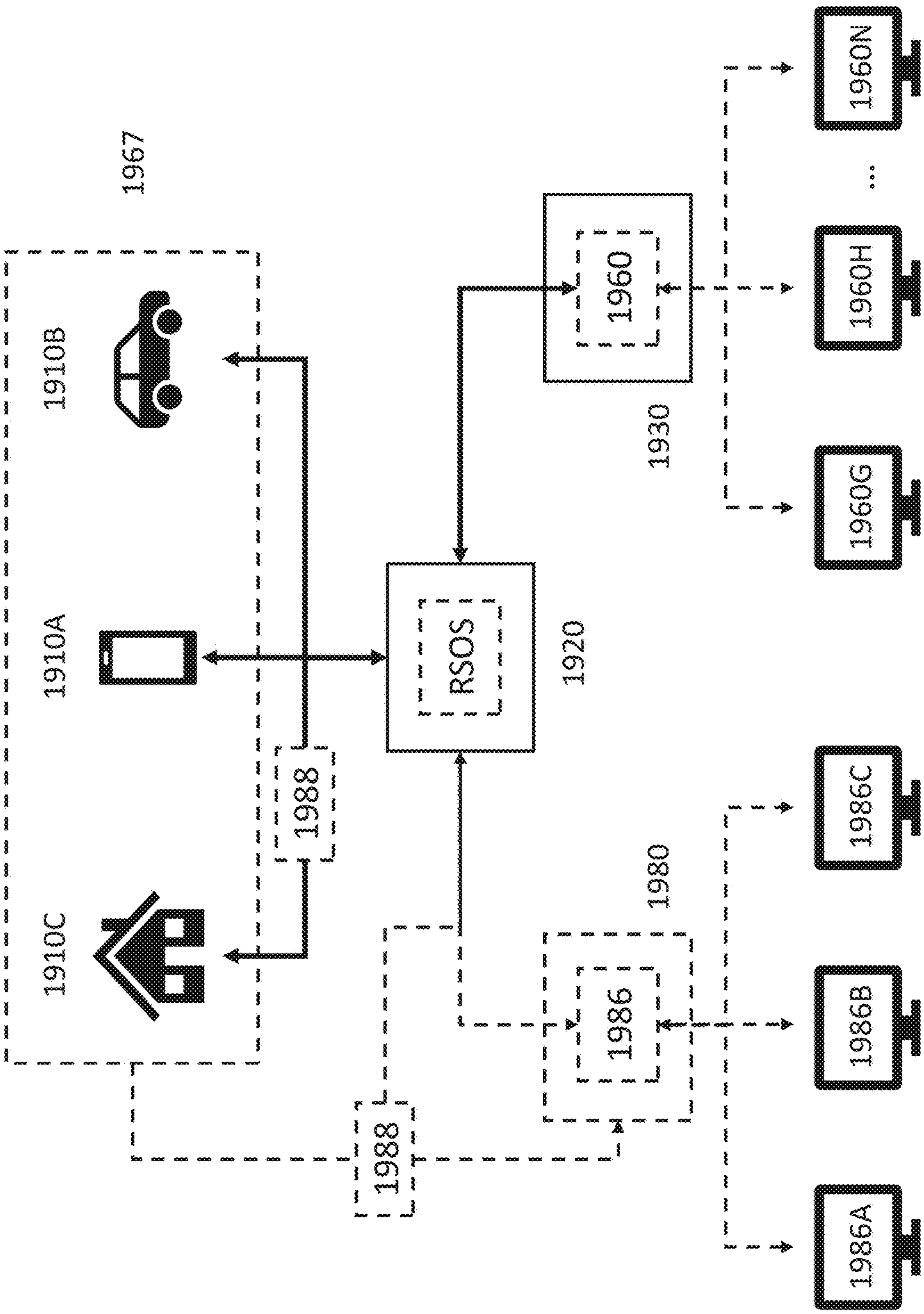

FIGS. 19A and 19B depict embodiments a system providing emergency response assistance to monitoring centers and emergency service providers (ESPs). As depicted in FIGS. 19A and 19B, in some embodiments, the system includes one or more alert sources 1967 (such as mobile phone 1910A, vehicle telematics system 1910B, or home security system 1910C), an emergency management system 1920, a monitoring center 1980, and one or more emergency service providers (ESPs) 1960. As described herein, in some embodiments, an emergency management system (EMS) 1920 can facilitate the exchange of data (e.g., emergency data and other communications) between a monitoring center 1980 and an emergency service provider (ESP) 1920, so that both monitoring centers and ESPs can more effectively and efficiently respond to emergencies or potential emergencies. Through the system depicted by FIGS. 19A and 19B, the EMS can act as a central hub between alert sources 1967, monitoring centers 1980, and ESPs 1930, and can direct or facilitate the flow of data and information between alert sources 1967, monitoring centers 1980, and ESPs 1930 in various ways.

Depicted in FIG. 19A is a flow of emergency data from alert sources 1967 to monitoring centers 1980 and then a two-way exchange of emergency data between monitoring centers 1980 and ESPs 1930. As described above, in some embodiments, when an alert source 1967 generates an emergency alert (e.g., an alarm generated by home security system 1910C), the alert source 1967 transmits the emergency alert (and any associated emergency data) to a monitoring center 1980. In some embodiments, the emergency alert (and any associated emergency data) is first received by an alert aggregator 1988 before being forwarded to the monitoring center 1980. In some embodiments, when an alert aggregator 1988 receives an emergency alert, the alert aggregator 1988 forwards the emergency alert to the monitoring center 1980 and the EMS 1920 in parallel. Once the monitoring center 1980 has received the emergency alert (and any associated emergency data), the monitoring center 1980 can then transmit the emergency alert (and any associated emergency data) to the EMS 1920, which can then determine an appropriate ESP 1930 to receive the emergency alert (and any associated emergency data) and transmit the emergency alert (and any associated emergency data) to the ESP 1930. In some embodiments, the EMS 1920 transmits a digital emergency service request associated with the emergency alert to the ESP 1930, as described above. In some embodiments, the monitoring center 1980 automatically transmits the emergency alert (and any associated emergency data) to the EMS 1920 upon receipt of the emergency alert (and any associated emergency data) from the alert source 1967 (e.g., via an alarm handling software application, as described below). In some embodiments, the monitoring center 1980 transmits the emergency alert (and any associated emergency data) to the EMS 1920 in response to the selection of a request dispatch button within the graphical user interface (GUI) of an alarm handling software application. In some embodiments, after receiving the emergency alert (and any associated emergency data), the EMS 1920 displays the emergency alert (and any associated emergency data) within a monitoring center portal 1986 provided to the monitoring center 1980 by the EMS 1920, as described above. The monitoring center portal 1986 may be accessed by multiple computing devices at the monitoring center 1980. For example, as depicted in FIG. 19A, monitoring center portals 1986A-1986C may be three different instances of the monitoring center portal 1986 simultaneously accessed by three different computing devices at the monitoring center 1980. In some embodiments, the EMS 1920 transmits the emergency alert (and any associated emergency data) to the ESP 1930 in response to the selection of a request dispatch button within the GUI of the monitoring center portal 1980.

In some embodiments, the EMS 1920 determines the appropriate ESP 1930 to receive the emergency alert using emergency data associated with the emergency alert. For example, in some embodiments, the EMS 1920 retrieves geofences associated with one or more emergency service providers (ESPs) (e.g., geofences associated with all of the ESPs registered with the EMS 1920 or geofences associated with only ESPs for which an active or persistent communication link has been established with the EMS 1920, such as through an emergency response application 1960, as described above) and determines if a location associated with the emergency alert falls within any of the geofences associated with the one or more ESPs. If the location falls within the geofence of one of the one or more ESPs, the EMS 1920 can identify the ESP associated with that geofence as the appropriate ESP to receive the emergency alert (and any associated emergency data). In some embodiments, the EMS 1920 provides the ESP 1930 with an emergency response application 1960 and displays the emergency alert (and any associated emergency data) within the graphical user interface (GUI) of the emergency response application 1960. The emergency response application 1960 may be accessed by multiple computing devices at the ESP 1930. For example, as depicted in FIG. 19A, emergency response applications 1960G-1960N may be N different instances of the emergency response application 1960 accessed at N different computing devices at or associated with the ESP 1930. In some embodiments, the EMS 1920 transmits a digital emergency service request associated with the emergency alert to the appropriate ESP 1930 and displays the digital emergency service request within the GUI of the emergency response application 1960, as described above. The digital emergency service request presents one or more options for servicing (e.g., claim or ignore). In some embodiments, when a service action is taken on the digital emergency service request, the resulting status of the digital emergency service request (e.g., claimed) is displayed within the GUI of every emergency response application 1960 to which the digital emergency service request was sent (e.g., emergency response applications 1960G-1960N).

Once the EMS 1920 has transmitted the emergency alert (or a digital emergency service request associated with the emergency alert) and any associated emergency data to the appropriate ESP 1930, the EMS 1920 can facilitate a two-way communication session between the monitoring center 1980 and the ESP 1930. In some embodiments, the two-way communication session is a voice-based communication session (e.g., a Voice over Internet Protocol (VOIP) call). In some embodiments, the two-way communication session is a text-based communication session. In some embodiments, the two-way communication session is facilitated through an alarm handling software application accessed by the monitoring center 1980. In some embodiments, the two-way communication session is facilitated through a monitoring center portal 1986 accessed by the monitoring center 1980 and provided by the EMS 1920. In some embodiments, the two-way communication session is facilitated through an emergency response application 1960 accessed by the ESP 1930. In some embodiments, the two-way communication session is facilitated through both a monitoring center portal 1986 accessed by the monitoring center 1980 and provided by the EMS 1920 and an emergency response application 1960 accessed by the ESP 1930. In some embodiments, the two-way communication session is facilitated through both an alarm handling software application accessed by the monitoring center 1980 and an emergency response application 1960 accessed by the ESP 1930. In some embodiments, only status updates regarding the emergency alert (or digital emergency service request associated with the emergency alert) (e.g., claimed, ignored, dispatched, etc.) are transmitted through the two-way communication session.

Depicted in FIG. 19B is a flow of emergency data from alert sources 1967 to emergency service providers (ESPs). As described above, in some embodiments, when an alert source 1967 generates an emergency alert (e.g., an emergency alert generated in response to the selection of a panic button within the graphical user interface (GUI) of a mobile application accessed on mobile phone 1910A), the alert source 1967 transmits the emergency alert (and any associated emergency data) to the emergency management system (EMS) 1920. In some embodiments, the emergency alert (and any associated emergency data) is first received by an alert aggregator 1988 before being forwarded to the EMS 1920. In some embodiments, when the alert aggregator 1988 receives an emergency alert, the alert aggregator 1988 forwards the emergency alert to the EMS 1920 and a monitoring center 1980 in parallel. Once the EMS has received the emergency alert (and any associated emergency data), the EMS 1920 can then attempt to verify the emergency alert, as described above. For example, the EMS 1920 can attempt to digitally verify the emergency alert by delivering a verification inquiry to one or more emergency contacts associated with the emergency alert, as described above. Or, for example, the EMS 1920 can attempt to verify the emergency alert using contextual data available to the EMS 1920, as described above. In some embodiments, verification of the emergency alert is included in the emergency alert, as described above. If the EMS 1920 is able to verify the emergency alert, the EMS 1920 can then transmit a digital emergency service request associated with the emergency alert to an appropriate ESP 1930 and display the digital emergency service request within the GUI of an emergency response application 1960 accessed by the ESP 1930.

In some embodiments, the EMS 1920 determines the appropriate ESP 1930 to receive the digital emergency service request using emergency data associated with the emergency alert. For example, in some embodiments, the EMS 1920 retrieves geofences associated with one or more emergency service providers (ESPs) (e.g., geofences associated with all of the ESPs registered with the EMS 1920 or geofences associated with only ESPs for which an active or persistent communication link has been established with the EMS 1920, such as through an emergency response application 1960, as described above) and determines if a location associated with the emergency alert falls within any of the geofences associated with the one or more ESPs. If the location associated with the emergency alert falls within the geofence of one or the one or more ESPs, the EMS 1920 can identify the ESP associated with that geofence as the appropriate ESP to receive the digital emergency service request. In some embodiments, the EMS 1920 provides the ESP 1930 with an emergency response application 1960 and displays the digital emergency service request within the graphical user interface (GUI) of the emergency response application 1960. The emergency response application 1960 may be accessed by multiple computing devices at the ESP 1930. For example, as depicted in FIG. 19B, emergency response applications 1960G-1960N may be N different instances of the emergency response application 1960 accessed at N different computing devices at or associated with the ESP 1930.

The digital emergency service request presents one or more options for servicing (e.g., claim or ignore). In some embodiments, when a service action is taken on the digital emergency service request, the resulting status of the digital emergency service request (e.g., claimed) is displayed within the GUI of every emergency response application 1960 to which the digital emergency service request was sent (e.g., emergency response applications 1960G-1960N). In some embodiments, once the EMS 1920 has transmitted the digital emergency service request associated with the emergency alert (and any associated emergency data) to the appropriate ESP 1930, the EMS 1920 can facilitate a two-way communication session between the alert source 1967 and the ESP 1930. In some embodiments, the two-way communication session is a voice-based communication session (e.g., a Voice over Internet Protocol (VOIP) call). In some embodiments, the two-way communication session is a text-based communication session. In some embodiments, the two-way communication session is facilitated through an application or a mobile application accessed by the alert source 1967. In some embodiments, the two-way communication session is facilitated through an emergency response application 1960 accessed by the ESP 1930. In some embodiments, the two-way communication session is facilitated through both an application or a mobile application accessed by the alert source 1967 and an emergency response application 1960 accessed by the ESP 1930. In some embodiments, only status updates regarding the digital emergency service request (e.g., claimed, ignored, dispatched, etc.) are transmitted through the two-way communication session.

In some embodiments, if the EMS 1920 is not able to verify the emergency alert, the EMS 1920 transmits the emergency alert to an appropriate monitoring center 1980. In some embodiments, the EMS 1920 determines the appropriate monitoring center 1980 using emergency data associated with the emergency alert. For example, in some embodiments, the EMS 1920 retrieves geofences associated with one or more monitoring centers (e.g., geofences associated with all of the monitoring centers registered with the EMS 1920 or geofences associated with only monitoring centers for which an active or persistent communication link has been established with the EMS 1920, such as through a monitoring center portal 1986, as described above) and determines if a location associated with the emergency alert falls within any of the geofences associated with the one or more monitoring centers. If the location associated with the emergency alert falls within the geofence of one of the one or more monitoring centers, the EMS 1920 can identify the monitoring center associated with that geofence as the appropriate monitoring center to receive the emergency alert (and any associated emergency data). In some embodiments, the EMS 1920 provides the monitoring center 1980 with a monitoring center portal 1986 and displays the emergency alert (and any associated emergency data) within the graphical user interface (GUI) of the monitoring center portal 1986. The monitoring center portal 1986 may be accessed by multiple computing devices at the monitoring center 1980. For example, monitoring center portals 1986A-1986C may be three different instances of the monitoring center portal 1986 accessed at three different computing devices at or associated with the monitoring center 1980. In some embodiments, the EMS 1920 transmits the emergency alert (and any associated emergency data) to the monitoring center 1980 through an alarm handling software application, as described above. However, in some embodiments, the EMS 1920 forwards an emergency alert to an appropriate monitoring center 1980 as soon as the EMS 1920 receives the emergency alert, whether or not the EMS 1920 has been able to verify the emergency alert, but only prompts the monitoring center 1980 to act on the emergency alert if the EMS 1920 is unable to verify the emergency alert.

Once the EMS 1920 has transmitted the emergency alert (and any associated emergency data) to the appropriate monitoring center 1980, the EMS 1920 can facilitate a two-way communication session between the monitoring center 1980 and an appropriate ESP 1930 (which may be determined using any of the methods for determining an appropriate ESP to receive an emergency alert, as described above). In some embodiments, the EMS 1920 only facilitates a two-way communication session between the monitoring center 1980 and an ESP 1930 for an emergency alert that the EMS 1920 was unable to verify in response to a request by the monitoring center 1980 (e.g., a selection of a request dispatch button by a call taker at the monitoring center, such as within the GUI of the monitoring center portal 1986). In some embodiments, the two-way communication session is a voice-based communication session (e.g., a Voice over Internet Protocol (VOIP) call). In some embodiments, the two-way communication session is a text-based communication session. In some embodiments, the two-way communication session is facilitated through an alarm handling software application accessed by the monitoring center 1980. In some embodiments, the two-way communication session is facilitated through a monitoring center portal 1986 accessed by the monitoring center 1980 and provided by the EMS 1920. In some embodiments, the two-way communication session is facilitated through an emergency response application 1960 accessed by the ESP 1930. In some embodiments, the two-way communication session is facilitated through both a monitoring center portal 1986 accessed by the monitoring center 1980 and provided by the EMS 1920 and an emergency response application 1960 accessed by the ESP 1930. In some embodiments, the two-way communication session is facilitated through both an alarm handling software application accessed by the monitoring center 1980 and an emergency response application 1960 accessed by the ESP 1930.

Geospatial Queries for Emergency Service Providers (ESPs)

As described above, in some embodiments, geospatial queries (i.e., queries or requests that include identifiers of geospatial areas) may be used for obtaining emergency data. In some embodiments, just as geospatial queries may be submitted through an emergency response application to an emergency management system (EMS) by a monitoring center, geospatial queries may be submitted through an emergency response application to the EMS by an emergency service provider (ESP). In some embodiments, when the EMS receives a geospatial query, the EMS performs a geospatial analysis and returns geospatial data to the requesting party.

In some embodiments, the EMS includes an emergency clearinghouse (as described above), which functions to receive, store, or otherwise access emergency data from any number of a variety of different data sources (such as mobile phones, IoT devices, emergency response assets, 3rd party systems, sensor devices, and emergency service providers). In many instances, individual units of data (e.g., emergency data) stored or accessed by the emergency clearinghouse has a spatial attribute (e.g., a location or a geofence). For example, emergency alerts often include locations, as does information regarding a first responder (e.g., a police officer); information regarding an emergency service provider (ESP) may include a geofence associated with the ESP, indicating the authoritative region of the ESP; information regarding an emergency response asset may include a location, geofence, or asset range to indicate where the emergency response asset is available. Thus, in some embodiments, as described herein, a geospatial analysis of emergency data (hereinafter, an "emergency geospatial analysis") received, stored, or otherwise accessible by the EMS may be performed to determine what emergency response elements (e.g., emergency alerts or emergency response resources, such as first responders, emergency response assets, etc.) exist within a given space. Such information may be helpful to emergency service providers in providing emergency response.

Figure 20:
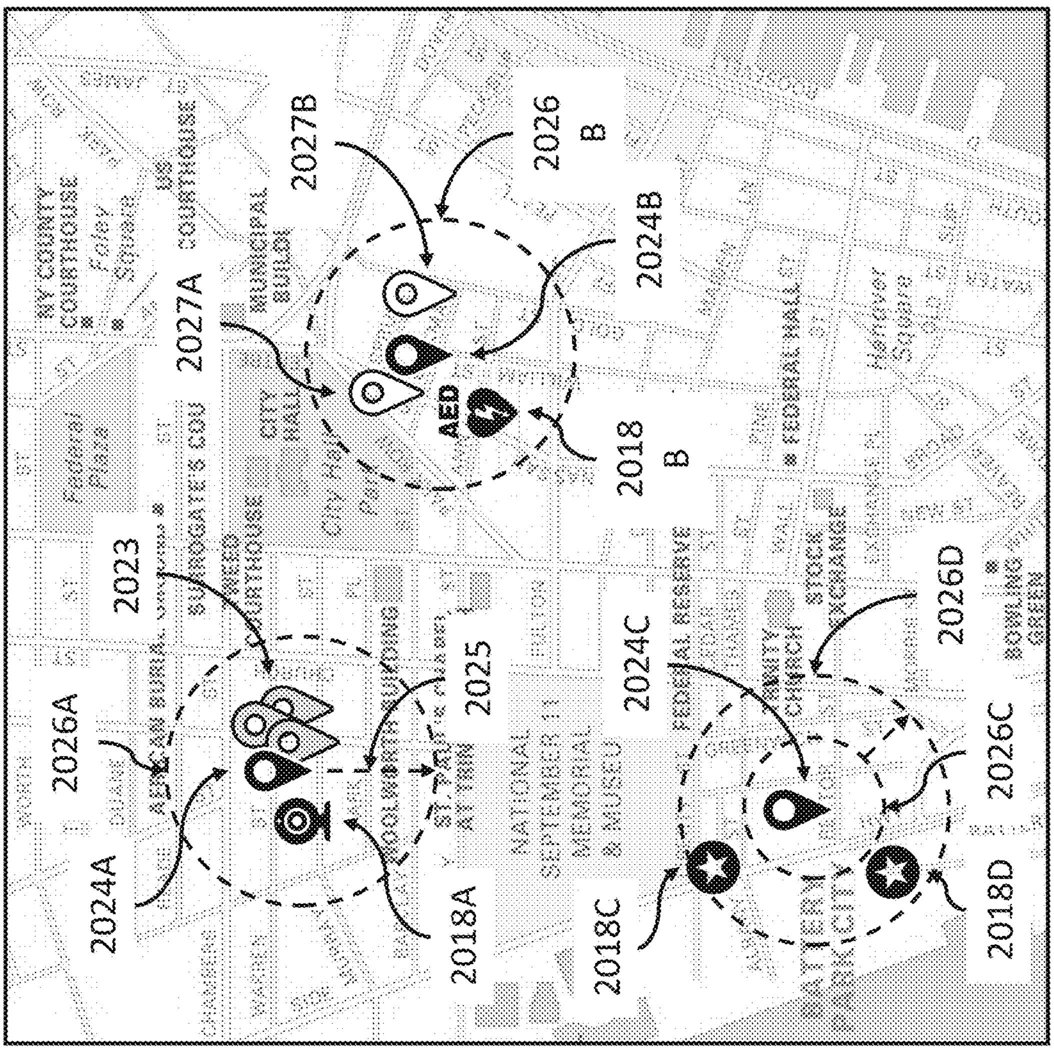
FIG. 20 illustrates non-limiting examples of emergency geospatial analyses in accordance with one embodiment of the present disclosure.

FIG. 20 illustrates exemplary processes for performing emergency geospatial analyses in accordance with some embodiments of the present disclosure. FIG. 20 shows three emergency locations 2024A-2024C. The emergency locations 2024 may represent active emergency alerts. For example, in some embodiments, as described above, when an emergency alert is generated and transmitted to an emergency management system (EMS) by an electronic device, the electronic device can generate an emergency location (e.g., a hybrid device-based location) and include the emergency location in the emergency alert. For an emergency geospatial analysis to be performed, a representative area 2026 for the emergency geospatial analysis must be determined. In some embodiments, a representative area 2026 for an emergency geospatial analysis is automatically or autonomously determined or predetermined by the EMS. For example, as illustrated in FIG. 20, the EMS can determine a representative area 2026 by applying a geospatial boundary around an emergency location 2024. A geospatial boundary is a virtual perimeter around a geographic region and may take any shape or size. For example, as illustrated in FIG. 20, representative area 2026A is a circle defined by a radius applied to emergency location 2024A. However, in some embodiments, a representative area 2026 can be defined by a square or rectangle or any other shape having an emergency location as its center. Additionally, a representative area 2026 need not be defined around an emergency location or an emergency alert. In some embodiments, a representative area 2026 can be defined or received by an entity external to the EMS, such as by a user of an emergency response application, as described above and below.

Once a representative area has been determined for an emergency geospatial analysis, the EMS can perform the emergency geospatial analysis by identifying one or more emergency response elements having a location attribute that falls within the representative area. FIG. 20 illustrates three such emergency geospatial analyses. In a first example, a representative area 2026A has been determined around a recently received emergency location 2024A (e.g., included in a recently generated and received emergency alert) by applying a radius 2025 around the emergency location 2024A. As illustrated by FIG. 20, an emergency geospatial analysis performed on the representative area 2026A has identified a group of three historical emergency locations 2023 (e.g., emergency locations not associated with current emergency alerts; for example, emergency locations associated with emergency alerts that were received by the EMS more than one hour (or any predetermined amount of time) before the time that the geospatial analysis was performed) received by the EMS within the representative area 2026A. The emergency geospatial analysis has also identified an emergency response resource 2018A, a smart camera accessible by the EMS, which may be leveraged for emergency response.

In a second example, a representative area 2026B has been determined around a recently received emergency location 2024B by applying a radius around the emergency location 2024B. As illustrated by FIG. 20, an emergency geospatial analysis performed on the representative area 2026B has identified two concurrent emergency locations 2027A and 2027B (e.g., associated with two concurrent emergency alerts; for example, emergency locations associated with emergency alerts that were received by the EMS less than one hour (or any predetermined amount of time) before the time that the geospatial analysis was performed) within the vicinity of emergency location 2024B. In this example, knowing that there are two concurrent emergency locations 2027 in the vicinity of emergency location 2024B can inform how an emergency service provider responds to the emergency represented by emergency location 2024B. In this example, the emergency geospatial analysis has also identified an emergency response resource 2018B, a smart AED (as described below), which may be leveraged for emergency response.

In a third example, a representative area 2026C has been determined around a recently received emergency location 2024C by applying a radius around emergency location 2024C. As illustrated by FIG. 20, an emergency geospatial analysis performed on the representative area 2026C has identified no concurrent emergency alerts or emergency response resources within the representative area 2026C. In some embodiments, as illustrated by FIG. 20, if the EMS does not find any emergency response elements within the representative area of a particular emergency geospatial analysis, the EMS can expand the representative area and reperform the emergency geospatial analysis. In this third example illustrated by FIG. 20, the EMS expands the representative area of the emergency geospatial analysis from representative area 2026C to representative area 2026D by increasing the length of the radius around emergency location 2024C. After reperforming the emergency geospatial analysis on representative area 2026D, the EMS identifies two emergency response resources 2018C and 2018D, two police officers that can be alerted of the emergency represented by emergency location 2024C.

Transmission and Presentation of Geospatial Data

In some embodiments, after an emergency geospatial analysis is performed, the EMS then transmits the results of the emergency geospatial analysis (e.g., emergency response elements identified as having a location attribute that falls within the representative area of the emergency geospatial; hereinafter. "geospatial data" or "emergency geospatial data") to one or more recipients, such as an emergency service provider (ESP). In some embodiments, the EMS then presents the geospatial data within the graphical user interface (GUI) of an emergency response application, as described below.

Figure 21:
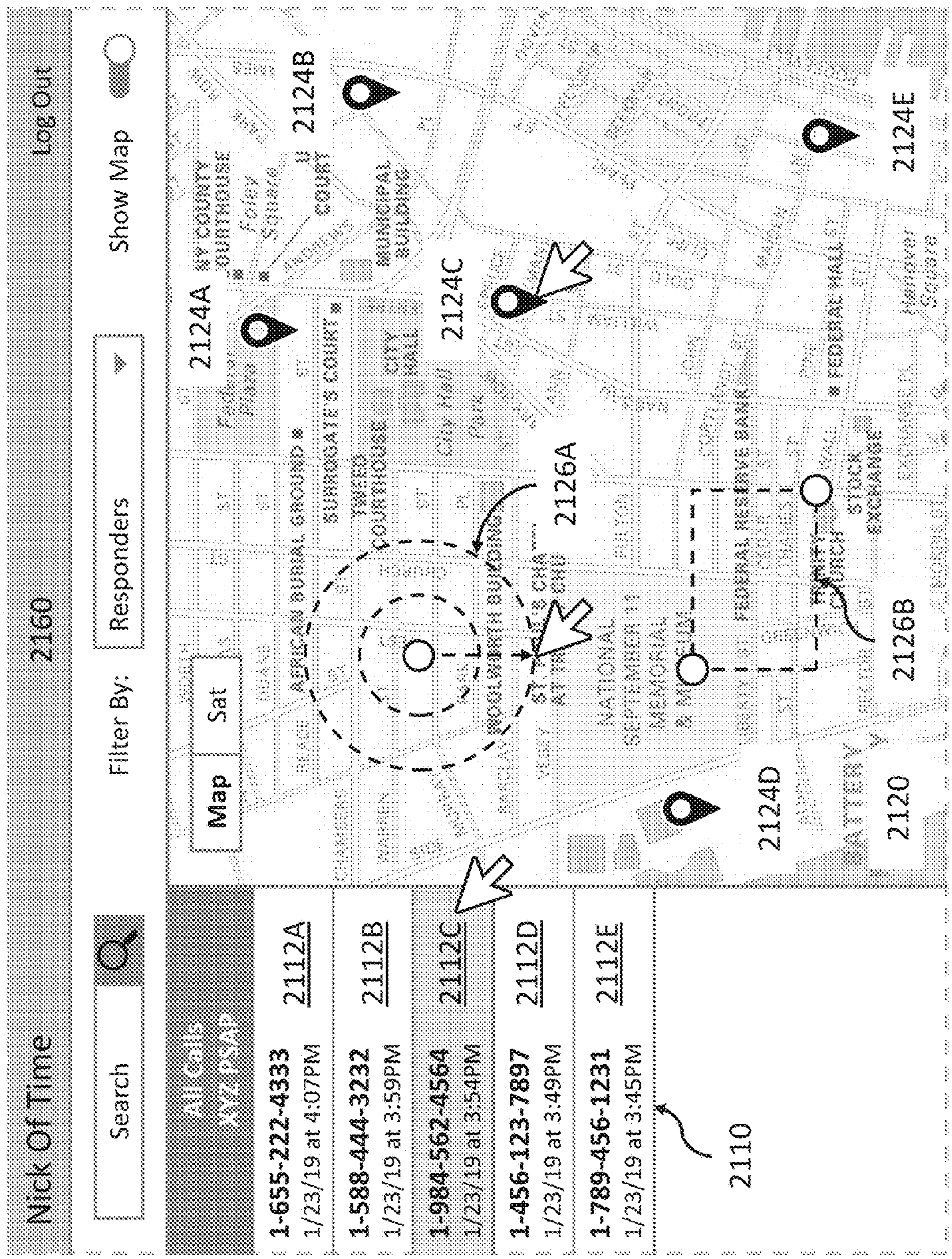
FIG. 21 illustrates processes for submitting a geospatial query through an emergency response application in accordance with some embodiments of the present disclosure.

As mentioned above, in some embodiments, the EMS performs an emergency geospatial analysis in response to receiving an emergency data request including an indicator of a representative area (i.e., a geospatial query) for the emergency geospatial analysis from a requesting party (e.g., an ESP) and transmits any geospatial data produced by the emergency geospatial analysis to the requesting party (i.e., geospatial data is pulled from the EMS by the requesting party). FIG. 21 illustrates exemplary processes for generating and transmitting a geospatial query. In some embodiments, geospatial query is generated and transmitted by a backend system without the use of a user interface. In some embodiments, geospatial query is generated and transmitted through a graphical user interface (GUI) of an emergency response application, as illustrated by FIG. 21.

FIG. 21 illustrates various examples of processes for generating and transmitting geospatial query to an EMS using an emergency response application 2160. For example, in some embodiments, a user of the emergency response application 2160 can generate and transmit geospatial query to the EMS by selecting an incident 2112 from within the list of incidents 2110 or by selecting an emergency location 2124 within the interactive map 2120. In such an embodiment, selecting an emergency location 2124 or an incident 2110 prompts the emergency response application 2160 to generate and transmit a geospatial query to the EMS including the emergency location 2124 or the emergency location associated with the incident 2110 as an indicator of a representative area (also referred to as an "identifier of a geospatial area"). In some embodiments, the EMS can then generate or determine a corresponding representative area by applying a radius to the emergency location 2124 or the emergency location associated with the 2110, as described above. For example. FIG. 21 illustrates five incidents 2112 (incidents 2112A-2112E) associated with five respective emergency locations 2124 (emergency locations 2124A-2124E) within the GUI of the emergency response application 2160. In this example, if a user of the emergency response application 2160 selects incident 2112C or its associated emergency location 2124C, the emergency response application 2160 will be prompted to generate and transmit a geospatial query to the EMS including emergency location 2124C as an indicator of a representative area.

In another example, a user of the emergency response application 2160 can generate geospatial query by defining a geospatial boundary within the interactive map 2120. For example, in some embodiments, a user of the emergency response application 2160 can define a geospatial boundary by clicking and dragging with their mouse to create a circle out of a point and a radius, such as the circular geospatial boundary representing representative area 2126A, or by clicking in two points to create a rectangle out of the two points, such as the rectangular geospatial boundary representing representative area 2126B. In this example, defining a geospatial boundary within the interactive map 2120 prompts the emergency response application 2160 to generate and transmit a geospatial query to the EMS including the geospatial boundary representing as an indicator of a representative area. In some embodiments, the EMS can then generate or determine the representative area by rastering a geospatial boundary representing the representative area. In some embodiments, an emergency response application 2160 sends a geospatial query including an identifier of an ESP as an indicator of a representative area to the EMS. Using the identifier of the ESP, the EMS can then retrieve a geofence associated with the ESP and use the geofence associated with the ESP as the representative area for an emergency geospatial analysis. In some embodiments, an emergency response application 2160 automatically transmits geospatial query including an indicator of a representative area (e.g., an identifier of an ESP, such as the ESP at which the emergency response application is being accessed) to the EMS in response to a user logging into the emergency response application 2160.

Figure 22A:
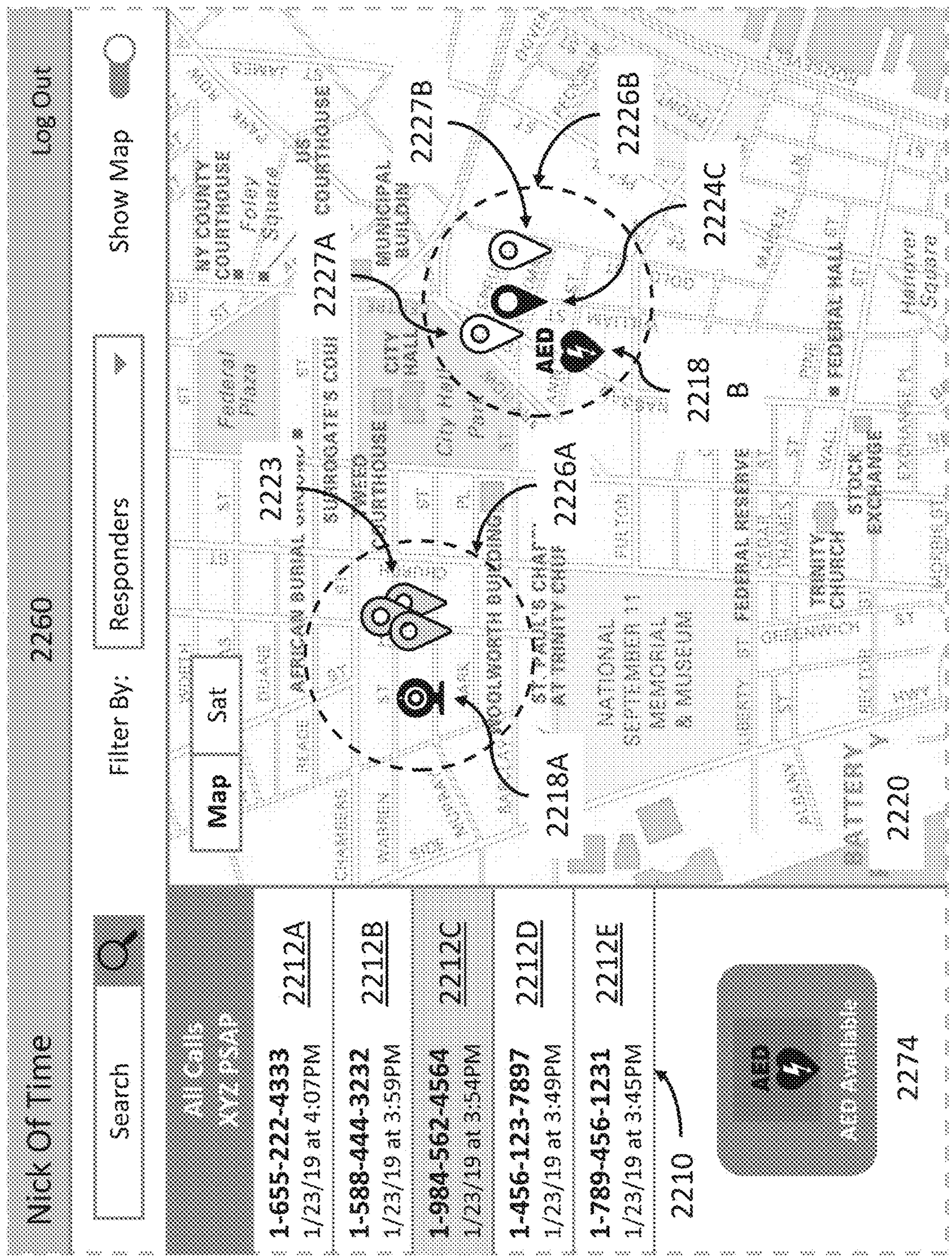
FIGS. 22A and 22B illustrate examples of a graphical user interface of an emergency response application in accordance with one embodiment of the present disclosure.
Figure 22B:
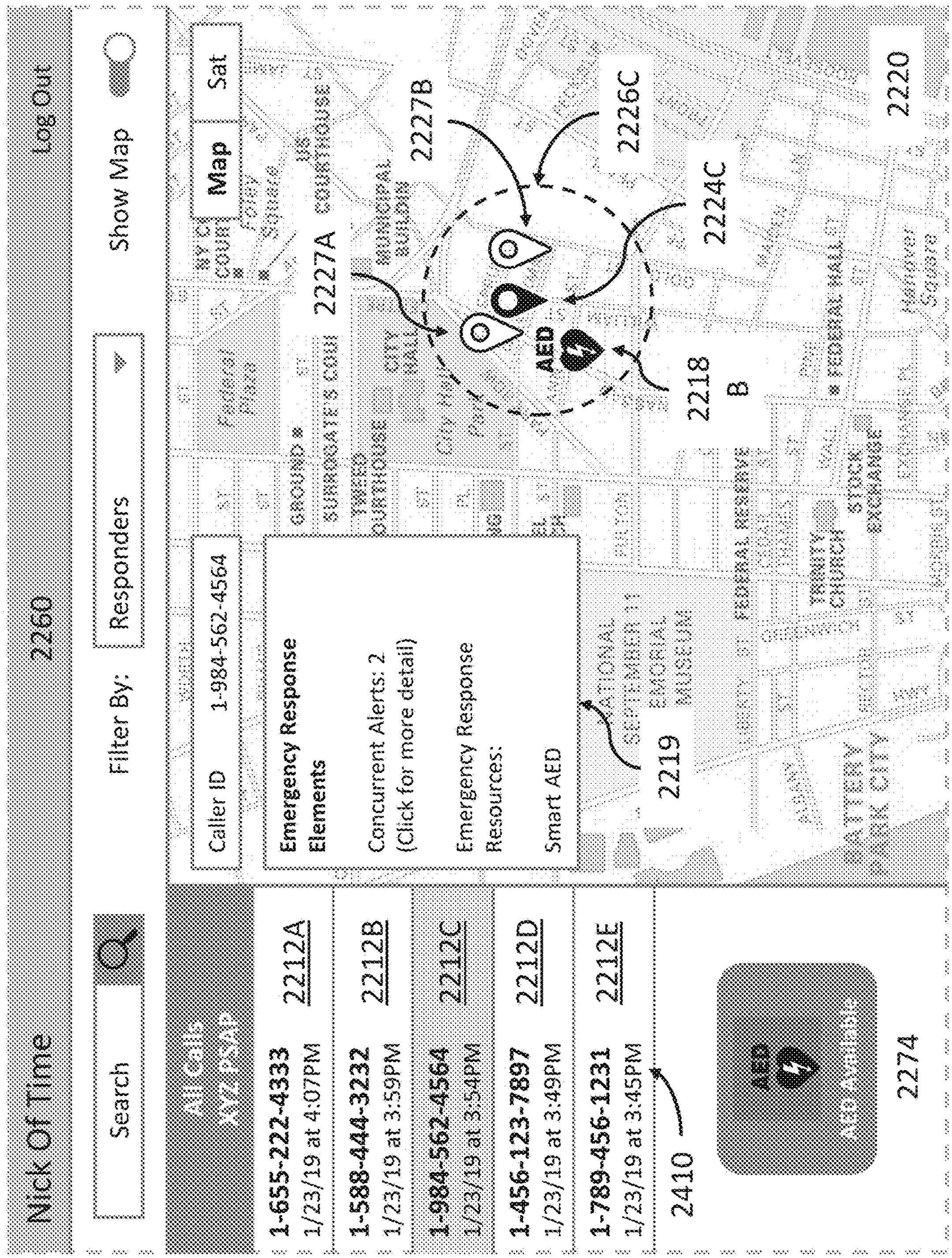

As mentioned above, in some embodiments, after performing an emergency geospatial analysis on a representative area, the EMS can transmit geospatial data produced by the emergency geospatial analysis to one or more recipients. FIGS. 22A and 22B illustrate geospatial data received by an emergency service provider (ESP) and displayed within an emergency response application. As illustrated in FIG. 22A, two emergency geospatial analyses have been performed, one on representative area 2226A and another on representative area 2226B. In the examples illustrated by FIG. 22A, the emergency geospatial analyses performed on representative areas 2226A and 2226B are the same analyses performed on representative areas 2026A and 2026B, respectively, described in reference to FIG. 20. As illustrated by FIG. 22A, the results of the respective emergency geospatial analyses have been transmitted to an ESP (as described above) and are now displayed within an emergency response application 2260 accessed by a member of the ESP. For example, within representative area 2226A (defined in this example by the click and drag gesture illustrated in FIG. 21 used to create the geospatial boundary representing representative area 2126A, thereby prompting the emergency response application to generate and transmit a geospatial query including the geospatial boundary representing representative area 2126A as an indicator of a representative area to the EMS) the EMS has identified a group of three historical emergency locations 2223 and a smart camera 2218A, now displayed within the representative area 2226A within the GUI of the emergency response application 2260. In another example, within representative area 2226B (automatically defined by the EMS by a radius applied to emergency location 2224C in response to receiving a geospatial query including emergency location 2224C as an indicator of a representative area) the EMS has identified two concurrent emergency locations 2227A and 2227B and a smart AED 2218B, now displayed within the representative area 2226B within the GUI of the emergency response application 2260. Additionally, the emergency response application 2260 also displays asset controls 2474 for activating the smart AED 2218B. In some embodiments, geospatial data displayed within the emergency response application 2260 can be filtered based on type, such as responders, emergency response assets, concurrent emergency alerts, or historical emergency alerts. In some embodiments, as illustrated by FIG. 22B, selecting an incident 2212 or an emergency location 1324 representing an emergency alert prompts the emergency response application 1360 to display geospatial data associated with the emergency alert within a data card 2219 within the GUI of the emergency response application 2260. For example, as illustrated by FIG. 22B, incident 2212C or its associated emergency location 2224C has been selected by a user of the emergency response application, and the emergency response application 2260 now displays the geospatial data produced by an emergency geospatial analysis performed on the representative area 2226B generated around emergency location 2224C within data card 2219. In this example, the data card 2219 lists both of the concurrent emergency locations, the smart AED, and a common location generated for the emergency alert. In some embodiments, after a geospatial query including an indicator of a representative area (e.g., an identifier of an ESP) is received from a requesting party (e.g., an ESP) by the EMS, the EMS can establish an active or persistent communication link with the requesting party, as described above. Then, in addition to performing an emergency geospatial analysis on the representative area and transmitting any geospatial data produced by the emergency geospatial analysis to the requesting party, whenever any new or additional emergency response elements having a location attribute falling within the representative area are received or found by the EMS, the EMS can automatically push the new or additional emergency response elements to the requesting party.

Digital Processing Device

In some embodiments, the platforms, media, methods and applications described herein include a digital processing device, a processor, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device. In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smart-phones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples. Nokia® Symbian® OS, Apple® IOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random-access memory (FRAM). In some embodiments, the non-volatile memory comprises phase-change random access memory (PRAM). In some embodiments, the non-volatile memory comprises magneto resistive random-access memory (MRAM). In other embodiments, the device is a storage device including, by way of non-limiting examples, CD-ROMs. DVDs, flash memory devices, magnetic disk drives, magnetic tapes drives, optical disk drives, and cloud computing-based storage. In further embodiments, the storage and/or memory device is a combination of devices such as those disclosed herein.

In some embodiments, the digital processing device includes a display to send visual information to a subject. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In some embodiments, the display is E-paper or E ink. In other embodiments, the display is a video projector. In still further embodiments, the display is a combination of devices such as those disclosed herein.

In some embodiments, the digital processing device includes an input device to receive information from a subject. In some embodiments, the input device is a keyboard. In some embodiments, the input device is a pointing device including, by way of non-limiting examples, a mouse, trackball, trackpad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, media, methods and applications described herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, media, methods and applications described herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples. Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML). Extensible Hypertext Markup Language (XHTML), or extensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX). Flash® Actionscript, Javascript, or Silverlight®. In some embodiments, a web application is written to some extent in a server-side coding language such as Active Server Pages (ASP). ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable compiled applications.

Software Modules

In some embodiments, the platforms, media, methods and applications described herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of barcode, route, parcel, subject, or network information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

Web Browser Plug-In

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Certain Terminologies

Unless otherwise defined, all technical terms used herein have the same meaning as commonly understood by one of ordinary skill in the art to which this invention belongs. As used in this specification and the appended claims, the singular forms "a." "an," and "the" include plural references unless the context clearly dictates otherwise. Any reference to "or" herein is intended to encompass "and/or" unless otherwise stated.

As used herein, a "device" is a digital processing device designed with one or more functionality. A "triggering device" refers to a communication device with a communication component, which will allow it to send and receive information over a wireless channel, a wired channel, or any combination thereof (e.g., sending/receiving information over the Internet). Examples of triggering devices include a mobile phone (e.g., a smartphone), a laptop, a desktop, a tablet, a radio (e.g., a two-way radio), and a vehicular communication system. In some embodiments, a triggering device includes a car security system (e.g., OnStar®), a home security system, or a home control system (e.g., a networked control system for providing network controlled and/or smart temperature control such as a Wi-Fi smart thermostat, lighting, entertainment, and/or door control, such as Nest®). In some embodiments, a triggering device is an Internet of Things (IOT) device. In some embodiments, the triggering device is a sensor for sensing environmental or health indicators. In some embodiments, the sensor may include a sensing component and a communication component. In some embodiments, the triggering device is a sensor in a sensor network or a device that controls a sensor network.

In some embodiments, a triggering device is a wearable device (e.g., a communication device worn by a user). In some embodiments, a triggering device (e.g., a wearable device) comprises one or more sensors. As used herein, a "mobile wireless device" refers to a device that is portable and communicates wirelessly. In some embodiments, a user wears or carries the mobile wireless device on the user's person or in the user's vehicle. Examples of mobile wireless devices include mobile or cellular phones, wearable devices (e.g., smart watch, fitness tracker, wearable sensor, smart glasses, etc.).

As used herein, an "associated device" refers to a communication device that is associated with the triggering device. For example, a user may be using several communication devices such as a mobile phone, a wearable, a home security system, a car computer. The user may have registered these devices with his or her account and linked these devices with a user name, user number(s), email address(es), home or other physical address(es). In some embodiments, associated devices may include communication devices of a second user who is associated with user, e.g. a husband and wife, a father and son, a victim and doctor, friends, work colleagues, etc. In some cases, the user may have added the second user as an emergency contact, a member of a group, etc. In some cases, user may have agreed to share location and other data with the second user. In some embodiments, the second user may be someone who is frequently contacted by the user and the communication device identifies the second user from the "Recently called" or "Frequently called" list. In some embodiments, the associated devices may be devices that are proximal or near-by to the triggering device such as obtained through a WiFi scan. In some embodiments, an associated device is proximal to the triggering device when the location of the associated device is within 1, 5, 10, 15, 20, 25, 30, 35, 40, 45, 50, 60, 70, 80, 90, 100, 200, 300, 400, or 500 meters of the location of the triggering device.

As used herein, the "list of associated devices" refers to a list of communication devices that are associated with the user or the triggering device (e.g., a second resident in a smart home). The list of associated devices may be listed by user name, phone number, email address, physical address, coordinates etc. The device entry in the list may include phone number, email address, physical address, coordinates, BSSID, SSID or MAC address. The list may be user defined or generated by the device or the EMS.

As used herein, an "emergency service request" refers to a request or message sent to an emergency service provider for emergency assistance. In some embodiments, a request for assistance is an emergency request for assistance (e.g., the request is associated with an emergency situation) such as, for example, an emergency alert. In some embodiments, an emergency alert comprises a request for assistance. In some embodiments, a request for assistance is associated with an emergency situation. In some embodiments, a request for assistance comprises an emergency indication. In further embodiments, an emergency indication is selected from one or more of the group consisting of traffic accident, police emergency, medical emergency, and fire emergency. In some embodiments, a request for assistance is associated with a non-emergency situation (e.g., request for a tow truck after car breaks down). In some embodiments, a request for assistance is associated with a device sending the request. In other embodiments, a request for assistance is associated with a device not sending the request (e.g., a proxy request on behalf of a second device and/or a member device in a group of devices). As used herein, a request is "associated" with a device or user when the request relates to an emergency or non-emergency situation involving the device or user, for example, when the request identifies or provides identifying information for the device or user. In some embodiments, a request comprises data associated with a device (or user thereof). In some embodiments, a request comprises a data set associated with a device. For example, in some embodiments, a request comprises a data set associated with a device, wherein the data set comprises current location data. In other embodiments, a request for assistance is sent and/or received separately from data associated with a device. For example, in some embodiments, a request is sent first, and the recipient subsequently queries the device that sent the request for data or a data set associated with the emergency and/or device or user involved in the emergency. Alternatively, in some embodiments, a request is sent first, and the recipient subsequently queries the device associated with the emergency for data or a data set associated with the emergency and/or device or user involved in the emergency.

As used herein, an "emergency responder" refers to any person or persons responsible for addressing an emergency situation. In some embodiments, a first responder refers to government personnel responsible for addressing an emergency situation. In some embodiments, a first responder is responsible for a particular jurisdiction (e.g., a municipality, a township, a county, etc.). In some embodiments, a first responder is assigned to an emergency by an emergency dispatch center. In some embodiments, a first responder responds to a request for emergency assistance placed by a user via a user communication device. In some embodiments, a first responder includes one or more fire fighters, police officers, emergency medical personnel, community volunteers, private security, security personnel at a university, or other persons employed to protect and serve the public and/or certain subsets of the population.

As used herein, an "emergency service provider" (ESP) is a public or private organization or institution responsible for providing emergency services. For example, in some embodiments, an EDC (e.g., a public safety answering point (PSAP)), a fire department, a police department, and a hospital may all be considered emergency service providers. In some embodiments, an emergency responder is a member of an ESP. In some embodiments, an ESP personnel is a person who works at an ESP. For example, an ESP personnel may be a call-taker at a PSAP or a first responder at a fire department.

As used herein, a "recipient" refers to one or more persons, services, or systems that receive a request for assistance (e.g., an emergency alert). The recipient varies depending on the type of request. In some embodiments, a recipient is an emergency service. In some embodiments, a recipient is an emergency service when he requests for assistance pertains to an emergency (e.g., a tier 2 emergency). In some embodiments, a recipient is an emergency management system. In some embodiments, a recipient is an emergency dispatch center. In some embodiments, a recipient is an emergency dispatch center, wherein the request is first routed through an emergency management system (e.g., request is sent to the EMS, but ultimately is sent to an EDC). In some embodiments, a recipient is a first responder (e.g., a communication device of a first responder). In some embodiments, a recipient is a non-emergency service or personnel, for example, a relative or friend. In such situations, a user of a communication device (or member device or second device) does not require emergency assistance, but does need help. As an example, a user of a member device in a group of devices is a child who is lost in a theme park. The parent of the child has a communication device in the same group of devices as the child's member device. The parent uses the communication device to send a request for assistance on behalf of the child's member device to theme park security guards who are closer to the child than the parent. Security is then able to pick up the child quickly using the data set associated with the member device, which they are given authorization to access by the parent's communication device.

As used herein, an "emergency data source" refers to any device, server, or system that can produce, generate, or communicate information or data pertinent to an emergency. In some embodiments, an emergency data source is a communication device, a wearable device, an internet of things (IOT) device, or any other type of device. In some embodiments, an emergency data source is a network server. As used herein, an "emergency data recipient" refers to any device, server, or system or user of any device, server, or system that can receive information or data pertinent to an emergency. In some embodiments, an emergency data recipient is an emergency service provider (ESP), ESP personnel, or an electronic device associated with an ESP. In some embodiments, an emergency data recipient is a person in an emergency or an electronic device associated with a person in an emergency.

As used herein, a "victim" refers to a person experiencing an emergency. As used herein, a "medical service provider" is a facility that provides people with medical services, such as a hospital, healthcare clinic, emergency room, urgent care center, etc. As used herein, a "preferred medical service provider" is a medical service provider covered under a victim's medical insurance or a medical service provider or has better (e.g., more optimal or less expensive) coverage under the victim's medical insurance than another medical service provider. In some embodiments, a preferred medical service provider may be referred to as an "in-network hospital" or "in-network medical service provider." As used herein, a medical service provider is "proximal" to a location if the medical service provider is within the vicinity of the location (e.g., within 1 mile, 2 miles, 3 miles, 4 miles, or 5 miles of the location).

As used herein, a "user" refers to one or more person or persons associated with a device (e.g., communication device, member device, second device, device of a first responder, etc.). In some embodiments, a user utilizes a device to place a request for assistance. In some embodiments, user refers to one or more persons who are paid subscribers of a network access service, for example, cellular service subscribers. In some embodiments, a user refers to anyone who gains access to a network via a router, for example, a Wi-Fi router, and is not a paid subscriber of any access service. In some embodiments, a device associated with a user is a device carried or worn on the person of the user (e.g., a phone or wearable device). In some embodiments, a device associated with a user is not carried or worn on the person of the user (e.g., a home security sensor or camera installed in the home of the user, a vehicle tracking system installed in a vehicle of the user, etc.).

As used herein, "data" refers to a collection of information about one or more entities (e.g., user of a user communication device) and/or an environment that pertains to characteristics of the one or more entities. In some embodiments, an entity is a person. In some embodiments, an entity is a thing (e.g., a house). For example, in some embodiments, data comprises sensor data from home sensors associated with a house. In this example, the data is also associated with one or more persons (e.g., the homeowner(s) and/or inhabitant(s)). In some embodiments, data refers to meta-data. In some embodiments, data comprises health information about the user of a communication device. In some embodiments, data comprises information about the surrounding environment of the user of the user communication device (e.g., surrounding temperature, location, elevation, barometric pressure, ambient noise level, ambient light level, surrounding geography, etc.). In some embodiments, data comprises information about other users that is pre-stored in a device or in a database (e.g., a database within a group of devices who are related to the user of the user communication device as predefined by the user). In some embodiments, the data set comprises information from two or more users of user communication devices, wherein each user is affected by the current emergency situation. As an example, two unrelated users are involved in a vehicular collision, and each user sends a separate emergency request (for traffic accident) using his/her communication device. In this example, the separate emergency requests are associated (e.g., by an emergency management system and/or emergency dispatch center) with the same emergency based on the proximity of time, location, and emergency indication of the emergency requests. As a result, the data set for this accident comprises information from both user communication devices. In this example, the data set comprises location information from both devices (e.g., GPS coordinates), biosensor data for one or both devices (e.g., biosensor data such as heart rate and blood pressure can be important in case of injury), and information about the vehicle driven by each user (e.g., make, model, and year of manufacture information stored on the device). In some embodiments, data comprises current data. In further embodiments, current data comprises information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60) minutes old. In further embodiments, current data comprises information that equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, data comprises historical data. In further embodiments, historical data comprises information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60) minutes old. In further embodiments, historical data comprises information that equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, the age of information is calculated from the date the information is first collected (e.g., when a sensor first detects a sensed parameter such as, for example, heart rate).

As used herein, "health data" refers to medical information associated with a user of a device. In some embodiments, health data comprises medical history such as, for example, past illnesses, surgery, food and/or drug allergies, diseases, disorders, medical diagnostic information (e.g., genetic profile screen, positive/negative test results for a coronavirus or Covid-19), or any combination thereof. In some embodiments, health data comprises family medical history (e.g., family history of breast cancer). In some embodiments, health data comprises current health information such as, for example, current symptoms, current medications, and/or current illnesses or diseases. In some embodiments, health data comprises user age, height, weight, blood type, and/or other biometrics. In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old. In some embodiments, current health information comprises information that is equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, current health information comprises medical information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old.

As used herein, "user data" refers to general information associated with a user of a device. In some embodiments, user data comprises user identity, user name, height, weight, eye color, hair color, ethnicity, national origin, religion, language(s) spoken, vision (e.g., whether user needs corrective lenses), home address, work address, occupation, family information, user contact information, emergency contact information, social security number, alien registration number, driver's license number, vehicle VIN, organ donor (e.g., whether user is an organ donor), or any combination thereof. In some embodiments, user data is obtained via user input.

As used herein, "sensor data" refers to information obtained or provided by one or more sensors. In some instances, a sensor is associated with a device (e.g., user has a communication device with a data link via Bluetooth with a wearable sensor, such as, for example, a heart rate monitor or a pedometer). Accordingly, in some embodiments, the device obtains sensor data from the sensor (e.g., heart rate from the heart rate monitor or distance traveled from the pedometer). In some instances, the sensor data is relevant to an emergency situation (e.g., heart rate during a cardiac emergency event). In some embodiments, a sensor and/or sensor device comprises an acoustic sensor, a breathalyzer, a carbon dioxide sensor, a carbon monoxide sensor, an infrared sensor, an oxygen sensor, an ozone monitor, a pH sensor, a smoke detector, a current sensor (e.g., detects electric current in a wire), a magnetometer, a metal detector, a radio direction finder, a voltage detector, an air flow meter, an anemometer, a flow sensor, a gas meter, a water meter, a Geiger counter, an altimeter, an air speed indicator, a depth gauge, a gyroscope, a compass, an odometer, a shock detector (e.g., on a football helmet to measure impact), a barometer, a pressure gauge, a thermometer, a proximity sensor, a motion detector (e.g., in a home security system), an occupancy sensor, or any combination thereof, and in some embodiments, sensor data comprises information obtained from any of the preceding sensors. In some embodiments, one or more sensors are physically separate from a user device. In further embodiments, the one or more sensors authorize the user device to obtain sensor data. In further embodiments, the one or more sensors provide or send sensor data to the user device autonomously. In some embodiments, the user device and the one or more sensors belong to the same group of devices, wherein member devices are authorized to share data. In some embodiments, a user device comprises one or more sensors (e.g., user device is a wearable device having a sensor or sensing component).

As used herein, "communication link" refers to a communication pathway from a device (e.g., communication device) to another device or to an intermediate device (e.g., a router) on a network. In some embodiments, the communication device establishes a communication link with another device or an intermediate device to transfer information (e.g., a location of the device) or to obtain information from a recipient such as, for example, location of a first responder assigned to a request for assistance associated with the communication device (e.g., device of first responder). A communication link refers to the point-to-point communication channels, point-to-point and end-to-end data sessions, and the physical hardware facilitating the communication channel(s) (e.g., antennas used to communicate/transmit information). In some embodiments, a data session comprises session parameters and the network route taken from one device to another device.

As used herein, a "data channel" refers to a communication session between two devices wherein data packets are exchanged between the devices. In some embodiments, a data session is setup using exchange of certain data packets, also called as "handshake signals," which are able to define the capabilities of the data session. For example, in some embodiments, the data session "handshake" provides for the ability to transfer multi-media data, voice data, and other data via the data session. In some embodiments, the data session is setup without the use of handshake signals, wherein the two devices involved share data packets according to a predefined protocol (e.g., a previously agreed upon protocol). In some embodiments, the data session is routed through an EMS, which stores the multi-media, voice, and/or other data from any of the devices that are part of the data session. In further embodiments, the EMS shares the data from the data session with the other device (e.g., device of a first responder). In some embodiments, the EMS manages the data session.

As used herein, a "Received Signal Strength Indicator (RSSI)" refers to a measurement of the power present in a received radio signal. In some embodiments, the RSSI refers to a number assigned to the signal levels (e.g., power level) of packets as detected by a device receiving the packets from a device sending the packets. For example, an RSSI value may be a number within an arbitrary range such as from 0 to 100. In some embodiments, the RSSI refers to the decibel level of the power of the received data packets. In other embodiments, the RSSI refers to the actual power, for example measured in mW, as detected by the receiver. In some embodiments, RSSI is replaced with received channel power indicator (RCPI), which is a measure of the received radio signal power in a selected channel over the preamble and the entire received frame.

As used herein, "voice or speech recognition software" refers to computer programs that can recognize a person's speech to identify trigger phrases (e.g., iListen, Voice Navigator, Google Now, LilySpeech, etc.). In some embodiments, the software may be able to recognize the identity of the speaker. As used herein, "voice command" refers to words or phrases that a user may use to give command to the triggering device. The trigger phrases may be user-defined or may be from a library of phrases on the trigger device or at a remote server.

As used herein, "sound detection software" refers to computer programs for detecting trigger sounds in and around the triggering device. The trigger sounds may be user-defined or may be from a library of phrases on the trigger device or at a remote server. The trigger sounds may be sounds (alarms, breakage, gunshots, explosion, fire, car crash, etc.) or absence of sound (e.g., no heartbeat, etc.). For example, a glass break detector software may use the microphone in the trigger device to monitor any noise or vibrations to detect burglaries in a smart home. If the vibrations exceed a baseline, they may be analyzed by the software. The software may analyze frequencies typical of glass shattering and trigger an emergency alert if the sound is above a trigger threshold. In some cases, the software may compare detected sounds with glass-break profiles analysis and trigger an alert if the amplitude threshold and/or statistically expressed similarity threshold are breached. In some embodiments, an emergency is detected or triggered when a trigger sound exceeds a threshold. In some embodiments, a trigger sound threshold is about 50, 55, 60, 65, 70, 75, 80, 85, 90, 95, 100, 110, 120, 130, 140, 150, 160, 170, 180, 190, or 200 decibels. In some embodiments, a trigger sound threshold is at least about 50, 55, 60, 65, 70, 75, 80, 85, 90, 95, 100, 110, 120, 130, 140, 150, 160, 170, 180, 190, or 200 decibels. In some embodiments, a trigger sound threshold is no more than about 50, 55, 60, 65, 70, 75, 80, 85, 90, 95, 100, 110, 120, 130, 140, 150, 160, 170, 180, 190, or 200 decibels.

Modern communication devices, for example, smart phones, tablet computers, wearable communication devices, smart sensor devices and/or systems are often equipped with a variety of features for determining location information of the communication device using, for example, GPS, or triangulation with cellular phone towers. Modern communication devices also often include functionality to store data regarding a user of the communication device, for example, health information about the user.

In some embodiments, the communication device (or communication module of the device) communicates with a recipient through one or more data channels. In some embodiments, the recipient is an emergency management system. In some embodiments, the EMS routes communications to an EDC. In further embodiments, the EMS establishes a first data channel with the communication device and a second data channel between the EMS and the EDC, wherein the EMS bridges the first and second data channels to enable the communication device and the EDC to communicate. In some embodiments, the EMS converts data (e.g., data set) from the communication device into a format suitable for the EDC (e.g., analog or digital, audio, SMS, data, etc.) before sending or routing the formatted data to the EDC. In some embodiments, the EMS routes communications to a device associated with a first responder. In some embodiments, the communication device relays additional communications, information, and/or data sent or shared between member devices in the group of devices to the EMS or EDC after a request for assistance has been sent. In further embodiments, the additional information is relayed to the EMS or EDC after the request for assistance has been sent in order to provide current information that is relevant to the request. For example, in some instances, communications between member devices contain information relevant to the emergency (e.g., information that the user of member device who is experiencing a medical emergency suffers from diabetes). Accordingly, in some embodiments, the information is sent autonomously, at request of a user of the communication device, or at request of the recipient (e.g., EMS, EDC, first responder, etc.).

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

EXAMPLES

The following illustrative examples are representative of embodiments of the invention described herein and are not meant to be limiting in any way.

Just In Time, an emergency response company, aids emergency service providers (ESPs; e.g., public safety answering points, or "PSAPs") by gathering emergency data from a variety of sources and delivering the data directly to the emergency service providers. Traditionally, PSAPs and other ESPs are only technologically capable of receiving telephone calls (e.g., 9-1-1 emergency calls) with no additional data. Thus, typically, when a person is in an emergency, they must make an emergency call (e.g., by dialing 9-1-1 in the United States) and verbally communicate the details of their emergency to a call taker at an ESP. This emergency call is often referred to as a request for emergency service or an emergency service request. The process of verbally communicating the details of an emergency takes time away from ESPs in providing emergency response, is prone to human error (e.g., incorrectly reported information, miscommunication, language barriers), and requires that the person in the emergency is physically able to verbally communicate, which is far from a given. Even in the case of a home security alarm, the alarm is typically sent to a monitoring center where a call taker must call an ESP and verbally communicate the details of the potential emergency. To aid ESPs, Just In Time maintains and provides an emergency management system (EMS) for delivering digital emergency service requests, a opposed to delivering verbal emergency service requests (e.g., emergency phone calls), and emergency data associated with emergency service requests to emergency service providers (ESPs).

Example 1

On Friday night, a burglar attempts to break into the Johnson's family home through the back door. The Johnson's home security system, which has been integrated with Just In Time's emergency management system (EMS), detects the break in attempt and triggers a home security alarm. In response to triggering the home security alarm, the home security system transmits an emergency alert including an identifier of the alarm to a monitoring center and to the EMS in parallel. Upon receiving the emergency alert, a call taker at the monitoring center accesses an emergency response application provided by the EMS on a computing device at the monitoring center. The call taker then types the identifier of the alarm into a search bar within a graphical user interface (GUI) of the emergency response application and selects a search button within the GUI, thereby transmitting an emergency data request including the identifier of the alarm to the EMS. In response to receiving the emergency data request including the identifier of the home security alarm generated by the home security system installed at the Johnson's family home, the EMS uses the identifier of the alarm to gather any and all emergency data associated with the emergency alert available to the EMS. The EMS identifies two smart cameras installed at the Johnson's family home, one at the front door and one at the back door, that are accessible to the EMS. The EMS transmits this information to the monitoring center and displays the information within the GUI of the emergency response application. The call taker, knowing that the home security alarm says that the alarm was triggered at the back door, selects to access a video feed from the smart camera installed at the back door of the house. In response, the EMS accesses the smart camera installed at the back of the house and passes a video feed from the smart camera through to the emergency response application at the monitoring center. The call taker at the monitoring center sees the burglar in the video feed, confirming the emergency, and calls an emergency service provider (ESP). The call taker is then able to tell the ESP that a burglar has attempted to break into the Johnson's family home through the back door. The ESP is then able to dispatch police officers to the Johnson's family home immediately.

Example 2

Two months later, the Johnson's are driving home from the opera late at night. While Mr. and Mrs. Johnson are discussing the performance, it begins to rain. Mr. Johnson, distracted by his memories of the theater, does not notice that he is still driving 95 MPH and their car begins to hydroplane. Unfortunately, the highway bends right before Mr. Johnson is able to regain control of the vehicle, and the Johnsons crash into the median divider. However, an intelligent vehicle system installed in the Johnson's car (e.g., OnStar) detects the crash, generates an alarm, and transmits an emergency alert including a location of the vehicle to a monitoring center. The emergency alert is shown within a graphical user interface (GUI) of an alarm handling software application executed on a computing device at the monitoring center. In response to receiving the emergency alert, a call taker at the monitoring center initiates a call with the vehicle and asks the Johnsons if they are in need of emergency assistance. Mrs. Johnson tells the call taker that Mr. Johnson is unconscious and that the family is in need of emergency assistance. The call taker then selects a Push to PSAP button within the GUI of the alarm handling software application, which causes the monitoring center to transmit emergency data associated with the emergency alert, including the location of the vehicle, to the emergency management system (EMS). Upon receiving the emergency data associated with the emergency alert, the EMS uses the location included in the emergency data to determine an appropriate emergency service provider (ESP) to transmit the emergency data to and pushes the emergency data to the ESP through an emergency response application provided to the ESP by the EMS. The emergency response application includes a GUI that displays an incident that represents the emergency alert within a list of incidents and the location associated with the emergency alert within an interactive map. The ESP is then able to dispatch first responders to the accident as soon as possible, without any further verbal communication between the monitoring center and the ESP. The EMS then establishes a two-way communication link to facilitate a text-based communication session between the call taker at the monitoring center and a call taker at the ESP. The call taker at the ESP sends a message to the call taker at the monitoring center letting the call taker at the monitoring center know that first responders have been dispatched to the accident, and the call taker at the monitoring center tells the Johnsons that help is on the way.

Example 3

A few weeks after the car crash, Mr. and Mrs. Johnson's son, Kevin, is in the backseat of a shared ride (e.g., an Uber ride) when a passenger in the front seat of the car holds the driver up at gun point. The passenger with the gun demands that the rest of the passengers put their phones down on the floor in front of them. Then, the gunman tells the driver to drive according to the gunman's directions and begins directing the driver to a new destination. However, Kevin is able to discreetly press an emergency button on his smartwatch, which generates and transmits an emergency alert including Kevin's location (generated by the smartwatch) to the EMS. In response to receiving the emergency alert, the EMS delivers a push notification to Kevin's smartwatch to confirm the emergency alert. Kevin then selects the push notification, thereby confirming the emergency alert. Having obtained verification of the emergency alert, the EMS then uses Kevin's location to determine an appropriate emergency service provider (ESP) to transmit the emergency data. The EMS then generates a digital emergency service request and transmits the digital emergency service request to the ESP through an emergency response application provided to the ESP by the EMS. The emergency response application includes a GUI that displays the digital emergency service request within a list of digital emergency service requests and Kevin's location within an interactive map. A call taker at the ESP selects to claim the digital emergency service request from the lists of digital emergency service requests and the interactive map begins dynamically updating Kevin's location as the driver continues to drive according to the gunman's directions. The call taker at the ESP then dispatches police officers to Kevin's location, and the police officers are able to intercept Kevin's shared ride before they reached the gunman's destination and rescue the driver and passengers.

What is claimed is:

1. An emergency management system (EMS) configured for coordinating responses to emergencies, the EMS communicatively coupled to a plurality of emergency service providers (ESPs) and comprising a memory, a network component, and at least one processor operatively coupled to the network component, the at least one processor operative to:

receive emergency data comprising an emergency location;

automatically determine an ESP from the plurality of ESPs to receive the emergency data based at least on the emergency location;

transmit a digital emergency service request associated with the emergency data to the ESP, the digital emergency service request providing the ESP with one or more servicing options;

transmit information associated with the digital emergency service request for display within a graphical user interface (GUI) accessed by the ESP; and transmit information associated with the digital emergency service request to a computer-aided dispatch (CAD) system associated with the ESP wherein the processor is further operative to receive an emergency data request including an identifier of the ESP, retrieve a geofence associated with an identifier of the ESP responsive to receiving the emergency data request, and identify one or more additional emergencies having locations within the geofence.

2. The system of claim 1, wherein the at least one processor is operative to transmit the information associated with the digital emergency service request to the CAD system in response to selection of a push to CAD element in the GUI.

3. The system of claim 1, wherein the at least one processor is operative to provide the information regarding the digital emergency service request to the CAD system in response to a query received from the CAD system.

4. The system of claim 1, wherein the at least one processor is operative to receive regular and periodic queries from the CAD system.

5. The system of claim 1, wherein the at least one processor is operative to receive the emergency data request from the CAD system.

6. The system of claim 5, wherein the one or more additional emergencies are identified from recent emergency alerts received within a predetermined amount of time having locations within the geofence and the at least one processor is operative to transmit digital emergency service requests associated with the recent alerts to the CAD system.

7. The system of claim 1, wherein the one or more servicing options includes a first servicing option to claim the digital emergency service request, and the at least one processor is operative to transmit information associated with the digital emergency service request to the computer-aided dispatch (CAD) system in response to a user selecting the first servicing option to claim the digital emergency service request.

8. The system of claim 1, wherein the at least one processor is further operative to:

retrieve a plurality of geofences associated with the plurality of ESPs;

determine that the emergency location is within the geofence associated with the ESP from the plurality of geofences.

9. The system of claim 8, wherein the at least one processor is further operative to:

detect an active communication link established between EMS and the ESP; and transmit the digital emergency service request to the ESP in response to detecting the active communication link established between the EMS and the ESP and determining that the emergency location is within the geofence associated with the ESP.

10. The system of claim 1, wherein the GUI includes a dispatch status of the digital emergency service request.

11. An emergency management system (EMS) configured for coordinating responses to emergencies, the EMS communicatively coupled to a plurality of emergency service providers (ESPs) and comprising a memory, a network component, and at least one processor operatively coupled to the network component, the at least one processor operative to:

receive emergency data comprising an emergency location;

automatically determine an ESP from the plurality of ESPs to receive the emergency data based at least on the emergency location;

transmit a digital emergency service request associated with the emergency data to the ESP, the digital emergency service request providing the ESP with one or more servicing options;

transmit information associated with the digital emergency service request for display within a graphical user interface (GUI) of a computer-aided dispatch (CAD) system accessed by the ESP wherein the one or more servicing options includes a first servicing option to claim the digital emergency service request, and the at least one processor is operative to transmit information associated with the digital emergency service request to the computer-aided dispatch (CAD) system in response to a user selecting the first servicing option to claim the digital emergency service request.

12. The system of claim 11, wherein the CAD system is configured to automatically establish an active or persistent communication link associated with an identifier of the ESP.

13. The system of claim 11, wherein the at least one processor is operative to receive an emergency data request from the CAD system including an identifier of the ESP, retrieve a geofence associated with the identifier of the ESP, and identify any recent emergency alerts received within a predetermined amount of time having locations within the geofence associated with the identifier of the ESP.

14. The system of claim 13, wherein the at least one processor is operative to transmit digital emergency service requests associated with the recent alerts to the CAD system.

15. The system of claim 11, wherein the at least one processor is further operative to:

determine if one of the one or more servicing options is selected within a specific time window; and in response to determining that one of the one or more servicing options is not selected within the specific time window, implement a failsafe procedure.

16. The system of claim 15, wherein the at least one processor, when implementing the failsafe procedure, is operative to:

deliver a failsafe emergency call to the ESP;

transmit a second digital emergency service request associated with the emergency data to the ESP;

transmit a second digital emergency service request associated with the emergency data to a second ESP from the plurality of ESPs; or prompt a monitoring center to call the ESP.

17. A computer-implemented method for providing emergency response assistance, the method comprising:

receiving emergency data comprising an emergency location;

identifying an emergency service provider (ESP) to receive the emergency data based on the emergency location;

transmitting a digital emergency service request associated with the emergency location to the ESP, the digital emergency service request providing the ESP with one or more servicing options;

transmitting the emergency data for display within a graphical user interface (GUI) accessed by the ESP; and transmitting information associated with the digital emergency service request to a computer-aided dispatch (CAD) system associated with the ESP, wherein the CAD system is configured to automatically establish an active or persistent communication link associated with an identifier of the ESP.

18. The method of claim 17, comprising transmitting the information associated with the digital emergency service request to the CAD system in response to selection of a push to CAD element in the GUI or in response to a query received from the CAD system.

19. The method of claim 17, the one or more servicing options comprising a first option to claim the digital emergency service request.

20. The method of claim 17, comprising receiving an emergency data request from the CAD system including an identifier of the ESP, retrieving a geofence associated with the identifier of the ESP, identifying any recent emergency alerts received within a predetermined amount of time having locations within the geofence associated with the identifier of the ESP, and transmitting digital emergency service requests associated with the recent alerts to the CAD system.

* * * * *